(12) United States Patent
Sakuragi et al.

(10) Patent No.: US 10,067,379 B2
(45) Date of Patent: Sep. 4, 2018

(54) LIQUID CRYSTAL DISPLAY DEVICE

(71) Applicant: Sharp Kabushiki Kaisha, Osaka-shi, Osaka (JP)

(72) Inventors: Kazuyoshi Sakuragi, Osaka (JP); Tsuyoshi Kamada, Osaka (JP); Toru Kanno, Osaka (JP); Shun Ueki, Osaka (JP); Tsuyoshi Maeda, Osaka (JP); Emi Yamamoto, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/389,419

(22) PCT Filed: Apr. 2, 2013

(86) PCT No.: PCT/JP2013/060054
§ 371 (c)(1),
(2) Date: Sep. 30, 2014

(87) PCT Pub. No.: WO2013/151034
PCT Pub. Date: Oct. 10, 2013

(65) Prior Publication Data
US 2015/0062491 A1    Mar. 5, 2015

(30) Foreign Application Priority Data

Apr. 2, 2012 (JP) .................. 2012-084137
Jul. 20, 2012 (JP) .................. 2012-161494

(51) Int. Cl.
*G02F 1/1335*    (2006.01)
*G02F 1/13357*   (2006.01)
*G02B 5/30*      (2006.01)

(52) U.S. Cl.
CPC ......... *G02F 1/1336* (2013.01); *G02B 5/3083* (2013.01); *G02F 1/133504* (2013.01);
(Continued)

(58) Field of Classification Search
CPC ............ G02F 1/1335; G02F 1/133504; G02F 2001/133562; G02F 1/1336; G02F 2413/02; G02B 5/0278; G02B 5/3083
(Continued)

(56) References Cited

U.S. PATENT DOCUMENTS 5,481,385 A * 1/1996 Zimmerman ..... G02F 1/133524
349/62
6,417,966 B1 * 7/2002 Moshrefzadeh ....... G03B 21/62
359/453
(Continued)

FOREIGN PATENT DOCUMENTS

JP    2000-019518 A    1/2000
JP    2000-352608 A    12/2000
(Continued)

OTHER PUBLICATIONS

Official Communication issued in International Patent Application No. PCT/JP2013/060054, dated May 21, 2013.

*Primary Examiner* — Nathanael R Briggs
(74) *Attorney, Agent, or Firm* — Keating & Bennett, LLP

(57) ABSTRACT

A liquid crystal display device includes a liquid crystal panel that includes a liquid crystal cell including a pair of substrates and a liquid crystal layer sandwiched between the pair of substrates, and a pair of polarizers arranged on a light incident side and a light emission side of the liquid crystal layer; an illumination device that is arranged on the light incident side of the liquid crystal cell, and emits light toward the liquid crystal cell; and a light control member that is arranged on the light emission side of the liquid crystal panel, and controls an emission direction of light emitted from the liquid crystal panel by anisotropically diffusing the light in an azimuthal direction as viewed from a direction normal to the liquid crystal panel. The light control member is arranged such that an azimuthal direction in which a (Continued)

luminance viewing angle of the liquid crystal panel is relatively narrow and an azimuthal direction in which diffusivity of the light control member is relatively high approximately coincide with each other.

15 Claims, 51 Drawing Sheets

(52) U.S. Cl.
CPC ............ *G02F 2001/133562* (2013.01); *G02F 2413/02* (2013.01)

(58) Field of Classification Search
USPC .......................................... 349/64, 104, 112
See application file for complete search history.

(56) References Cited

U.S. PATENT DOCUMENTS

| | | |
|---|---|---|
| 6,512,561 B1 | 1/2003 | Terashita et al. |
| 2006/0158724 A1* | 7/2006 | Thomas ............... B29C 70/745 359/443 |
| 2006/0245060 A1* | 11/2006 | Goto ..................... G02B 5/003 359/613 |
| 2010/0245736 A1 | 9/2010 | Nishihara et al. |
| 2012/0251781 A1* | 10/2012 | Nagai .................. G02B 5/3033 428/156 |
| 2013/0265774 A1 | 10/2013 | Umeda et al. |

FOREIGN PATENT DOCUMENTS

| | | |
|---|---|---|
| JP | 2002-090527 A | 3/2002 |
| JP | 2007-048489 A | 2/2007 |
| JP | 2009-217165 A | 9/2009 |
| JP | 2009-294468 A | 12/2009 |
| JP | 2011-158574 A | 8/2011 |
| JP | 2011-248074 A | 12/2011 |
| WO | 2009/044520 A1 | 4/2009 |
| WO | 2012/081410 A1 | 6/2012 |
| WO | 2012/086424 A1 | 6/2012 |

* cited by examiner

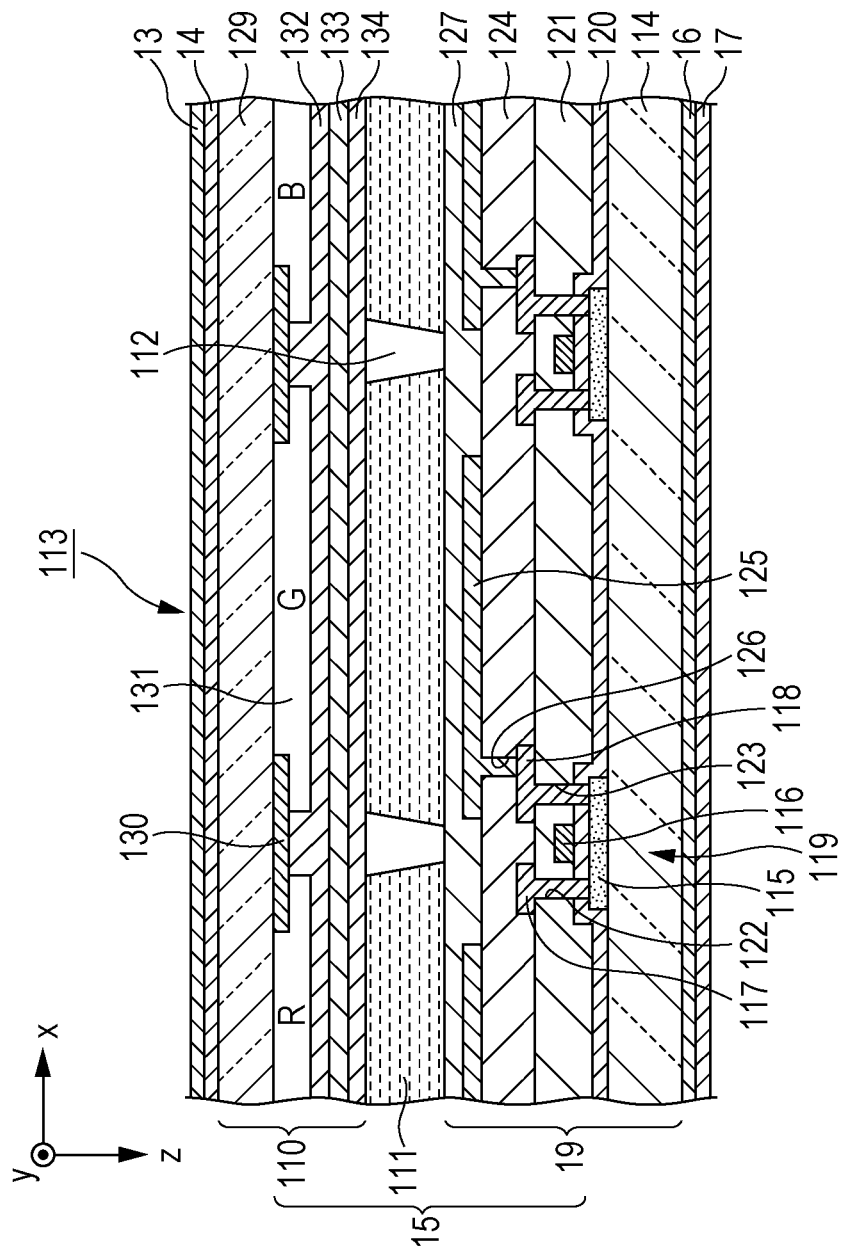

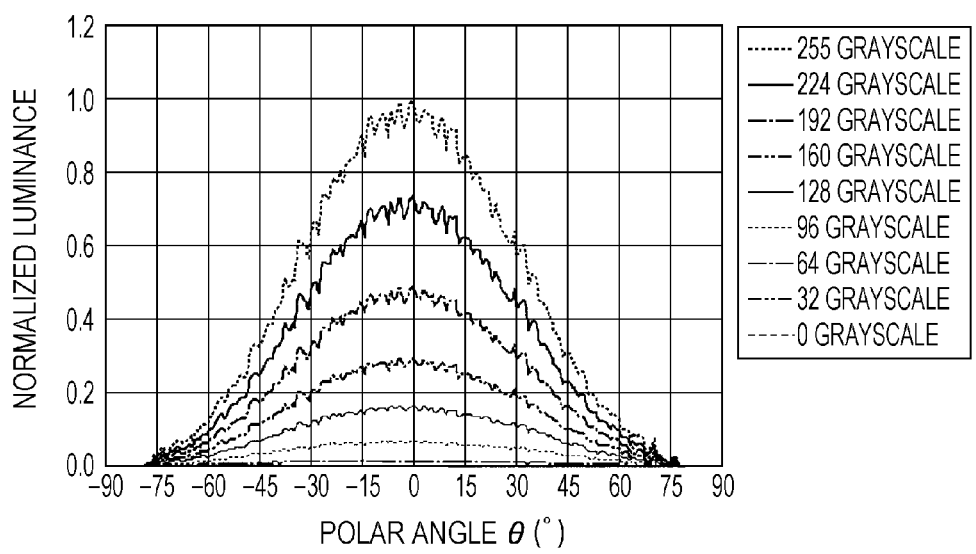
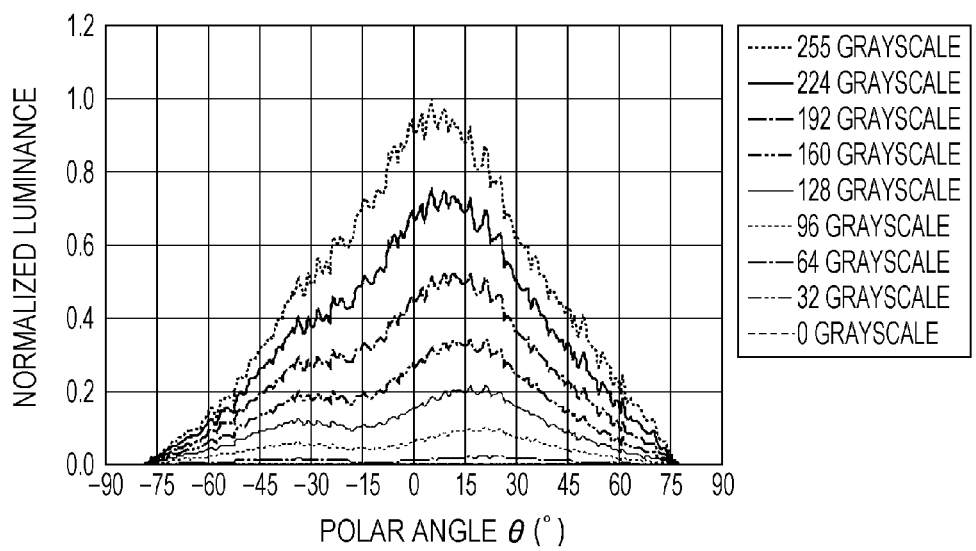

LIQUID CRYSTAL DISPLAY DEVICE

TECHNICAL FIELD

The present invention relates to a liquid crystal display device.

The present application claims priority based on Japanese Patent Application No. 2012-084137 filed in Japan on Apr. 2, 2012, and Japanese Patent Application No. 2012-161494 filed in Japan on Jul. 20, 2012, the entire contents of which are hereby incorporated by reference.

BACKGROUND ART

As displays of mobile electronic devices such as mobile phones, television sets, personal computers, or the like, liquid crystal display devices are widely used. In general, liquid crystal display devices exhibit excellent display performances when a display screen is viewed from a front surface side. Meanwhile, when the display screen is viewed from an oblique direction, contrast is lowered, and thus the visibility is likely to deteriorate. Alternatively, gray scale inversion may occur in which brightness is reversed in gray scale display. Therefore, various techniques of widening a viewing angle range at which a screen is observable with good visibility have been proposed. As one means for improving the viewing angle of the liquid crystal display device, a method using an optical compensating plate such as a retardation plate is known, and various retardation plates have been proposed.

For example, PTL 1 below discloses a liquid crystal display device including a liquid crystal cell of a twisted nematic (hereinafter, abbreviated as TN) mode, a pair of polarizers arranged on both surfaces of the liquid crystal cell, and positive A-type retardation layers respectively arranged between the liquid crystal cell and the polarizers. Further, PTL 2 below discloses a liquid crystal display device including a liquid crystal cell having a liquid crystal layer with negative dielectric anisotropy, a pair of polarizers arranged on both surface of the liquid crystal cell, and a biaxial film as a retardation compensation element provided between at least one of the pair of polarizers and the liquid crystal cell.

As another means for improving the viewing angle of the liquid crystal display device, a configuration has been proposed in which a member for scattering light emitted from a liquid crystal panel is provided on a viewing side of the liquid crystal panel. For example, PTL 3 below discloses a transmission display device including a light diffusion sheet having a light diffusion layer in which a plurality of grooves having approximately V-shaped cross section are formed in parallel in a one-dimensional direction or two-dimensional directions, on a viewing side of the liquid crystal panel.

PTL 4 discloses a liquid crystal display device including a liquid crystal cell and an optical compensation polarizer. The optical compensation polarizer is arranged on at least one of a light incident side or a light emission side of the liquid crystal cell. The optical compensation polarizer includes a polarizer, a birefringent layer, and an anisotropic scattering film.

PTL 5 discloses a liquid crystal display device including a liquid crystal display panel and a light diffusion sheet. The light diffusion sheet is arranged on a light emission side of the liquid crystal display panel.

The light diffusion sheet has a low refractive index region and a high refractive index region. The cross-sectional shape of the low refractive index region is approximated to an isosceles triangle. The high refractive index region is arranged around the low refractive index region.

CITATION LIST

Patent Literature

PTL 1: Japanese Unexamined Patent Application Publication No. 2011-248074
PTL 2: Japanese Unexamined Patent Application Publication No. 2000-19518
PTL 3: Japanese Unexamined Patent Application Publication No. 2000-352608
PTL 4: Japanese Unexamined Patent Application Publication No. 2002-90527
PTL 5: International Publication No. WO 2009/044520

SUMMARY OF INVENTION

Technical Problem

According to the biaxial retardation plate of PTL 2, it is possible to reduce the cost of the retardation plate while effectively compensating for the retardation of the liquid crystal layer. However, for example, if the biaxial retardation film of this kind is combined with the liquid crystal panel of the TN mode of PTL 1, the change in the luminance in the vertical direction of the screen is increased. The reason is because liquid crystal molecules are aligned while being twisted in the liquid crystal cell of a TN mode, and thus the retardation of the liquid crystal differs depending on the angle for observing the screen and the gray scale. Disposing an isotropic scattering film on the viewing side of the liquid crystal cell is considered as measures for improvement. However, diffusion of light is insufficient even when the isotropic scattering film is used, and it is not possible to sufficiently widen the luminance viewing angle.

The light diffusion sheet of PTL 3 exhibits anisotropic light diffusion because a plurality of grooves are formed in a certain direction. However, even if the light diffusion sheet described above is used without considering the viewing angle characteristics of the liquid crystal cell, it does not lead to the improvement of luminance viewing angle characteristics.

If the optical compensation polarizers of PTL 4 and PTL 5 are applied to the liquid crystal display device of the TN mode, the change in the luminance in the vertical direction of the screen is increased. The reason is because liquid crystal molecules are aligned while being twisted in the liquid crystal device of the TN mode, and thus the retardation of the liquid crystal is different depending on the angle for observing the screen and the gray scale. Further, even if the light diffusion sheet described above is arranged on the viewing side of the liquid crystal display device, it is not possible to sufficiently diffuse light.

Some embodiments of the present invention aim to realize a liquid crystal display device having excellent luminance viewing angle characteristics. Some embodiments of the present invention aim to provide a liquid crystal display device having excellent viewing angle characteristics by suppressing gray scale inversion when a display screen is viewed from an oblique direction.

Solution to Problem

In order to achieve the above object, a liquid crystal display device according to an aspect of the present invention includes a liquid crystal panel that includes a liquid crystal cell including a pair of substrates and a liquid crystal layer sandwiched between the pair of substrates, and a pair of polarizers arranged on a light incident side and a light emission side of the liquid crystal layer; an illumination device that is arranged on the light incident side of the liquid crystal cell, and emits light toward the liquid crystal cell; and a light control member that is arranged on the light emission side of the liquid crystal panel, and anisotropically diffuses light emitted from the liquid crystal panel in an azimuthal direction as viewed from a direction normal to the liquid crystal panel, in which the light control member is arranged such that an azimuthal direction in which a luminance viewing angle of the liquid crystal panel is relatively narrow and an azimuthal direction in which diffusivity of the light control member is relatively high approximately coincide with each other.

The liquid crystal display device according to an aspect of the present invention includes a liquid crystal panel that includes a pair of substrates, a liquid crystal layer sandwiched between the pair of substrates, and a pair of polarizers arranged on a light incident side and a light emission side of the liquid crystal layer; an illumination device that is arranged on the light incident side of the liquid crystal panel, and emits light toward the liquid crystal panel; and a light control member that is arranged on the light emission side of the liquid crystal panel, and controls an emission direction of light emitted from the liquid crystal panel by anisotropically diffusing the light in an azimuthal direction as viewed from a direction normal to the liquid crystal panel. The light control member is arranged such that an azimuthal direction in which a transmittance change in a polar angle direction is relatively large in a case of applying a constant voltage to the liquid crystal panel and an azimuthal direction in which diffusivity of the light control member is relatively high approximately coincide with each other.

In the liquid crystal display device according an aspect of the present invention, among a plurality of iso-luminance curves representing viewing angle dependence of white display luminance of the liquid crystal panel as viewed from the direction normal to the liquid crystal panel, an iso-luminance curve having at least relatively high white display luminance may have a rotationally asymmetric shape, and the azimuthal direction in which a luminance viewing angle of the liquid crystal panel is relatively narrow may be an azimuthal direction in which a region surrounded by the iso-luminance curve having the rotationally asymmetric shape is relatively narrow.

In the liquid crystal display device according an aspect of the present invention, the light control member may include a substrate having light transmissivity, a plurality of light diffusion portions formed on one surface of the substrate, and a light absorbing layer formed on a region other than a region where the light diffusion portions are formed in the one surface of the substrate, in which the light diffusion portions each may have a light emission end surface in contact with the substrate, a light incident end surface which is opposite the light emission end surface and has an area greater than an area of the light emission end surface, and a reflecting surface which is in contact with the light emission end surface and the light incident end surface and reflects light incident from the light incident end surface, and in which a height from the light incident end surface to the light emission end surface of the light diffusion portion may be greater than a width of the light absorbing layer.

In the liquid crystal display device according an aspect of the present invention, a planar shape of the light diffusion portion as viewed from the direction normal to the substrate may have a major axis and a minor axis, and the azimuthal direction in which diffusivity of the light control member is relatively high may approximately coincide with a minor axis direction.

In the liquid crystal display device according an aspect of the present invention, the plurality of light diffusion portions may be arranged in stripes on one surface of the substrate, and the azimuthal direction in which diffusivity of the light control member is relatively high may approximately coincide with a direction in which the plurality of light diffusion portions are arranged.

In the liquid crystal display device according an aspect of the present invention, the light absorbing layer may include a plurality of light absorbing layers being scattered on one surface of the substrate, in which a planar shape of the light absorbing layer as viewed from the direction normal to the substrate may have a major axis and a minor axis, and major axis directions of the plurality of light absorbing layers are aligned approximately in one direction, and in which the azimuthal direction in which diffusivity of the light control member is relatively high may approximately coincide with minor axis directions of the plurality of light absorbing layers.

In the liquid crystal display device according an aspect of the present invention, an inclination angle of the reflecting surface of at least one light diffusion portion, among the plurality of light diffusion portions, may be different depending on location.

In the liquid crystal display device according to an aspect of the present invention, a diffusion angle of light emitted from the illumination device, in an azimuthal direction in which a luminance change in the polar angle direction of the illumination device is relatively large, may be 40° or more and 60° or less.

In the liquid crystal display device according to an aspect of the present invention, the azimuthal direction in which a luminance viewing angle of the liquid crystal panel is relatively narrow, the azimuthal direction in which diffusivity of the light control member is relatively high, and the azimuthal direction in which a luminance change in the polar angle direction of the illumination device is relatively large may approximately coincide with each other.

In the liquid crystal display device according to an aspect of the present invention, the light control member may include a substrate having light transmissivity, a plurality of light absorbing layers formed on one surface of the substrate, and a light diffusion portion formed on a region other than a region where the light absorbing layers are formed in the one surface of the substrate, in which the light diffusion portion may have a light emission end surface in contact with the substrate, a light incident end surface which is opposite the light emission end surface and has an area greater than an area of the light emission end surface, and a reflecting surface which is in contact with the light emission end surface and the light incident end surface and reflects light incident from the light incident end surface, and in which a height from the light incident end surface to the light emission end surface of the light diffusion portion may be greater than a width of the light absorbing layer.

In the liquid crystal display device according to an aspect of the present invention, the light diffusion portion may include a first reflecting surface corresponding to the azimuthal direction in which a luminance viewing angle of the liquid crystal panel is relatively narrow, and a second reflecting surface on an opposite side to the first reflecting surface, and in which an inclination angle of the first reflecting surface and an inclination angle of the second reflecting surface may be different from each other.

In the liquid crystal display device according to an aspect of the present invention, the inclination angle of the first reflecting surface may be greater than the inclination angle of the second reflecting surface, when the light emitted from the liquid crystal panel is incident obliquely toward the first reflecting surface.

In the liquid crystal display device according to an aspect of the present invention, a planar shape of a portion at which the light absorbing layer is in contact with one surface of the substrate may be an anisotropic shape having at least a major axis and a minor axis.

In the liquid crystal display device according to an aspect of the present invention, a planar shape of a portion at which the light absorbing layer is in contact with one surface of the substrate may be an ellipse or a shape inscribed in the ellipse.

In the liquid crystal display device according to an aspect of the present invention, the minor axis direction of the light absorbing layer and the azimuthal direction in which a luminance viewing angle of the liquid crystal panel is relatively narrow may approximately coincide with each other.

In the liquid crystal display device according to an aspect of the present invention, among the plurality of light absorbing layers, a size or a shape of at least one light absorbing layer may be different from a size or a shape of another light absorbing layer.

In the liquid crystal display device according to an aspect of the present invention, among the plurality of light absorbing layers, a major axis of at least one light absorbing layer may face a direction different from that of another light absorbing layer.

In the liquid crystal display device according to an aspect of the present invention, among the plurality of light absorbing layers, at least one light absorbing layer may be connected to at least a part of another light absorbing layer.

In the liquid crystal display device according to an aspect of the present invention, a length in the major axis direction of the light absorbing layer may be 100 µm or less.

In the liquid crystal display device according to an aspect of the present invention, a length in the major axis direction of the light absorbing layer may be 40 µm or less.

In the liquid crystal display device according to an aspect of the present invention, the inclination angle of the reflecting surface of the light diffusion portion may be continuously changed, and a cross-sectional shape of the reflecting surface may be a curved inclined surface.

In the liquid crystal display device according to an aspect of the present invention, the reflecting surface of the light diffusion portion may have a plurality of different inclination angles, and a cross-sectional shape of the reflecting surface may be an inclined surface of a polygonal line.

In the liquid crystal display device according to an aspect of the present invention, the illumination device may emit light having single-axis directivity.

In the liquid crystal display device according to an aspect of the present invention, the illumination device may emit light having two-axis directivity.

In the liquid crystal display device according to an aspect of the present invention, the azimuthal direction in which a luminance viewing angle of the liquid crystal panel is relatively narrow may approximately coincide with a vertical direction of a display screen of the liquid crystal panel.

In the liquid crystal display device according to an aspect of the present invention, the liquid crystal panel may include a pixel composed of a plurality of sub-pixels for displaying different colors, the sub-pixel may be approximately rectangular, and the azimuthal direction in which diffusivity of the light control member is relatively high may approximately coincide with a minor axis direction of the sub-pixels.

In the liquid crystal display device according to an aspect of the present invention, a light scattering member for scattering incident light may be further provided on the light emission side of the light control member.

In the liquid crystal display device according to an aspect of the present invention, a display mode of the liquid crystal panel may be a twisted nematic mode.

In the liquid crystal display device according to an aspect of the present invention, a retardation plate may be arranged between the liquid crystal layer and the polarizer.

In the liquid crystal display device according to an aspect of the present invention, a discotic liquid crystal may be included in the retardation plate, and an angle between an azimuthal direction in which the discotic liquid crystal is inclined as viewed from the direction normal to the retardation plate, and the azimuthal direction in which diffusivity of the light control member is relatively high may be approximately 45°.

In the liquid crystal display device according to an aspect of the present invention, a light scattering member for scattering incident light may be provided on the light emission side of the light control member.

Advantageous Effects of Invention

According to some embodiments of the present invention, it is possible to realize a liquid crystal display device excellent in luminance viewing angle characteristics. According to some embodiments of the present invention, it is possible to provide a liquid crystal display device excellent in viewing angle characteristics by suppressing gray scale inversion when a display screen is viewed from an oblique direction.

BRIEF DESCRIPTION OF DRAWINGS

FIG. 2 is cross-sectional views of a liquid crystal cell and polarizers in the liquid crystal display device.

FIG. 50A is a diagram showing gray scale luminance characteristics when using a liquid crystal display device of EXAMPLE 3 and setting an aperture ratio to 50%.

FIG. 50B is a diagram showing gray scale luminance characteristics when using the liquid crystal display device of EXAMPLE 3 and setting an aperture ratio to 50%.

DESCRIPTION OF EMBODIMENTS

First Embodiment

Hereinafter, a first embodiment of the present invention will be described with reference to FIGS. 1 to 11.

In the present embodiment, a liquid crystal display device including a transmissive liquid crystal panel will be described as an example.

In addition, note that in all following drawings, for easier viewing of the respective components, some components may be illustrated having different scale dimensions.

Figure 1:
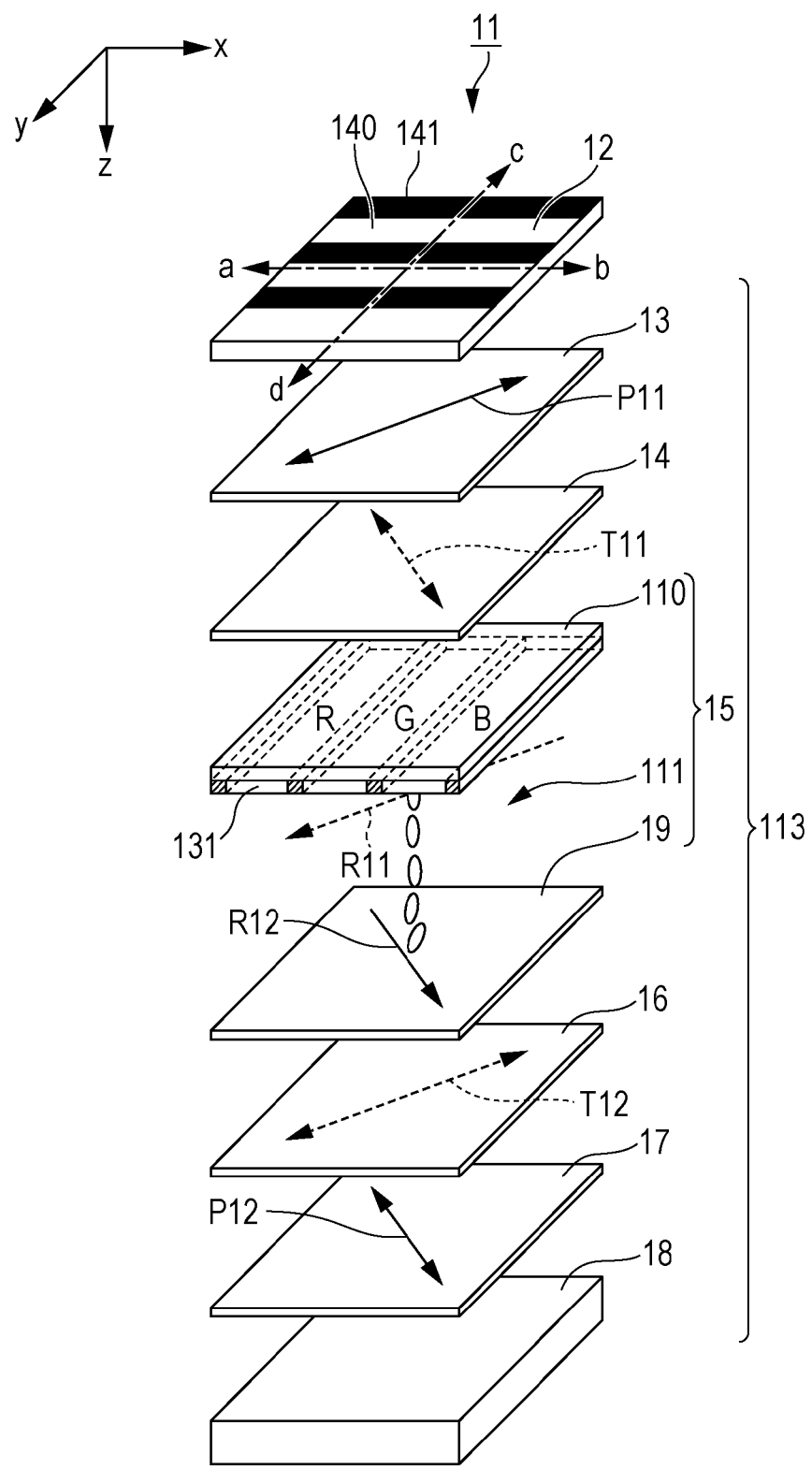
FIG. 1 is an exploded perspective view showing a schematic configuration of a liquid crystal display device of a first embodiment.

FIG. 1 is an exploded perspective view of (a viewing side) obliquely above a liquid crystal display device of the present embodiment.

As shown in FIG. 1, the liquid crystal display device 11 of the present embodiment is composed of a light control film 12 (light control member), and a liquid crystal panel 113. The liquid crystal panel 113 is composed of a first polarizer 13, a first retardation plate 14, a liquid crystal cell 15, a second retardation plate 16, a second polarizer 17, and a backlight 18 (illumination device). In FIG. 1, a TFT substrate 19, a color filter substrate 110, and a liquid crystal layer 111 which constitutes the liquid crystal cell 15 are schematically illustrated, and the detailed configuration thereof will be described later.

Observers see a display from the upper side of the liquid crystal display device 11 in FIG. 1 in which the light control film 12 is arranged. In the following description, a side in which the light control film 12 is arranged is referred to as a front side or a viewing side, and a side in which the backlight 18 is arranged is referred to as a back side. In addition, in the following description, an x-axis is defined as a horizontal direction of a screen of the liquid crystal display device 11, a y-axis is defined as a vertical direction of a screen of the liquid crystal display device 11, and a z-axis is defined as a width direction of the liquid crystal display device 11.

In the liquid crystal display device 11 of the present embodiment, the light emitted from the backlight 18 is modulated for each pixel in the liquid crystal panel 5, and predetermined images and characters are displayed by the light modulated for each pixel. If the light emitted from the liquid crystal panel 113 is transmitted through the light control film 12, and the light is emitted from the light control film 12 in a state in which the light distribution of the emitted light is wider than before the light is incident on the light control film 12. Thus, the observers can view the display with a wide viewing angle.

Hereinafter, the detailed configuration of the liquid crystal panel 113 will be described.

Here, a transmissive liquid crystal panel of an active matrix type will be described as an example, but the liquid crystal panel applicable to the present embodiment is not limited to the transmissive liquid crystal panel of the active matrix type. The liquid crystal panel applicable to the present embodiment may be, for example, a transflective (transmission and reflection combined type) liquid crystal panel, and may be a liquid crystal panel of a simple matrix type in which each pixel does not include a switching thin film transistor (hereinafter, referred to as TFT).

FIG. 2 is a longitudinal cross-sectional view of the liquid crystal panel 113.

Figure 24:
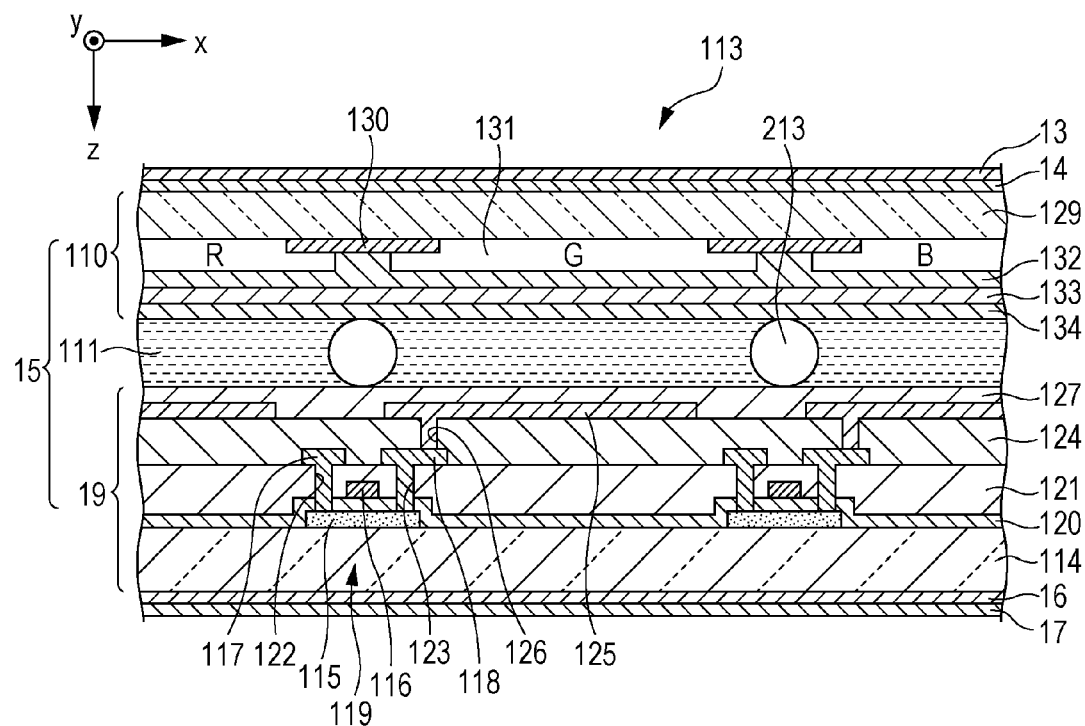
FIG. 24 is a longitudinal cross-sectional view of a liquid crystal panel.

As shown in FIG. 2, the liquid crystal cell 15 constituting the liquid crystal panel 113 includes a TFT substrate 19, a color filter substrate 110, and a liquid crystal layer 111. The TFT substrate 19 functions as a switching element substrate. The color filter substrate 110 is arranged to face the TFT substrate 19. The liquid crystal layer 111 is sandwiched between the color filter substrate 110 and the TFT substrate 19. The liquid crystal layer 111 is enclosed in a space surrounded by the TFT substrate 19, the color filter substrate 110, the TFT substrate 19, and a sealing member (not shown). The TFT substrate 19 and the color filter substrate 110 are bonded by the sealing member at a predetermined interval. The liquid crystal cell 15 of the present embodiment is intended for, for example, display in a TN mode, and a liquid crystal having a positive dielectric anisotropy is used for the liquid crystal layer 111. A cylindrical spacer 112 for maintaining a constant distance between the TFT substrate 19 and the color filter substrate 110 is arranged therebetween. The spacer 112 is made of, for example, resin, and is formed by photolithography. In addition, in FIG. 2, the shape of the spacer 112 is cylindrical, but as shown in FIG. 24 to be described later, the spacer 112 (in FIG. 24, the spacer 213) may be a spherical.

A display mode is not limited to the TN mode described above, and the liquid crystal display device of the present invention can use a vertical alignment (VN) mode, a super twisted nematic (STN) mode, an in-plane switching (IPS) mode, a fringe field switching (FFS) mode or the like, which will be illustrated in the following embodiments. In these display modes, when the display image is viewed obliquely, gray scale inversion may occur depending on the rubbing direction of an alignment layer. However, in the present embodiment, an example using the liquid crystal cell 15 of the TN mode is given.

A plurality of pixels (not shown) are arranged in a matrix shape on the TFT substrate 19. A pixel is a smallest unit area of display. A plurality of source bus lines (not shown) are formed on the TFT substrate 19 so as to extend parallel to each other. A plurality of gate bus lines (not shown) are formed on the TFT substrate 19 so as to extend parallel to each other. The plurality of gate bus lines are orthogonal to the plurality of source bus lines. The plurality of source bus lines and the plurality of gate bus lines are formed in a lattice shape on the TFT substrate 19. A rectangular region which is defined by the adjacent source bus line and the adjacent gate bus line is one pixel. The source bus lines are connected to the source electrode of the TFT which will be described later. The gate bus lines are connected to the gate electrode of the TFT.

A TFT 119 including a semiconductor layer 115, a gate electrode 116, a source electrode 117 and a drain electrode 118 and the like is formed on the surface of the liquid crystal layer 111 side of the transparent substrate 114 constituting the TFT substrate 19. For example, a glass substrate can be used for the transparent substrate 114. The semiconductor layer 115 is formed on the transparent substrate 114. As the material of the semiconductor layer 115, semiconductor materials such as continuous grain silicon (CGS), low-temperature poly-silicon (LPS), and amorphous silicon (α-Si) are used. On the transparent substrate 114, a gate insulating film 120 is formed to cover the semiconductor layer 115. As a material of the gate insulating film 120, for example, a silicon oxide film, a silicon nitride film, or a laminated film thereof is used.

On the gate insulating film 120, the gate electrode 116 is formed so as to face the semiconductor layer 115. As a material of the gate electrode 116, for example, a laminated film of tungsten (W)/tantalum nitride (TaN), molybdenum (Mo), titanium (Ti), aluminum (Ai) or the like is used.

On the gate insulating film 120, a first interlayer insulating film 121 is formed to cover the gate electrode 116. As the material of the first interlayer insulating film 121, for example, a silicon oxide film, a silicon nitride film, or a laminated film thereof is used. On the first interlayer insulating film 121, the source electrode 117 and the drain electrode 118 are formed. A contact hole 122 and a contact hole 123 are formed penetrating through the first interlayer insulating film 121 and the gate insulating film 120, on the first interlayer insulating film 121 and the gate insulating film 120. The source electrode 117 is connected to the source region of the semiconductor layer 115 through the contact hole 122. The drain electrode 118 is connected to the drain region of the semiconductor layer 115 through the contact hole 123. As the materials of the source electrode 117 and the drain electrode 118, a conductive material similar to that of the gate electrode 116 described above is used. On the first interlayer insulating film 121, a second interlayer insulating film 124 is formed to cover the source electrode 117 and the drain electrodes 118. As the material of the second interlayer insulating film 124, a material similar to that of the first interlayer insulating film 121 described above or an organic insulating material is used.

On the second interlayer insulating film 124, a pixel electrode 125 is formed. On the second interlayer insulating film 124, a contact hole 126 is formed through the second interlayer insulating film 124. The pixel electrode 125 is connected to the drain electrode 118 through the contact hole 126. The pixel electrode 125 is connected to the drain region of the semiconductor layer 115 with the drain electrode 118 as a relay electrode. As a material of the pixel electrode 125, for example, a transparent conductive material such as an indium tin oxide (ITO) and an indium zinc oxide (IZO) is used. In this configuration, a scanning signal is supplied through the gate bus line, and when the TFT 119 is turned on, an image signal supplied to the source electrode 117 through the source bus line is supplied to the pixel electrode 125 through the semiconductor layer 115 and the drain electrode 118. Further, an alignment film 127 is formed on the entire surface on the second interlayer insulating film 124 to cover the pixel electrode 125. The alignment film 127 has an alignment regulating force to horizontally align the liquid crystal molecules forming the liquid crystal layer 111.

Note that, the form of the TFT may be a top gate type TFT shown in FIG. 2, or may be a bottom gate type TFT.

On the other hand, a black matrix 130, a color filter 131, a planarization layer 132, a counter electrode 133, and an alignment film 134 are sequentially formed on the surface of the liquid crystal layer 111 side of the transparent substrate 129 constituting the color filter substrate 110. The black matrix 130 has a function of blocking the transmission of light in an inter-pixel region, and is made of a photo resist in which a metal such as a multilayer film of chromium (Cr) or Cr/oxide Cr, or carbon particles are dispersed in photosensitive resin. The color filter 131 includes dyes of the respective colors of red (R), green (G), and blue (B). The color filter 131 of any one of R, G, and B is arranged to face one pixel electrode 125 on the TFT substrate 19. Further, the color filter 131 may be composed of a multi-color structure having the three colors R, G, and B or more.

The planarization layer 132 is formed of an insulating film to cover the black matrix 130 and the color filter 131. The planarization layer 132 has a function of flattening to alleviate the steps that are created by the black matrix 130 and the color filter 131. The counter electrode 133 is formed on the planarization layer 132. As a material of the counter electrode 133, a transparent conductive material similar to that of the pixel electrode 125 is used. The alignment film 134 is formed on the entire surface of the counter electrode 133. The alignment film 134 includes an alignment regulating force to horizontally align the liquid crystal molecules forming the liquid crystal layer 111.

In the case of the present embodiment, as shown in FIG. 1, R, G, and B which are three colors of the color filters 131 are aligned in a horizontal direction (lateral direction) of the display screen of the liquid crystal panel 5.

Although not shown in FIG. 1, the backlight 18 includes, for example, a light source such as a light emitting diode, and a cold-cathode tube, a light guide plate, a reflector, a reflective sheet, and a prism sheet.

The light source is arranged on one end surface of the light guide plate. The light guide plate emits the light incident from the end surface from the front surface while propagating the light internally. In this manner, as the backlight, it is possible to use a backlight of an edge light type in which a light source is arranged on the end surface of the light guide plate. Alternatively, it is also possible to use a direct-type backlight in which there is no light guide plate and a plurality of light sources are arranged on the back surface side of the liquid crystal cell 15.

As shown in FIG. 1, a first polarizer 13 functioning as a polarizer is provided between the light control film 12 and the liquid crystal cell 15. Here, it is assumed that the azimuthal direction of each optic axis is represented at an angle viewed counterclockwise with the positive direction of the x-axis as a reference. The transmission axis P11 of the first polarizer 13 is set to 45° to 225° direction. A second polarizer 17 functioning as a polarizer is provided between the liquid crystal cell 15 and the backlight 18. The transmission axis P12 of the second polarizer 17 is arranged so as to be orthogonal to the transmission axis P11 of the first polarizer 13 and is set to 135° to 315° direction. The transmission axis P11 of the first polarizer 13 and the transmission axis P12 of the second polarizer 17 are arranged in crossed-Nicols.

The first retardation plate 14 is provided between the first polarizer 13 and the liquid crystal cell 15. The slow axis T11 of the first retardation plate 14 is arranged so as to be orthogonal to the transmission axis P11 of the first polarizer 13, and is set to 135° to 315° direction. The second retardation plate 16 is provided between the second polarizer 17 and the liquid crystal cell 15. The slow axis T12 of the second retardation plate 16 is arranged so as to be orthogonal to the transmission axis P11 of the second polarizer 17, and is set to 45° to 225° direction.

Next, the light control film 12 will be described in detail.

Figure 4:
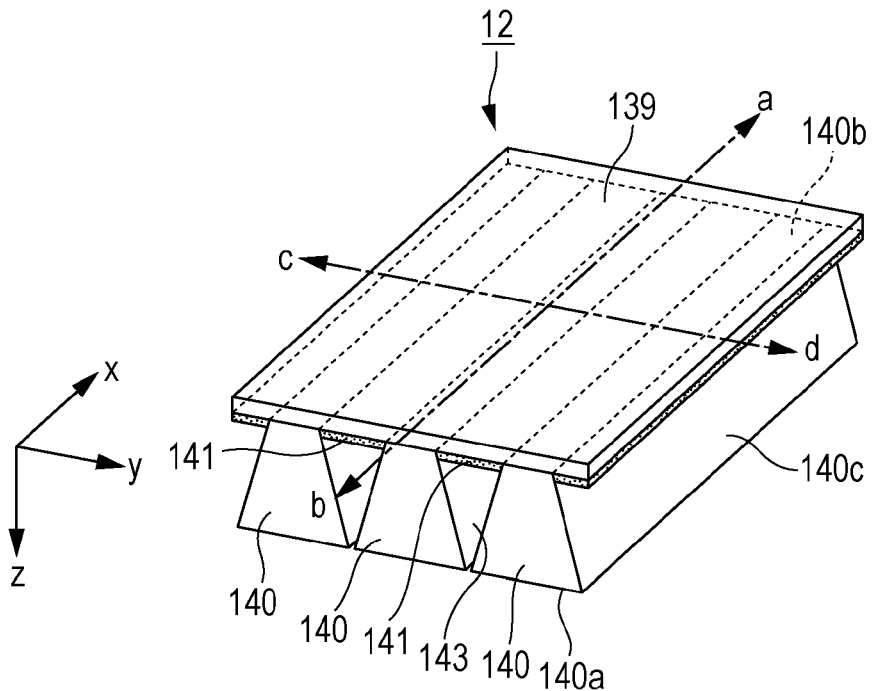
FIG. 4 is a perspective view showing a light control film in the liquid crystal display device.

FIG. 4 is a perspective view of the light control film 12 viewed obliquely from above on the viewing side.

As shown in FIG. 4, the light control film 7 is composed of a substrate 139, a plurality of light diffusion portions 140, and a light absorbing layer 141 (also referred to as a light shielding layer). The plurality of light diffusion portions 140 are formed on a surface (the surface on an opposite side to the viewing side) of the substrate 139. The light absorbing layer 141 is formed on a surface of the substrate 139. The light control film 12 is arranged on the first polarizer 13 in such a manner that the side on which the light diffusion portions 140 are provided faces the first polarizer 13, and the substrate 139 side faces the viewing side. The light control film 12 is fixed to the first polarizer 13 through an adhesive layer (not shown).

As the substrate 139, a substrate made of transparent resin such as a tri-acetyl cellulose (TAC) film, polyethylene terephthalate (PET), polycarbonate (PC), polyethylene naphthalate (PEN), and a polyether sulfone (PES) films is preferably used. Since the substrate 139 is used as a base when the materials of the light absorbing layer 141 and the light diffusion portion 140 are applied later in a manufacturing process, the substrate 139 needs to have heat resistance and mechanical strength during a heat treatment in the manufacturing process. Thus, a substrate made of glass may be used as the substrate 139, in addition the substrate made of resin. However, it is preferable that the thickness of the substrate 139 is as thin as possible such that heat resistance and mechanical strength are not impaired. The reason is because the thicker the thickness of the substrate 139 is, the greater the possibility of the occurrence of blurring of the display is. Further, it is preferable that the total light transmittance of the substrate 139 be 90% or more on the provision of JIS K7361-1. If the total light transmittance of the substrate 139 is 90% or more, sufficient transparency is achieved. In the present embodiment, for example, a substrate made of transparent resin of a thickness of 100 μm is used.

The light diffusion portion 140 is made of an organic material having light transmissivity and photosensitivity such as acrylic resin and epoxy resin. It is preferable that the total light transmittance of the light diffusion portion 140 be 90% or more on the provision of JIS K7361-1. The reason is because if the total light transmittance is 90% or more, sufficient transparency is achieved. With respect to the light diffusion portion 140, the shape of the horizontal cross section (xy section) is rectangular, the area of the rectangle on the substrate 139 side which is a light emission end surface is small, the area of the rectangle on the opposite side to the substrate 139 side which is the light incident end surface is great, and the area of the horizontal section is increased gradually toward the opposite side to the substrate 139 from the substrate 139 side. In other words, when viewed from the substrate 139 side, the light diffusion portion 140 has a shape of a truncated pyramid-shape which is a so-called inverse tapered shape. A side surface 140c being in contact with the light emission end surface 140b and the light incident end surface 140a of the light diffusion portion 140 is inclined with respect to the light emission end surface 140b and the light incident end surface 140a. The side surface 140c (also referred to as a reflecting surface)

functions as a reflecting surface for reflecting the light incident from the light incident end surface 140*a*. In the following description, the side surface of the light diffusion portion 140 is referred to as a reflecting surface 140*c*.

The plurality of light diffusion portions 140 are arranged parallel to each other at a predetermined distance extending in the same direction. In other words, the plurality of light diffusion portions 140 are formed in stripes. In the present embodiment, as shown in FIG. 1, the extending direction of the light diffusion portion 140 corresponds to the horizontal direction (lateral direction) of the display screen of the liquid crystal panel 113. Further, in FIG. 1, only the arrangements of the light diffusion portion 140 and the light absorbing layer 141 are shown in stripes.

In the following description, a direction parallel to the extending direction of the light diffusion portion 140 is referred to as an a-b direction and a direction perpendicular to the extending direction of the light diffusion portion 140 is referred to as a c-d direction.

The light diffusion portion 140 is a portion that contributes to the transmission of light in the light control film 12. In other words, the light incident on the light diffusion portion 140 is guided and emitted in a state of being almost confined inside the light diffusion portion 140, while being totally reflected on the reflecting surface 140*c* of the tapered light diffusion portion 140.

In the light control film 12, since the substrate 139 is arranged to face the viewing side, the surface having the smaller area is the light emission end surface 140*b*, and the surface of the larger area is the light incident end surface 140*a*, among two opposing surfaces of the light diffusion portion 140 of a truncated pyramid shape. Further, the inclination angle of the reflecting surface 140*c* of the light diffusion portion 140 (an angle α1 between the light incident end surface 140*a* and the reflecting surface 140*c* of FIG. 5) is about 80° as an example. However, it is preferable that the inclination angle α1 of the reflecting surface 140*c* be set such that light is diffused at a desired angle when emitted from the light control film 12, but is not particularly limited.

The light absorbing layer 141 is formed in a region other than the regions in which the plurality of light diffusion portions 140 are formed, on one surface of the substrate 139. Thus, in the case of the present embodiment, the plurality of the light absorbing layers 141 are formed in stripes. As an example, the light absorbing layer 141 is made of an organic material having light absorbing properties and photosensitivity such as black resist and a black ink. In addition, a metal film of chromium (Cr), or a multilayer film of Cr/Cr oxide may be used. The thickness of the light absorbing layer 141 is set to be smaller than the height from the light incident end surface 140*a* to the light emission end surface 140*b* of the light diffusion portion 140. In the case of the present embodiment, the thickness of the light absorbing layer 141 is, for example, 150 nm approximately, and the height from the light incident end surface 140*a* to the light emission end surface 140*b* of the light diffusion portion 140 is, for example, 20 μm approximately. With respect to the gap between the plurality of light diffusion portions 140, the light absorbing layer 141 is present in the portions in contact with one surface of the substrate 139, and air 143 is present in the other portions.

It is desirable that the refractive index of the substrate 139 and the refractive index of the light diffusion portion 140 be approximately equal. The reason is because if the refractive index of the substrate 139 and the refractive index of the light diffusion portion 140 are significantly different, there is a possibility of the occurrence of defects in that the refraction and reflection of the unnecessary light occurs in the interface between the light diffusion portion 140 and the substrate 139 when the light is about to be emitted from the light diffusion portion 140, and a desired viewing angle cannot be obtained, thus the amount of emitted light is reduced.

In the case of the present embodiment, since air 143 is interposed between the adjacent light diffusion portions 140, the light diffusion portion 140 is intended to be made of, for example, transparent acrylic resin, and the reflecting surface 140*c* of the light diffusion portion 140 is the interface between the transparent acrylic resin and the air 143. The vicinity of the light diffusion portion 140 may be filled with a low refractive index material other than air 143. However, the refractive index difference at the interface between the inside and the outside of the light diffusion portion 140 is maximum, when the air 143 is present outside, than when low refractive index material is present. Therefore, from Snell's Law, the critical angle is the smallest in the configuration of the present embodiment, and the incident angle range in which light is totally reflected on the reflecting surface 140*c* of the light diffusion portion 140 is widest. As a result, the loss of light is further suppressed, and thus it is possible to obtain a high luminance.

Figure 5:
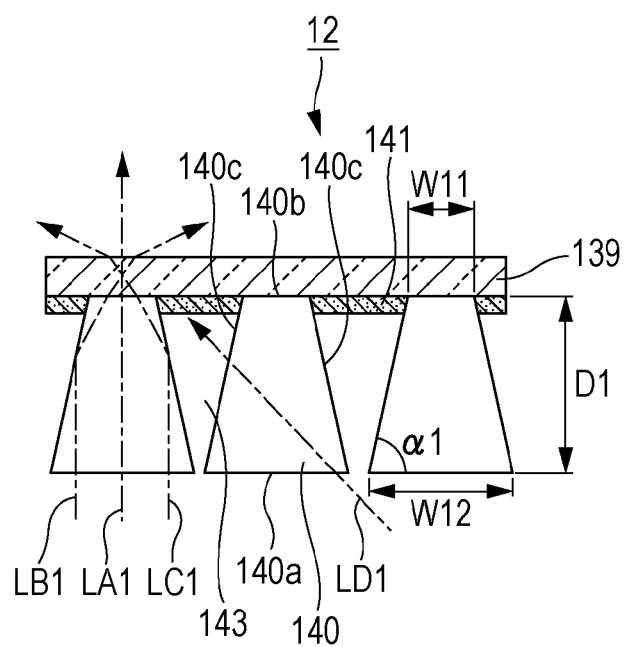
FIG. 5 is a diagram describing behavior of light in the light control film.

As indicated by arrows LB1 and LC1 in FIG. 5, the incident light which is incident on the reflecting surface 140*c* of the light diffusion portion 140 at an angle greater than the critical angle is totally reflected on the reflecting surface 140*c*, is transmitted through the light diffusion portion 140 and is emitted to the observer side. Further, as indicated by an arrow LA1 of FIG. 5, the incident light passing vertically through the central portion of the light diffusion portion 140 without being incident on the reflecting surface 140*c* is emitted to the observer side as it is. Meanwhile, as indicated by an arrow LD1 of FIG. 5, the incident light which is incident on the reflecting surface 140*c* of the light diffusion portion 140 at an angle equal to or less than the critical angle is transmitted through the reflecting surface 140*c* of the light diffusion portion 140 without being totally reflected. At this time, since the light absorbing layer 141 is provided in a region other than the regions in which the light diffusion portions 140 are formed, the light transmitted through the reflecting surface 140*c* of the light diffusion portion 140 is absorbed by the light absorbing layer 141. However, if the light transmitted through the reflecting surface 140*c* of the light diffusion portion 140 is increased, a reduction in the light amount occurs, and thus an image of high luminance cannot be obtained. Therefore, it is preferable to use a backlight, that is, a so-called backlight having a directivity that emits light at an angle in which the light is not incident on the reflecting surface 140*c* of the light diffusion portion 140 at an angle equal to or less than the critical angle.

The anisotropy of the light diffusion of the light control film 12 of the present embodiment will be described.

When the light diffusion portion 140 is viewed from a direction parallel to the extending direction of the light diffusion portion 140 (a-b direction in FIG. 4), as described with reference to FIG. 5, the light incident on the light diffusion portion 140 of the light control film 12 is reflected on the reflecting surface 140*c*, is diffused at an angle wider than that before entering the light diffusion portion 140, and is emitted from the light control film 12. On the other hand, when the light diffusion portion 140 is viewed from a direction perpendicular to the extending direction of the light diffusion portion 140 (c-d direction in FIG. 4), the reflecting surface is present only at both ends of the light diffusion portion 140 which extends lengthwise. Therefore, the light diffusion portion 140 has very little diffusion effect of light in a direction parallel to the extending direction of the light diffusion portion 140. In other words, the light control film 12 of the present embodiment has high diffusivity in the c-d direction, that is, in a direction perpendicular to the extending direction of the light diffusion portion 140 (arrangement direction of the plurality of light diffusion portions 140), and hardly has diffusivity in the a-b direction, that is, in a direction parallel to the extending direction of the light diffusion portion 140. The light control film 12 exhibits the anisotropy of light diffusion in this manner.

Here, a polar angle used in the following description, that is, an azimuth will be described.

Figure 7:
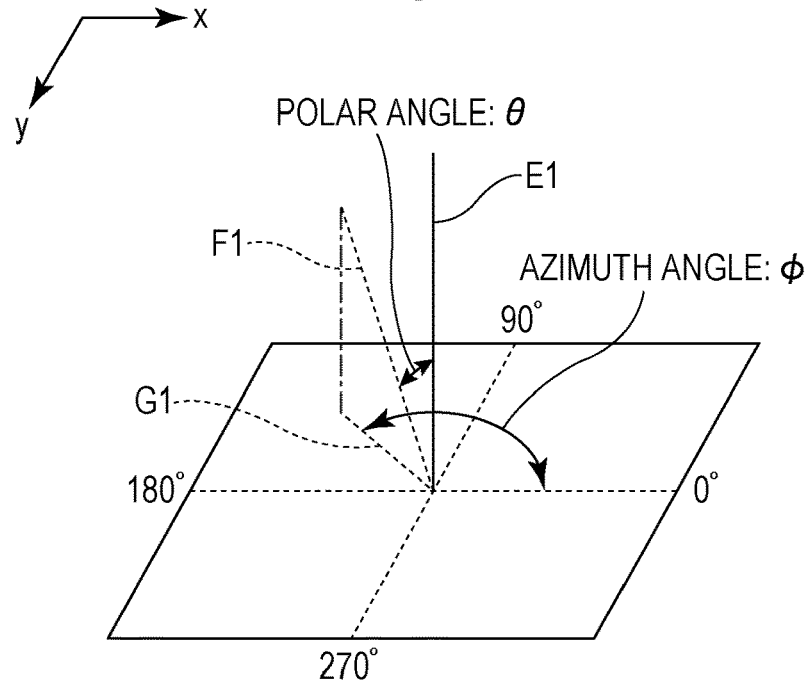
FIG. 7 is a diagram describing definition of a polar angle and an azimuth angle.

As shown in FIG. 7, the angle formed by the viewing direction F1 of the observer with the normal direction E1 of the screen of the liquid crystal display device 11 as a reference is set to a polar angle θ, and the angle formed by the direction of a line segment G1 when the viewing direction F1 of the observer with the positive direction of the x-axis (0° direction) as a reference is projected on the screen (angle viewed counterclockwise from the 0° direction) is set to an azimuth φ.

Figure 6:
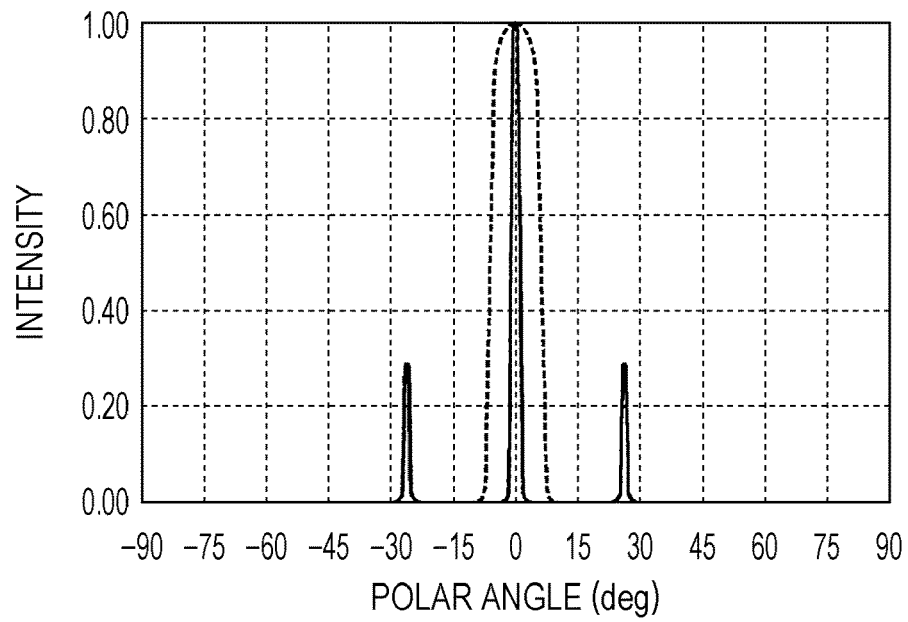
FIG. 6 is a diagram in which light diffusion characteristics of the light control film and an isotropic scattering film in the related art are compared.

FIG. 6 is a diagram in which examples of the light diffusion characteristics of the light control film 12 of the present embodiment and an isotropic scattering film in the related art are compared. The horizontal axis of FIG. 6 shows a polar angle [degree], and the vertical axis of FIG. 6 shows the intensity of the diffused light [relative value]. The solid lines in FIG. 6 show the light diffusion characteristics of the light control film 12 of the present embodiment. The dashed lines in FIG. 6 show the light diffusion characteristics of the isotropic scattering film in the related art.

In FIG. 6, the light diffusion characteristics of the light control film 12 of the present embodiment have been obtained by the present inventors performing simulation in practice. As simulation software, Light Tools is used. As a parameter of calculation, the opening width (sign W11 in FIG. 5) of the light incident end surface 140a of the light diffusion portion 140 is set to 9 μm, the opening width (sign W12 in FIG. 5) of the light emission end surface 140b is set to 15 μm, the height (sign D1 in FIG. 5) of the light diffusion portion 140 is set to 20 μm, and the inclination angle (sign α1 in FIG. 5) of the reflecting surface 140c is set to 81.5°, and the aperture ratio of the light emission end surface 140b is set to 60%.

In the isotropic scattering film in the related art, the degree of light scattering does not change in any azimuthal direction. Therefore, the light diffusion characteristics, as shown by a broken line in FIG. 6, have an area of high intensity of the diffused light which is distributed symmetrically within the range of about ±10°, with a peak centered on the polar angle 0°. In the case of the isotropic scattering film, all rays of light are diffused, but are not spread significantly to the wide-angle side. In the isotropic scattering film, if the degree of scattering is increased, the luminance viewing angle is improved, but blurring of a displayed image occurs significantly. As a result, display quality is reduced.

In contrast, in the simulation result of the light control film 12 of the present embodiment, the light diffusion characteristics, as shown by the solid line in FIG. 6, have an area in which the intensity of the diffused light represents the highest peak value in a narrower range centered on the polar angle 0°. Furthermore, through the action in which the light reflected on the reflecting surface 140c of the light diffusion portion 140 is diffused into the wide angle side, an area having a high intensity of diffused light (area representing the intensity of approximately 0.3 for the peak value 1) appears in the vicinity of the polar angle ±30°. Through this action, as will be described later, it is possible to enhance display quality by combining luminance viewing angle characteristics of the liquid crystal panel 113.

Returning to FIG. 1, the alignment film of the TFT substrate 19 is subjected to an alignment treatment such as rubbing such that an alignment control direction is a direction of 135°→315°. The alignment control direction of the alignment film is indicated by the arrow R12. The alignment film of the color filter substrate 110 is subjected to an alignment treatment such as rubbing such that an alignment control direction is a direction of 45°→225°. The alignment control direction of the alignment film is indicated by the arrow R11.

Figure 9:
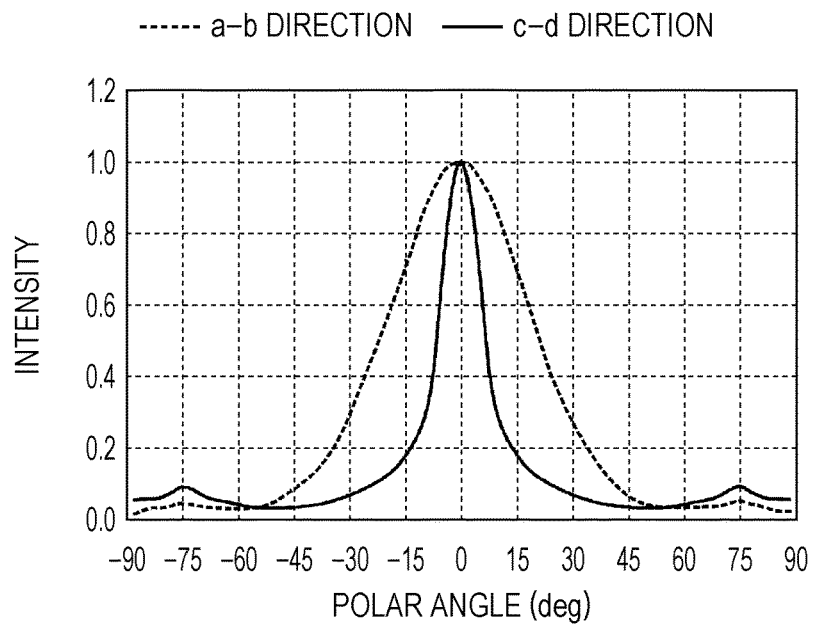
FIG. 9 is a graph showing an intensity distribution of a backlight in the liquid crystal display device.

The backlight 18 of the present embodiment emits light having one-axis directivity. In other words, the backlight 18 has different light distributions in two orthogonal azimuthal directions. FIG. 9 is a graph illustrating intensity distribution of the backlight 18. The horizontal axis of FIG. 9 shows a polar angle [degree], and the vertical axis of FIG. 9 shows the intensity of the diffused light [relative value]. The light distribution in the azimuth φ: 0° to 180° direction of the backlight 18 (a-b direction) is large, and the light distribution in the azimuth φ: 90° to 270° direction (c-d direction) is narrow.

The operation of the liquid crystal panel 113 of the TN mode will be described.

Figure 3A:
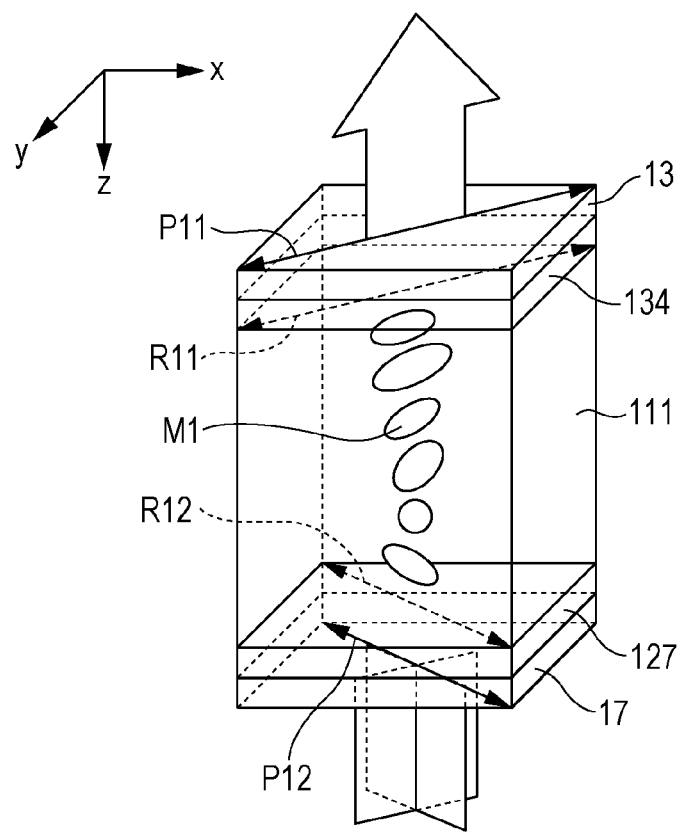
FIG. 3A is a diagram describing an operation of a liquid crystal panel.
Figure 3B:
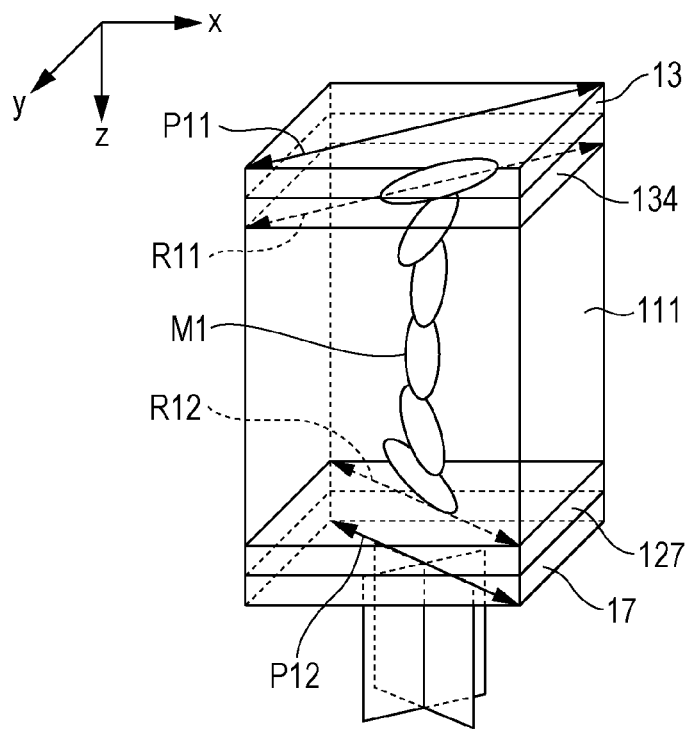
FIG. 3B is a diagram describing the operation of the liquid crystal panel.

FIGS. 3A and 3B are diagrams for describing the operation of the liquid crystal panel 113.

FIG. 3A is a diagram showing a state when a voltage is not applied (when no voltage is applied) to the liquid crystal panel 113 (between the pixel electrode 125 and the counter electrode 133 shown in FIGS. 3A and 3B). FIG. 3B is a diagram showing a state when a constant voltage is applied (when a voltage is applied) to the liquid crystal panel 113. In addition, in FIGS. 3A and 3B, for the sake of convenience, the first retardation film 16 and the second retardation film 14 are not illustrated. The sign M indicates the liquid crystal molecules of the liquid crystal layer 111.

When a voltage is not applied between the pixel electrode 125 and the counter electrode 133, as shown in FIG. 3A, the liquid crystal molecules M forming the liquid crystal layer 111 are in a state of being twisted 90° between the two alignment films 127 and 134. At this time, the polarization plane of linearly polarized light transmitted through the second polarizer 17 having the transmission axis P12 of 135° to 315° direction is rotated 90° by optical rotation of the liquid crystal layer 111, and the light is transmitted through the first polarizer 13 having the transmission axis P11 of 45° to 225° direction. As a result, white display is performed when no voltage is applied.

When a voltage is applied between the pixel electrode 125 and the counter electrode 133, as shown in FIG. 3B, the liquid crystal molecules M forming the liquid crystal layer 111 are in a state of being stood up in the direction along the electric field between the two alignment films 127 and 134. At this time, since the polarization plane of linearly polarized light transmitted through the second polarizer 17 having the transmission axis P12 of 135° to 315° direction is not rotated, the light is not transmitted through the first polarizer 13 having the transmission axis P11 of 45° to 225° direction. As a result, black display is performed when a voltage is applied. As described above, it is possible to display an image while switching the white display and the black display by controlling the application/non-application of a voltage for each pixel.

However, since the liquid crystal molecules M are aligned in a state of being twisted 90°, the retardation of the liquid crystal is different depending on the angle of observation and the gray scale. Thus, the luminance of the white display is different depending on the angle of observation.

Figure 8A:
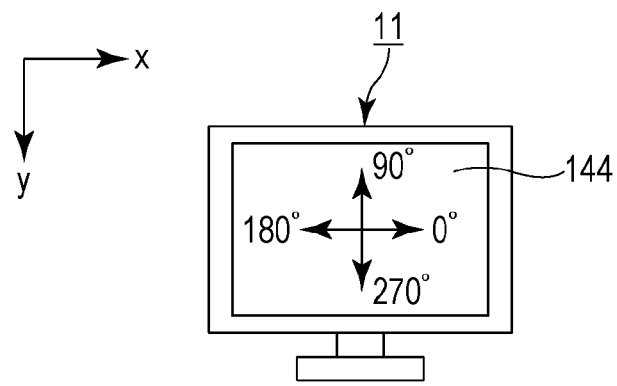
FIG. 8A is a front view of the liquid crystal display device.
Figure 8B:
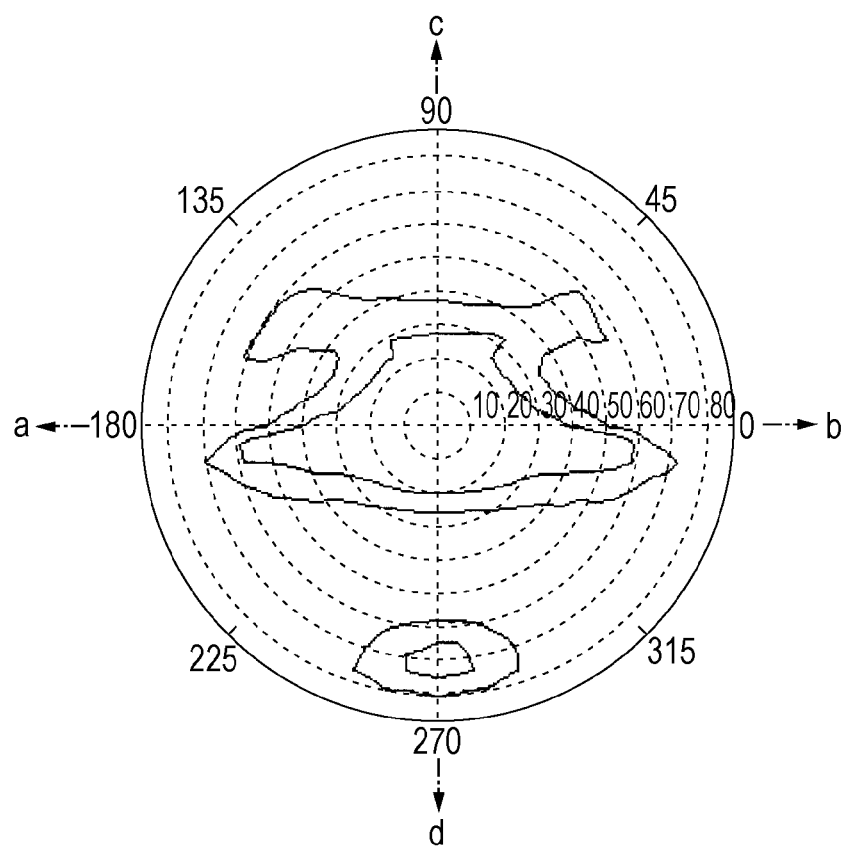
FIG. 8B is a diagram showing iso-luminance curves showing luminance viewing angle characteristics at the time of white display.

As shown in FIG. 8A, in the screen 114 of the liquid crystal display device 11, the horizontal direction (x-axis direction) is set to the azimuth φ: 0° to 180° direction (a-b direction), and the vertical direction (y-axis direction) is set to the azimuth φ: 90° to 270° direction (c-d direction). At this time, the luminance distribution in the azimuthal direction of the liquid crystal panel 5, the so-called luminance viewing angle characteristics, is as shown in FIG. 8B. In other words, an iso-luminance curve has a rotationally asymmetric shape, and represents a shape which extends in the azimuth φ: 0° to 180° direction, and is crushed in the azimuth φ: 90° to 270° direction. In other words, the luminance viewing angle of the liquid crystal panel 113 of the present embodiment is relatively narrow in the azimuth φ: 90° to 270° direction (c-d direction), and is relatively wide in the azimuth φ: 0° to 180° direction (a-b direction). In the following drawings including FIG. 8B, the viewing angle luminance characteristics are represented by contour lines connecting the same luminance, and it is shown that the closer to the center, the higher the luminance is.

Here, the luminance viewing angle characteristic may mean a change in the light transmittance in the polar angle direction when applying a constant voltage to the liquid crystal panel 113. In other words, with respect to the liquid crystal panel 113 of the present embodiment, the change in the light transmittance in the polar angle direction is relatively large in the azimuth φ: 90° to 270° direction (c-d direction), and the change in the light transmittance in the polar angle direction is relatively small in the azimuth φ: 0° to 180° direction (a-b direction).

In this embodiment, the azimuthal direction in which the luminance viewing angle of the liquid crystal panel 113 is narrow and the azimuthal direction in which the diffusivity of the light control film 12 is high are made to coincide with the azimuth φ: 90° to 270° direction (c-d direction). At this time, the azimuthal direction in which the light distribution of the backlight 18 is narrow and the azimuthal direction in which the luminance viewing angles of the liquid crystal cell 15 and the polarization plate are narrow (the azimuthal direction in which the diffusivity of the light control film 12 is high) are made to coincide. In other words, the azimuthal direction in which the luminance viewing angle of the liquid crystal cell 15 and the polarizer is wide, and the azimuthal direction in which the light distribution of the backlight 18 is wide are made to coincide.

In this manner, by making the azimuthal direction in which the diffusivity of the light control film 12 is high coincide with the azimuthal direction in which the luminance viewing angle of the liquid crystal panel 113 is narrow, the light emitted from the liquid crystal display device 11 in the azimuthal direction is diffused into a wider angle compared to the light emitted in another azimuthal direction. Further, since the azimuthal direction in which the luminance viewing angles of the liquid crystal cell 15 and the polarization plate are wide is made to coincide with the azimuthal direction in which the light distribution of the backlight 18 is narrow, a decrease in the luminance is suppressed in the azimuthal direction in which the luminance viewing angles of the liquid crystal cell 15 are good.

As a result, it is possible to realize a liquid crystal display device excellent in luminance viewing angle characteristics in which the narrowness of the luminance viewing angle of the liquid crystal cell 15 in the azimuthal direction is improved.

Figure 10:
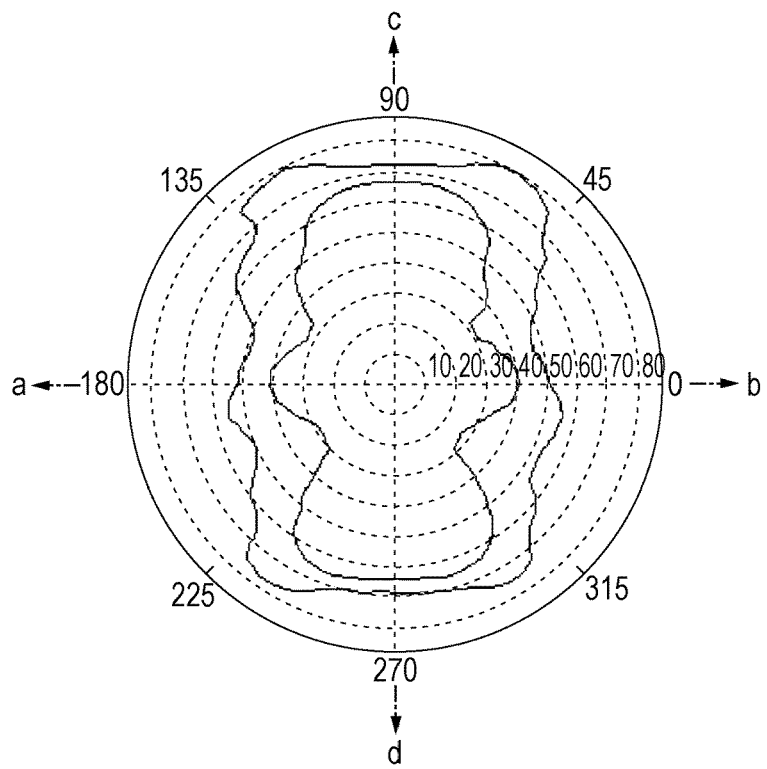
FIG. 10 is a diagram showing luminance viewing angle characteristics of the liquid crystal display device of the present embodiment.

The measurement results of the luminance viewing angle characteristics of the white display in the liquid crystal display device 11 of the present embodiment is shown in FIG. 10.

The measurement is performed in the liquid crystal panel of a TN-mode in which liquid crystal molecules are twisted 90° between the upper and lower substrates. The measurement is performed under the following conditions. The rubbing direction of the lower substrate is set to 135°→315° direction. The rubbing direction of the upper substrate is set to 45°→225° direction. The retardation of the liquid crystal layer (Δnd) is approximately 390 nm (transmittance of the green light is maximum). An iodine polarizer is used as the upper and lower polarizers. The absorption axis of the upper polarizer is set to a 45° to 225° direction. The absorption axis of the lower polarizer is set to 135° to 315° direction. The upper and lower retardation plates are biaxial retardation plates. An NZ coefficient (=(ns−nz)/(ns−nf), ns: a refractive index of a slow axis direction, nf: a refractive index of a fast axis direction, and nz: a refractive index in the z-axis direction) is about 2.8. The retardation in the plane is set to about 60 nm, and the slow axis of the upper retardation plate is set to the 135° to 315° direction. The slow axis of the lower retardation plate is set to the 45° to 225° direction.

As shown in FIG. 8B, the iso-luminance curve extends lengthwise in the azimuth φ: 0° to 180° direction (a-b direction), the luminance viewing angle is relatively narrow in the azimuth φ: 90° to 270° direction (c-d direction), and relatively wide in the azimuth φ: 0° to 180° direction (a-b direction). In contrast, in the luminance viewing angle characteristics of the entire liquid crystal display device in which the light control film is combined with the liquid crystal panel, as shown in FIG. 10, it is ascertained that an area having high luminance is wide in the 90° to 270° direction (c-d direction), and the luminance viewing angle characteristics, in particular, the luminance viewing angle characteristics in the vertical direction of the screen can be improved.

Figure 11:
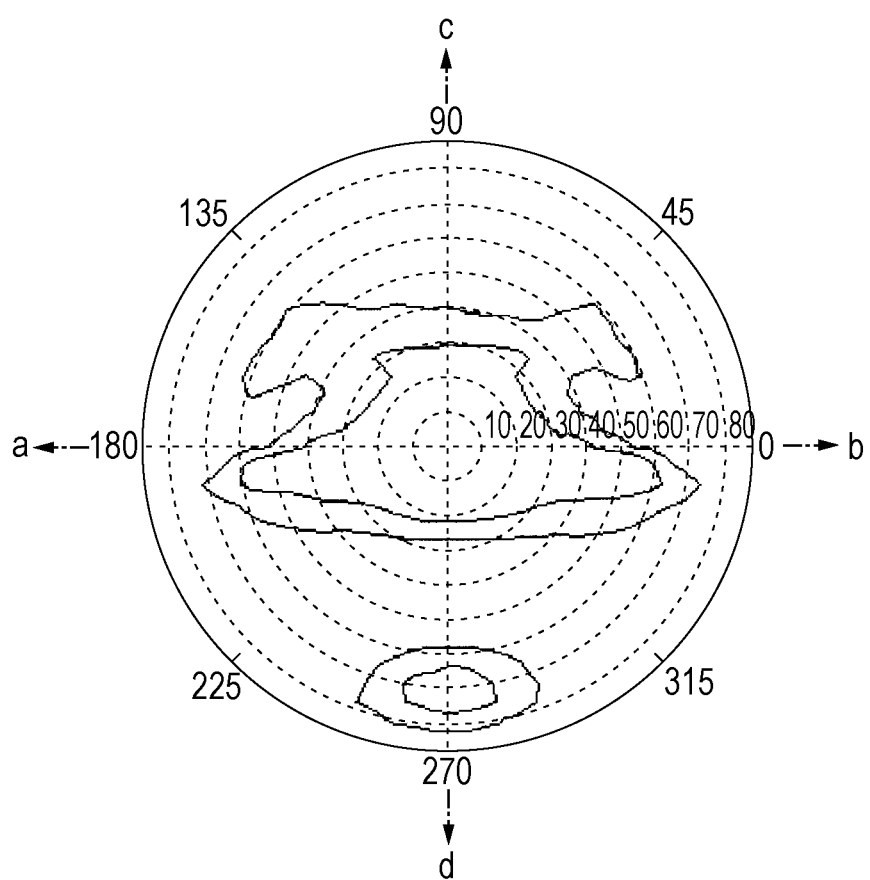
FIG. 11 is a diagram showing luminance viewing angle characteristics of a liquid crystal display device in the related art.

As a comparative example, FIG. 11 illustrates the simulation results of the luminance viewing angle characteristics in the white display state of the liquid crystal display device in which the isotropic scattering film is combined with the same liquid crystal panel. As described above, the isotropic scattering film causes all rays of light to be diffused, but does not have a function of significantly diffusing the light to a wide angle side. As a result, FIG. 11 is hardly changed from FIG. 8B, even if the isotropic scattering film is combined, and it is determined that it is not possible to improve the biased luminance viewing angle characteristics of the liquid crystal panel.

First Modification Example of Light Control Film

Instead of the light control film used in the liquid crystal display device of the above embodiment, a light control film shown below may be used.

Figure 12A:
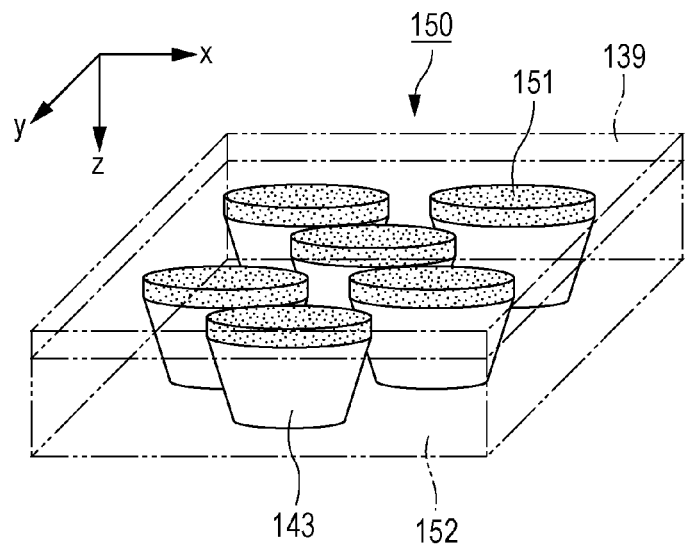
FIG. 12A is a perspective view showing a first modification example of the light control film.
Figure 12B:
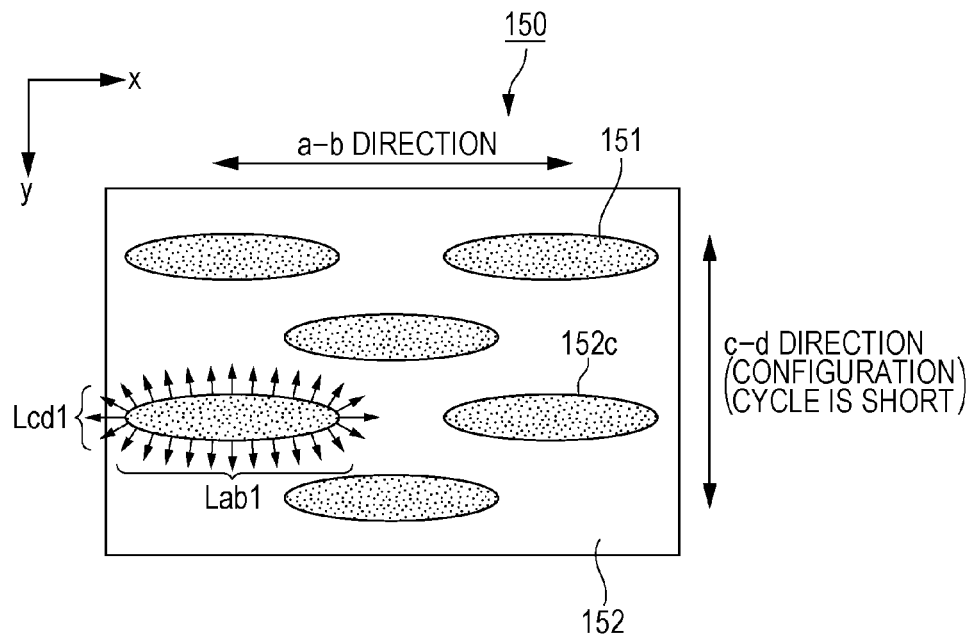
FIG. 12B is a plan view showing the first modification example of the light control film.

FIG. 12A is a perspective view showing a light control film 150 of a first modification example. FIG. 12B is a plan view showing the light control film 150 of the first modification example.

In the case of the light control film 12 of the above embodiment, the plurality of light diffusion portions 140 are formed in stripes. In contrast, in the light control film 150 of the present modification example, as shown in FIGS. 12A and 12B, the plurality of light absorbing layers 151 are provided while being scattered on one surface of the substrate 139. The planar shape of the light absorbing layer 151 as viewed from the direction normal to the substrate 139 is an elongated ellipse, and has a major axis and a minor axis. A portion corresponding to the lower portion of the light absorbing layer 151 is a space of a truncated elliptical cone shape, and air 143 is present in this space. The light control film 150 has a plurality of spaces in which air is present, and light diffusion portions 152 are continuously provided in the portion other than the plurality of spaces.

As shown in FIG. 12B, the major axis directions of the plurality of light absorbing layers 151 are approximately aligned in the a-b direction. The minor axis directions of the plurality of light absorbing layers 151 are approximately aligned in the c-d direction. Therefore, considering the orientation of the reflecting surface 152c of the light diffusion portion 152, the proportion of the reflecting surfaces 152c along the a-b direction, among the reflecting surfaces 152c of the light diffusion portions 152, is greater than the proportion of the reflecting surfaces 152c along the c-d direction. Therefore, the amount of the light Lab1 that is reflected on the reflecting surface 152c along the a-b direction and is diffused into the c-d direction is larger than that the light Lcd1 that is reflected on the reflecting surface 152c along the c-d direction and spreads to the a-b direction. Accordingly, the azimuthal direction in which diffusivity of the light control film 150 is relatively high is the c-d direction which is the minor axis direction of the light absorbing layer 151. In other words, the a-b direction may be the direction in which the period of the light diffusion structure is long, and the c-d direction may be the direction in which the period of the light diffusion structure is short. Therefore, the azimuthal direction in which diffusivity of the light control film 150 is relatively high may be the c-d direction in which the period of the light diffusion structure is short.

Second Modification Example of Light Control Film

Figure 13:
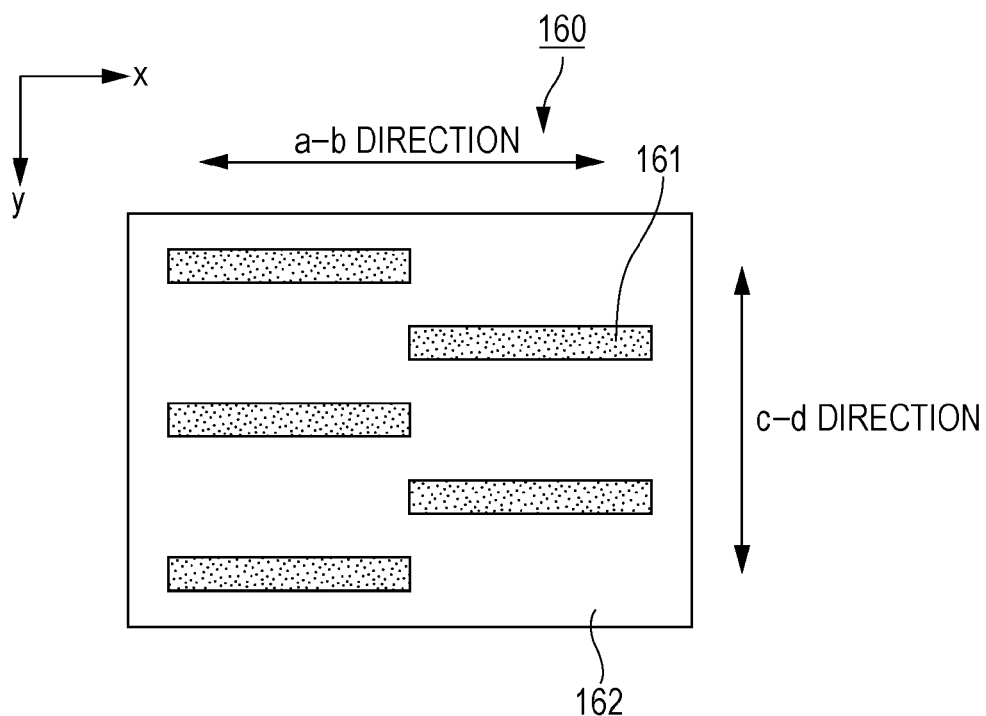
FIG. 13 is a plan view showing a second modification example of the light control film.

FIG. 13 is a plan view showing a light control film 160 of the second modification example.

In the first modification example, the shape of the light absorbing layer 151 is elliptical, but as shown in FIG. 13, with respect to the light control film 160 of this modification example, the planar shape of the light absorbing layer 161 as viewed from the direction normal to the substrate is an elongated rectangle. The long axes (long sides) of the plurality of light absorbing layers 161 are aligned in the a-b direction approximately. The short axes (short sides) of the plurality of light absorbing layers 161 are aligned in the c-d direction approximately. Therefore, even in the case of the present modification example, similarly to the first modification example, the azimuthal direction in which diffusivity of the light control film 160 is relatively high is the c-d direction which is the minor axis direction of the light absorbing layer 161. There are spaces of a truncated pyramid shape below the light absorbing layers 161, and the other regions are the light diffusion portions 162.

Figure 14:
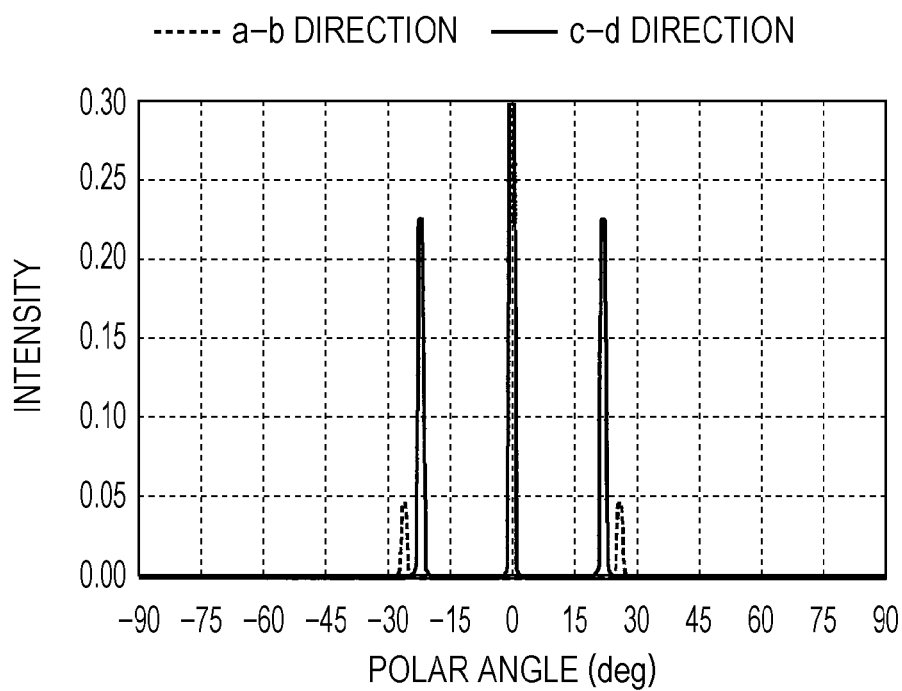
FIG. 14 is a diagram showing an example of light diffusion characteristics of the light control film of the first and second modification examples.

In the case of the light control films 150 and 160 of the first and second variation examples, differently from the light control film 12 of the first embodiment, weak diffusion is shown in the major axis direction (a-b direction) of the light absorbing layers 151 and 161. Then, since the amount of light diffused in the c-d direction is larger than the amount of light diffused in the a-b direction, the light diffusion characteristics are, for example, those as shown in FIG. 14. In the light diffusivity, there is an area indicating a peak value having the highest intensity of the diffused light about the polar angle 0°. Furthermore, through the action in which the light reflected on the reflecting surfaces of the light diffusion portions 152 and 162 is diffused into the wide-angle side, an area having a high intensity of the diffused light appears at the vicinity of the polar angle ±20 to 30°. If the peak on the wide angle side is viewed from each direction, the intensity of the light in the c-d direction is higher than the intensity of the light in the a-b direction.

Third Modification Example of Light Control Film

Figure 15A:
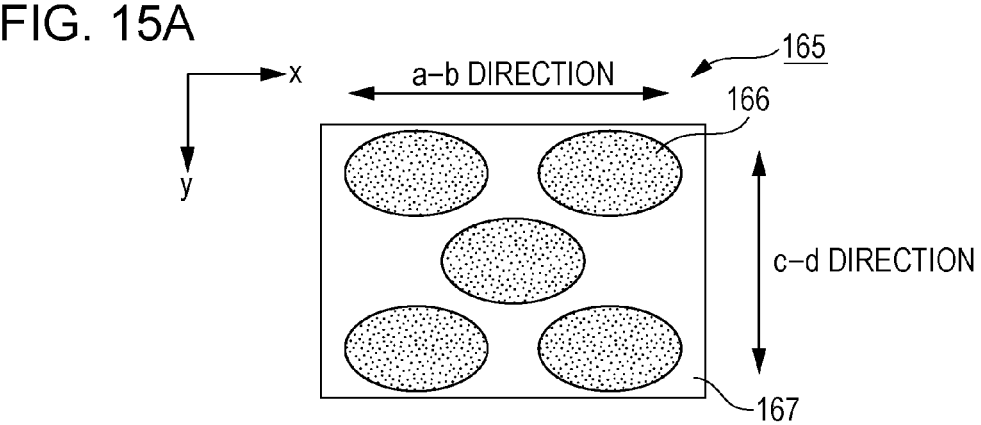
FIG. 15A is a plan view showing a third modification example of the light control film.

FIG. 15A is a plan view showing a light control film 165 of the third modification example. As the light control film 165 of this modification example, the planar shape of the light absorbing layer 166 is not elongated as in the first modification example, and may be an ellipse similar to a circle. As long as the planar shape is an ellipse even if it is similar to the circle, the light absorbing layer 166 has a major axis and a minor axis. Therefore, even in the case of the light control film 165 of the present modification example, the azimuthal direction having a relatively high diffusivity is the c-d direction which is the minor axis direction of the light absorbing layer 166. There are spaces of a truncated elliptical cone shape below the light absorbing layers 166, and the other regions are the light diffusion portions 167.

Fourth Modification Example of Light Control Film

Figure 15B:
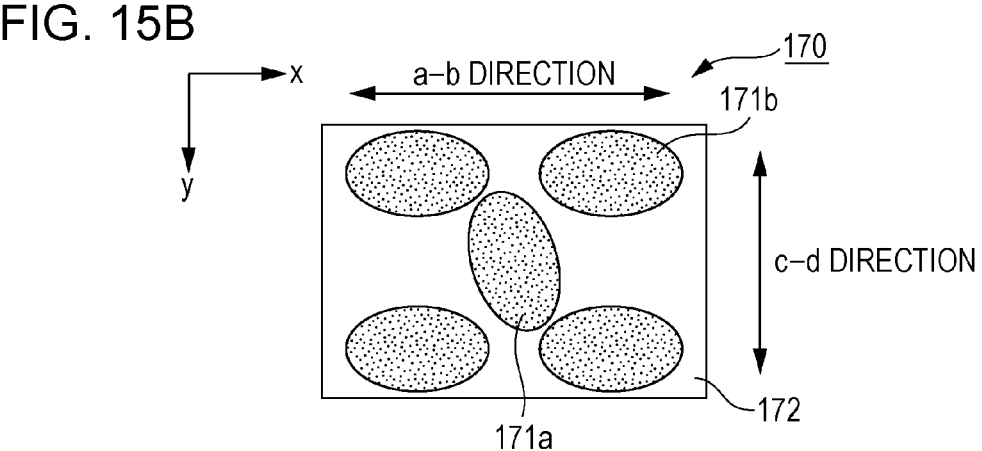
FIG. 15B is a plan view showing a fourth modification example of the light control film.

FIG. 15B is a plan view showing a light control film 170 of the fourth modification example. It is not necessary that all light absorbing layers 171a and 171b do not necessarily face the same direction, as in a light control film 170 of the present modification example, some light absorbing layers 171a may face a direction different from that of another light absorbing layer 171b. In the case of the light control film 170 of the present modification example, in the light absorbing layer 171b, the major axis direction faces the a-b direction, and the minor axis direction faces the c-d direction. Therefore, the azimuthal direction in which diffusivity of the light control film 170 is relatively high is the c-d direction which is the minor axis direction of most light absorbing layers 171b. There are spaces of a truncated elliptical cone shape below the light absorbing layers 171a and 171b, and the other regions are the light diffusion portions 172.

Fifth Modification Example of Light Control Film

Figure 15C:
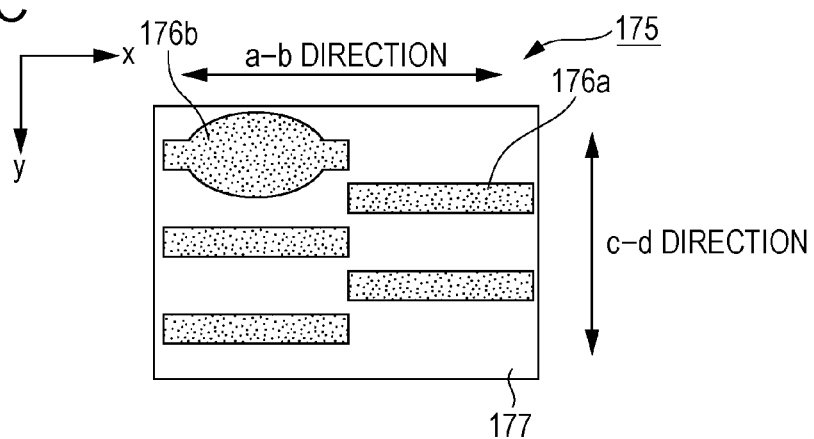
FIG. 15C is a plan view showing a fifth modification example of the light control film.

FIG. 15C is a plan view showing a light control film 75 of the fifth modification example. As the light control film 175 of the present modification example, it is not necessary that the planar shapes of all the light absorbing layers 176a and 176b are not necessarily the same, and the light absorbing layer 176b having different planar shapes may be mixed. In the light control film 175 of the present modification example, although the planar shapes of the light absorbing layers 176a and 176b are different, the major axis direction faces the a-b direction, and the minor axis direction faces the c-d direction. Therefore, even in the case of the light control film 175 of the present modification example, the azimuthal direction in which diffusivity is relatively high is the c-d direction which is the minor axis direction of the plurality of light absorbing layers. There are spaces below the light absorbing layers 176a and 176b, and the other regions are the light diffusion portions 177.

In the case of using the light control films 150, 160, 165, 170, and 175 of the first modification example to the fifth modification example exemplified above, the same effects as those of the first embodiment in which the improvement of the luminance viewing angle characteristics is intended is achieved by making the azimuthal direction in which diffusivity is relatively high coincide with the azimuthal direction having a narrow luminance viewing angle of the liquid crystal panel 113.

Second Embodiment

Hereinafter, a second embodiment of the present invention will be described with reference to FIG. 16.

The basic configuration of a liquid crystal display device of the present embodiment is the same as that of the first embodiment, and the light distribution characteristics of the backlight are different from those of the first embodiment.

Figure 16:
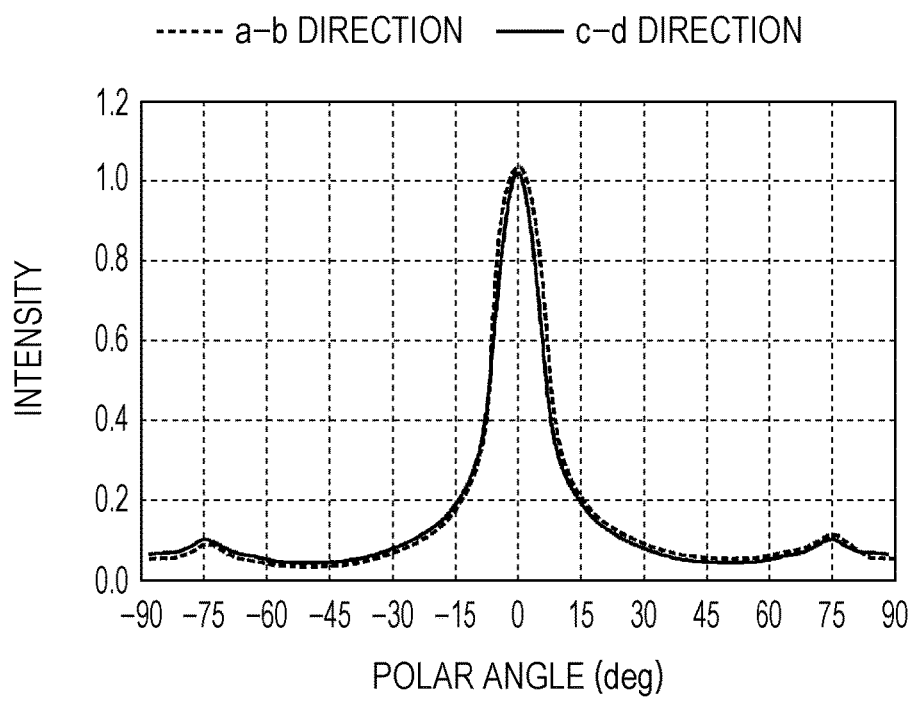
FIG. 16 is a graph showing an intensity distribution of a backlight in a liquid crystal display device of a second embodiment.

FIG. 16 is a graph showing the intensity distribution of the backlight used in the liquid crystal display device of the present embodiment. The horizontal axis of FIG. 16 shows a polar angle [degree], and the vertical axis of FIG. 16 shows the intensity [relative value].

As shown in FIG. 9, the backlight 18 of the first embodiment has one-axis directivity, the light distribution in the azimuth φ: 0° to 180° direction of the backlight 18 (a-b direction) is large, and the light distribution in the azimuth φ: 90° to 270° direction (c-d direction) is narrow. In contrast, as shown in FIG. 16, the backlight of the present embodiment is a backlight having two-axis directivity. The light distribution in the azimuth φ: 0° to 180° direction of the backlight 18 (a-b direction) and the light distribution in the azimuth φ: 90° to 270° direction (c-d direction) are narrow, and are consistent. For that matter, in all azimuthal directions other than two axes, the light distribution is narrow, and has directivity.

Even in the present embodiment, the same effect as that of the first embodiment is achieved in which the luminance viewing angle characteristics are improved by optimizing the arrangement of the light control film and the liquid crystal panel. Further, unlike the first embodiment, from the backlight, light focused in the azimuthal direction in which the luminance viewing angle of the liquid crystal panel is wide is emitted. Thus, it is possible to increase the luminance in the screen front direction of the liquid crystal display device.

Third Embodiment

Hereinafter, a third embodiment of the present invention will be described with reference to FIG. 17.

The basic configuration of a liquid crystal display device of the present embodiment is the same as that of the first embodiment, and the configuration of the light control film is different from that of the first embodiment.

Figure 17:
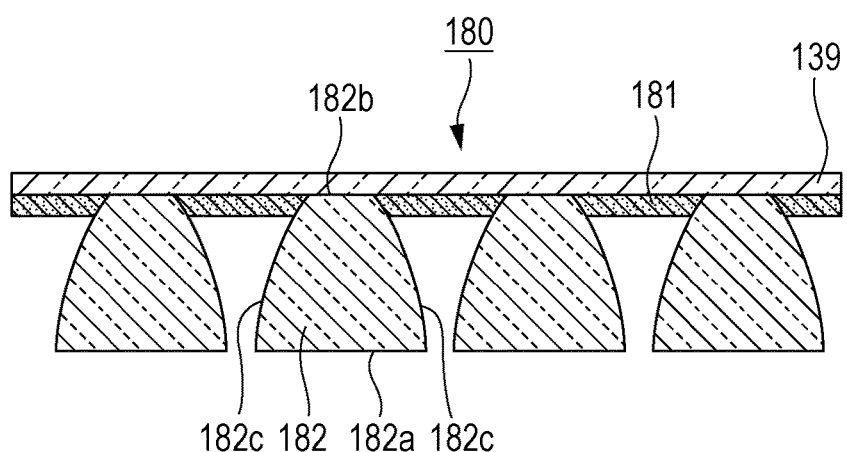
FIG. 17 is a cross-sectional view of a light control film in a liquid crystal display device of a third embodiment.

FIG. 17 is a cross-sectional view showing a light control film used in the liquid crystal display device of the present embodiment.

In FIG. 17, the same reference numerals are given to components in common with FIGS. 4 and 5 used in the first embodiment, and detailed description thereof will be omitted.

In the first embodiment, when it is focused on one light diffusion portion 140, the reflecting surface 140c of the light diffusion portion 140 has a constant inclination angle irrespective of the location. In contrast, as shown in FIG. 17, in the light control film 180 of the present embodiment, the reflecting surface 182c of the light diffusion portion 182 is smoothly curved so as to project outwardly toward the light incident end surface 182a from the light emission end surface 182b. In other words, the inclination angle of the reflecting surface 182c is different depending on the location in one light diffusion portion 182. The reference numeral 181 shows a light absorbing layer.

In the present embodiment, the same effect as that of the first embodiment is achieved in which the luminance viewing angle characteristics are improved by optimizing the arrangement of the light control film 180 and the liquid crystal panel 113.

Further, if the inclination angle of the reflecting surface 140c of the light diffusion portion 140 is constant as in the first embodiment, when changing the viewing angle along a horizontal direction or a vertical direction of the screen, luminance irregularities are viewed depending on the observation angle in some cases. In contrast, in the light control film 180 of the present embodiment, the inclination angle is different depending on the location of the reflecting surface 182c in each light diffusion portion 182.

Therefore, the reflection angle distribution of the light spreads as compared with the case in which the inclination angle of the reflecting surface is constant. Thus, the luminance is smoothly changed depending on the observation angle, and it is possible to improve the viewing angle characteristics.

In the present embodiment, an example of changing the inclination angle of the reflecting surface 182c in one light diffusion portion 182 is provided, but instead of this configuration, the inclination angle of the reflecting surface in one light diffusion portion is constant, and the inclination angle of the reflecting surface between a plurality light diffusion portions included in one pixel may be changed. There is a limit for changing the inclination angle of the reflecting surface at one light diffusion portion, for example, if it is assumed that the inclination angle is changed in a wide range such as 65° to 85°, fabrication of the light diffusion portion becomes difficult. Further, the control of the angle is also difficult. In this case, if the inclination angle of the reflecting surface between a plurality light diffusion portions is changed, the fabrication of the light diffusion portion becomes easy, and the control of the angle is facilitated.

Fourth Embodiment

Hereinafter, a fourth embodiment of the present invention will be described with reference to FIGS. 18 and 19.

The basic configuration of a liquid crystal display device of the present embodiment is the same as that of the first embodiment, but the arrangement of a color filter is different from that of the first embodiment.

Figure 18:
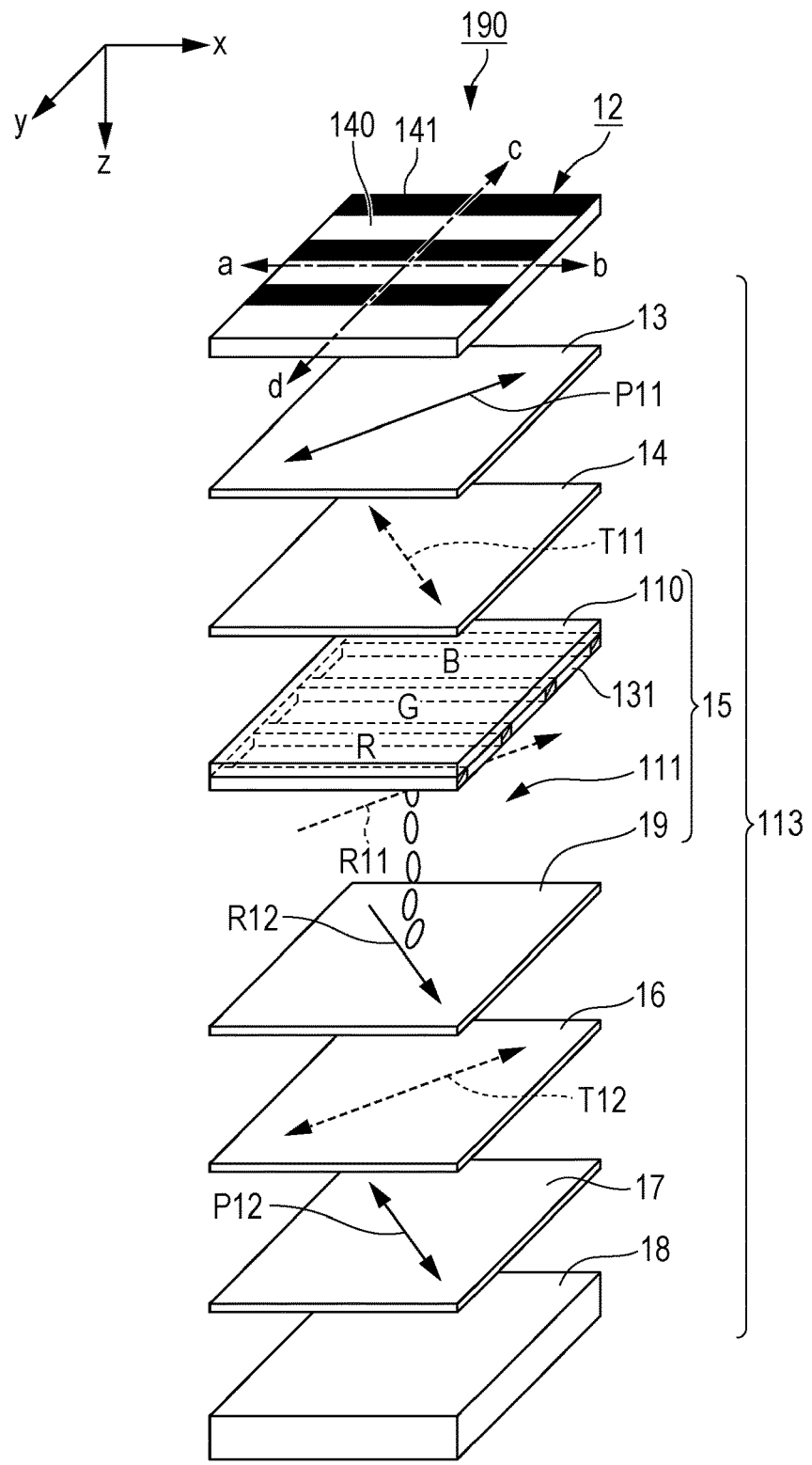
FIG. 18 is an exploded perspective view showing a schematic configuration of a liquid crystal display device of a fourth embodiment.

FIG. 18 is an exploded perspective view showing the liquid crystal display device of the present embodiment. FIG. 19 is a diagram describing a generation principle of crosstalk.

Figure 19:
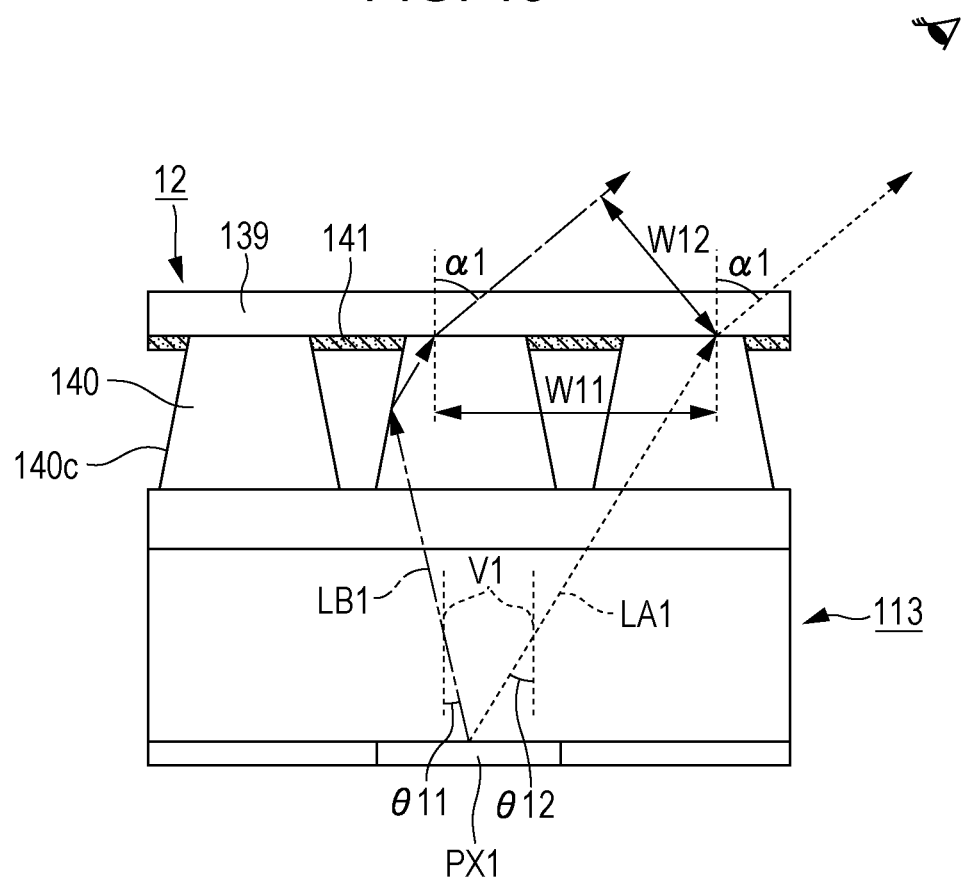
FIG. 19 is a diagram describing the generation principle of crosstalk.

In FIGS. 18 and 19, the same reference numerals are given to components in common with FIGS. 1 and 5 used in the first embodiment, and detailed description thereof will be omitted.

In the first embodiment, as shown in FIG. 1, R, G, and B which are three colors of the color filter 131 are arranged in the horizontal (lateral) direction of the display screen of the liquid crystal panel 113. In contrast, in the liquid crystal display device 190 of the present embodiment, as shown in FIG. 18, R, G, and B which are three colors of the color filter 131 are arranged in the vertical (longitudinal) direction of the display screen of the liquid crystal panel 113. In other words, sub-pixels corresponding to R, sub-pixels corresponding to G, and sub-pixels corresponding to B, which constitute one pixel, are respectively arranged horizontally.

Other configurations are the same as in the first embodiment.

Even in the present embodiment, the same effect as that of the first embodiment is achieved in which the luminance viewing angle characteristics are improved by optimizing the arrangement of the light control film 12 and the liquid crystal panel 113.

However, if the configuration of the first embodiment is adopted, there is a possibility that cross-talk occurs in some cases. Crosstalk is a phenomenon in which the same information enters the observer's eye through a different path, and multiple images are seen by the observer.

Hereinafter, the cause of the cross-talk will be described.

As shown in FIG. 19, it is assumed that the light LA1 is emitted at an angle θ2 with respect to the normal direction V1 of the liquid crystal panel 113 from a specific pixel PX1, without being reflected on the reflecting surface 140c, and passes through the light diffusion portion 140, and when the light is emitted from the light control film 12, the light is refracted and proceeds in a direction at an angle α1 with respect to the normal direction V1 of the liquid crystal panel 113, so as to reach the observer's eye. The light LA1 is referred to as light reflected 0 times. Further, it is assumed that the light LB1 emitted at an angle θ11 with respect to the normal direction V1 of the liquid crystal panel 113 from the specific pixel PX1 is reflected on the reflecting surface 140c of the light diffusion portion 140, and when the light is emitted from the light control film 12, the light is refracted and proceeds in a direction at an angle α1 with respect to the direction normal to the liquid crystal panel 113, so as to reach the observer's eye. The light LB1 is referred to as once reflected light.

As the example of FIG. 19, when the 0 number reflected light LA1 and the once reflected light LB1 simultaneously enter the observer's eye through different paths, cross-talk occurs. Here, the shorter the distance W11 between the emitted positions of the 0 number reflected light LA1 and the once reflected light LB1 is, the shorter the distance W21 between the 0 number reflected light LA1 and the once reflected light LB1 after refraction is, and each light is likely to enter the eye. In the first embodiment, since the luminance view angle of the liquid crystal cell 15 and the light distribution characteristic of the backlight 18 are wide in the horizontal direction of the screen, and the sub-pixels corresponding to respective colors are formed vertically long, crosstalk is likely to occur. In contrast, in the present embodiment, even if the luminance view angle of the liquid crystal cell 15 and the light distribution characteristic of the backlight 18 are wide in the horizontal direction of the screen similarly to the first embodiment, but the sub-pixels corresponding to respective colors are formed horizontally, such that crosstalk is unlikely to occur. As a result, it is possible to enhance display quality.

Fifth Embodiment

Hereinafter, a fifth embodiment of the present invention will be described with reference to FIG. 20.

The basic configuration of a liquid crystal display device of the present embodiment is the same as that of the first embodiment, except that the configuration of the light control member is different from that of the first embodiment.

Figure 20:
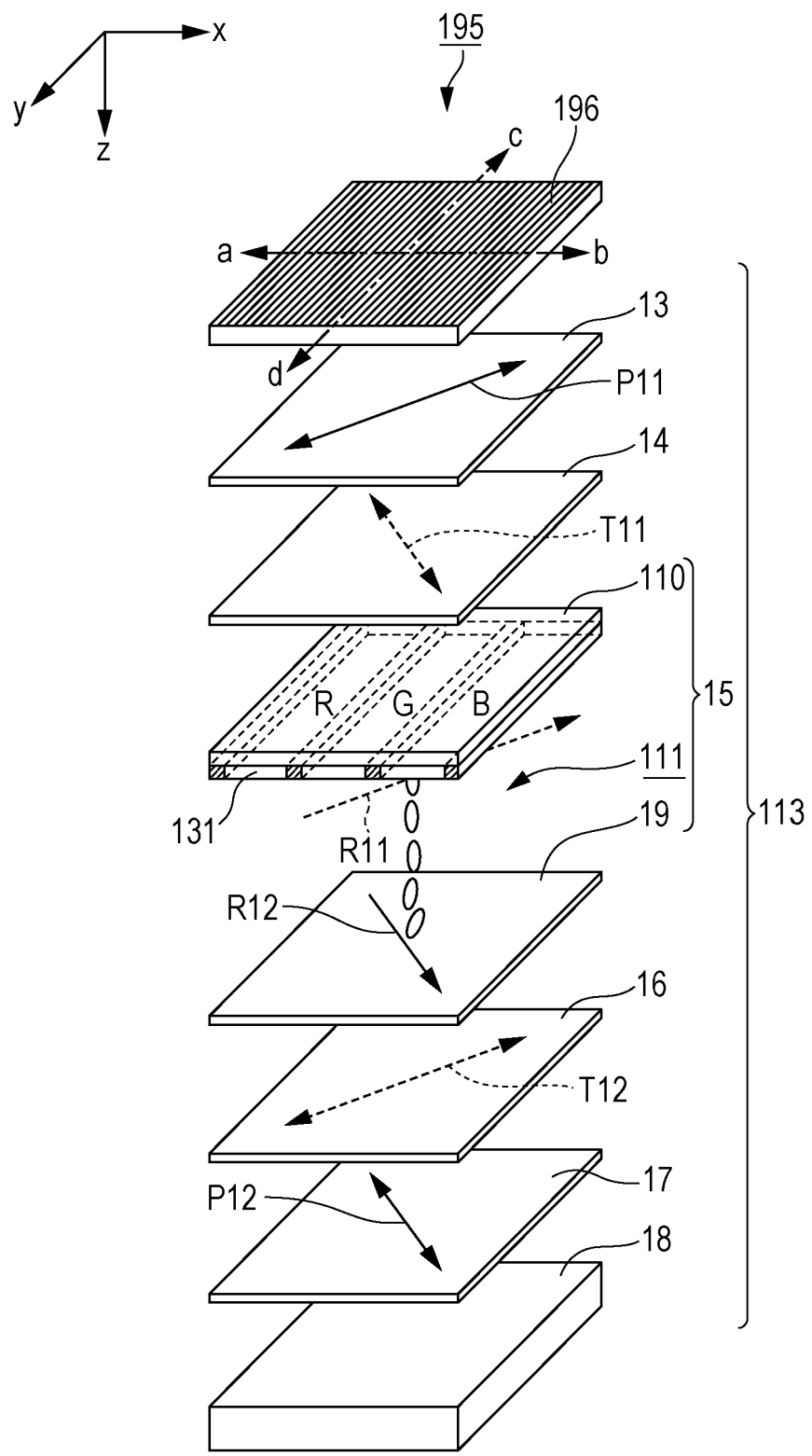
FIG. 20 is an exploded perspective view showing a schematic configuration of a liquid crystal display device of a fifth embodiment.

FIG. 20 is an exploded perspective view showing a liquid crystal display device of the present embodiment.

In FIG. 20, the same reference numerals are given to common components with FIG. 1 used in the first embodiment, and detailed description thereof will be omitted.

The liquid crystal display device 11 of the first embodiment includes the light control film 12 in which the plurality of light diffusion portions 140 are formed in stripes on the substrate 139, as the light control member. Instead of this configuration, as shown in FIG. 20, a liquid crystal display device 195 of the present embodiment includes an anisotropic scattering film 196 as the light control member. The anisotropic scattering film 196 is a film-like member in which a plurality of irregularities are formed non-periodically on the surface. The respective irregularities extend in one axial direction, and are formed such that the average pitches of the irregularities in two axial directions orthogonal to each other in a plane are different. With this configuration, it is assumed that the anisotropic scattering film has different scattering properties in two axial directions orthogonal to each other.

An example of the anisotropic scattering film 196 includes an anisotropic scattering film in which the irregularities on the surface of the resin sheet are stretched and elongated in one direction, and the direction perpendicular to the extending direction of the irregularities is set to the azimuthal direction having a high diffusivity. Thus, in the case of the present embodiment, the azimuthal direction in which a luminance viewing angle of the liquid crystal panel 113 is narrow coincides with the direction perpendicular to the extending direction of the irregularities of the anisotropic scattering film 196. An example of the anisotropic scattering film 196 includes, for example, a viewing angle widening film for an LCD (trade name: view step manufactured by Toyobo Co., Ltd.).

Even in the present embodiment, the same effect as that of the first embodiment is achieved in which the luminance viewing angle characteristics are improved by optimizing the arrangement of the anisotropic scattering film 196 and the liquid crystal panel 113.

Sixth Embodiment

Hereinafter, a sixth embodiment of the present invention will be described with reference to FIG. 21.

The basic configuration of a liquid crystal display device of the present embodiment is the same as that of the first embodiment, but is different from the first embodiment in that the liquid crystal display device includes a light scattering film.

Figure 21:
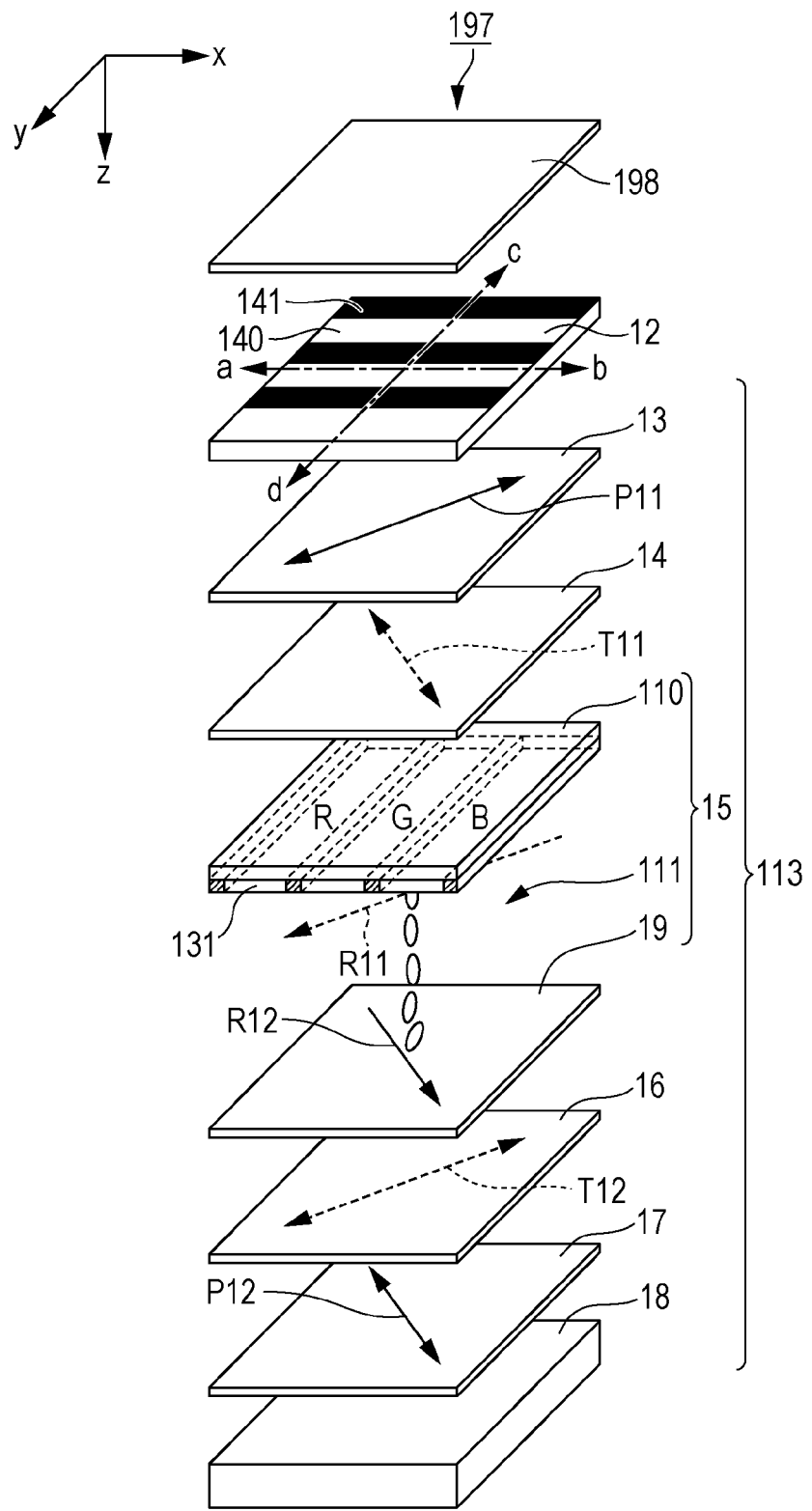
FIG. 21 is an exploded perspective view showing a schematic configuration of a liquid crystal display device of a sixth embodiment.

FIG. 21 is an exploded perspective view showing the liquid crystal display device of the present embodiment.

In FIG. 21, the same reference numerals are given to common components with FIG. 1 used in the first embodiment, and detailed description thereof will be omitted.

As shown in FIG. 21, a liquid crystal display device 197 of the present embodiment further includes a light scattering film 198 (light scattering member) on the light emission side of the light control film 12. Similarly to the light control film 12, the light scattering film 198 may be one which anisotropically scatters light, or may be one which isotropically scatters light. It is possible to sufficiently diffuse light which has not been diffused by the light control film 12 by using the light scattering film 198 of this kind.

Seventh Embodiment

Hereinafter, a seventh embodiment of the present invention will be described with reference to FIGS. 22 to 31D.

In the present embodiment, a liquid crystal display device including a transmissive liquid crystal panel will be described as an example.

Figure 22:
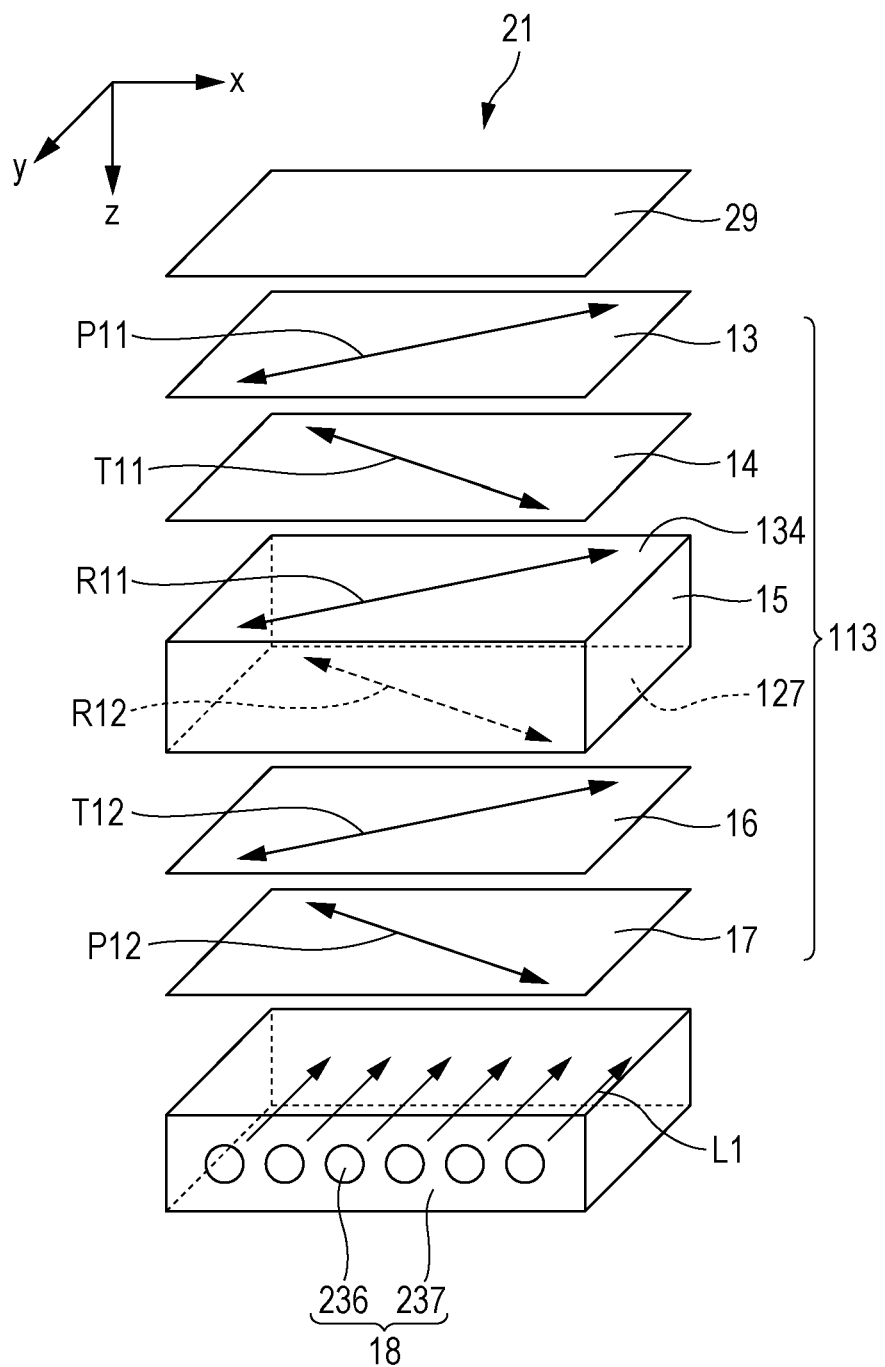
FIG. 22 is a perspective view showing a schematic configuration of a liquid crystal display device of the first embodiment.
Figure 23:
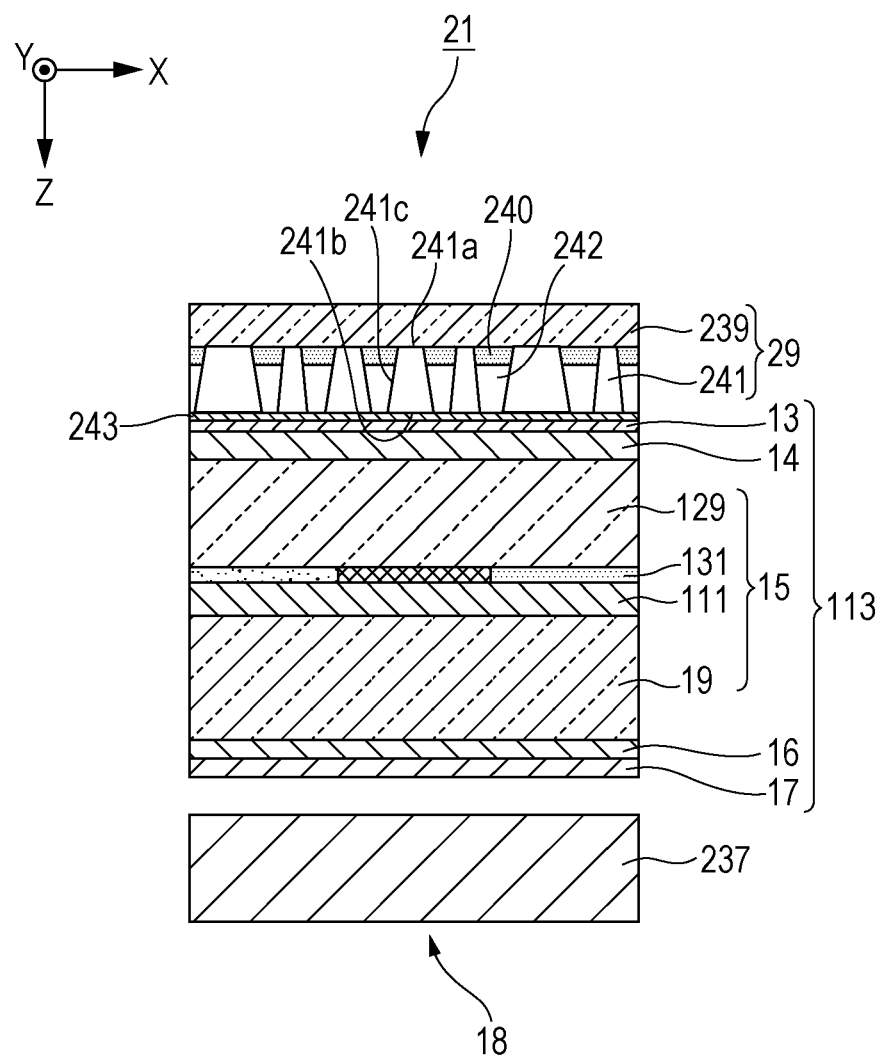
FIG. 23 is a cross-sectional view of the liquid crystal display device.

In addition, note that in all following drawings, for easier viewing of the respective components, some components may be illustrated having different scale dimensions. In FIGS. 22 to 24, the same reference numerals are given to components in common with the drawings used in the first embodiment, and detailed description thereof will be omitted.

FIG. 22 is an exploded perspective view of a liquid crystal display device 21 of the present embodiment as seen from the diagonal upper part (viewing side). FIG. 23 is a cross-sectional view of the liquid crystal display device 21.

As shown in FIGS. 22 and 23, the liquid crystal display device 21 of the present embodiment includes a liquid crystal panel 113, a backlight 18 (illumination device), and a light control film 29 (light control member). The liquid crystal panel 113 includes a first polarizer 17, a first retardation film 16 (retardation plate), a liquid crystal cell 15, a second retardation film 14 (retardation plate), and a second polarizer 13. In FIG. 22, the liquid crystal cell 15 is schematically illustrated as a single plate shape, but the structure thereof is the same as in the first embodiment, and thus detailed description thereof will be omitted.

Observers see a display from the upper side of the liquid crystal display device 21 in FIG. 22 in which the light control film 29 is arranged. In the following description, a side in which the light control film 29 is arranged is referred to as a viewing side, and a side in which the backlight 18 is arranged is referred to as a back side.

As shown in FIG. 22, the backlight 18 includes a light source 236, and a light guide body 237. The light source 236 is arranged on the end surface of the light guide body 237. As the light source 236, for example, light emitting diodes, cold cathode tubes or the like are used.

The backlight 18 of the present embodiment is a backlight of an edge light type.

The light guide body 237 has a function of guiding the light emitted from the light source 236 to the liquid crystal panel 113. As the material of the light guide body 237, for example, a resin material such as acrylic resin is used.

The light incident on the end surface of the light guide body 237 from the light source 236 propagates while being totally reflected on the inside of the light guide body 237, and is emitted with an approximately uniform intensity from the upper surface (light emission surface) of the light guide body 237. Although not shown, a scattering sheet and a prism sheet are arranged on the upper surface of the light guide body 237. After the light emitted from the upper surface of the light guide body 237 is scattered by the scattering sheet, the light is condensed by the prism sheet, and is approximately collimated so as to be emitted. As the prism sheet, for example, BEF (trade name) manufactured by Sumitomo 3M Co., Ltd. is used.

As the backlight 18 of the present embodiment, a backlight of which the directivity is set to be smooth to some extent by controlling the emission direction of light is used (hereinafter, referred to as a normal backlight in some cases). The luminance distribution of the normal backlight will be described later.

The first polarizer 17 is provided between the backlight 18 and the liquid crystal cell 15. The first polarizer 17 functions as a polarizer. Here, it is assumed that an angle is represented counterclockwise with the positive direction of the x-axis as a reference. In this case, the transmission axis P1 of the first polarizer 17 is set to 135° to 315° direction.

The second polarizer 13 is provided between the liquid crystal cell 15 and the light control film 29. The second polarizer 13 functions as a polarizer. The transmission axis P11 of the second polarizer 13 is arranged so as to be orthogonal to the transmission axis P12 of the first polarizer 17. The transmission axis P11 of the second polarizer 13 is set to 45° to 225° direction. The transmission axis P12 of the first polarizer 17 and the transmission axis P12 of the second polarizer 13 are arranged in crossed-Nicols.

The first retardation film 16 is provided between the first polarizer 17 and the liquid crystal cell 15. The slow axis T12 of the first retardation film 16 is arranged so as to be orthogonal to the transmission axis P12 of the first polarizer 17. The slow axis K1 of the first retardation film 16 is set to 45° to 225° direction.

The second retardation film 14 is provided between the second polarizer 13 and the liquid crystal cell 15. The slow axis T11 of the second retardation film 14 is arranged so as to be orthogonal to the transmission axis P11 of the second polarizer 13. The slow axis T11 of the second retardation film 14 is set to 135° to 315° direction.

As the retardation film of the present embodiment (the first retardation film 16 and the second retardation film 14), a WV film manufactured by Fuji Photo Film Co., Ltd. is used.

Next, the light control film 29 will be described in detail.

Figure 25:
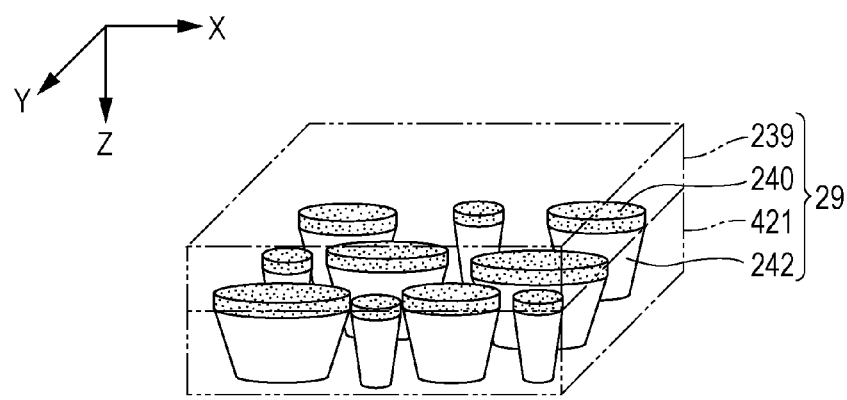
FIG. 25 is a perspective view showing a light control film.

FIG. 25 is a perspective view as seen from the viewing side of the light control film 29.

As shown in FIG. 25, the light control film 29 includes a substrate 239, a plurality of light shielding layers 240 (also referred to as a light absorbing layer), and a light diffusion portion 241. The plurality of light shielding layers 240 are formed on one surface (the surface on the opposite side to the viewing side) of the substrate 239. The light diffusion portion 241 is formed in a region other than the regions where the light shielding layers 240 are formed in one surface of the substrate 239.

As shown in FIG. 23, the light control film 29 is arranged on the second polarizer 13 in such a manner that the side on which the light diffusion portions 241 are provided faces the second polarizer 13, and the substrate 239 side faces the viewing side. The light control film 29 is fixed to the second polarizer 13 through an adhesive layer 243.

As the substrate 239, it is possible to use the same material as that of the substrate 139 in the first embodiment. In the present embodiment, for example, a transparent resin substrate of 100 μm is used.

The light shielding layers 240 are arranged at random as viewed from the direction normal to the main surface of the substrate 239. As the light shielding layer 240, it is possible to use the same material as that of the light absorbing layer 141 in the first embodiment.

As the light diffusion portion 241, it is possible to use the same material as that of the light diffusion portion 140 in the first embodiment.

The light diffusion portion 241 includes a light emission end surface 241*a*, a light incident end surface 241*b*, and a reflecting surface 241*c*. The light emission end surface 241*a* is a surface which is in contact with the substrate 239. The light incident end surface 241b is a surface facing the light emission end surface 241a. The reflecting surface 241c is a side surface of a tapered shape of the light diffusion portion 241. The reflecting surface 241c is a surface for reflecting light incident from the light incident end surface 241b. The area of the light incident end surface 241b is larger than the area of the light emission end surface 241a.

The light diffusion portion 241 is a portion that contributes to the transmission of light in the light control film 29. In other words, the light incident on the light diffusion portion 241 is guided and emitted in a state of being almost confined inside the light diffusion portion 241, while being totally reflected on the reflecting surface 241c of the light diffusion portion 241.

The light control film 29 is arranged on the substrate 239 so as to face the viewing side. Therefore, the surface having the smaller area of the two opposing surfaces of the light diffusion portion 241 is the light emission end surface 241a. Meanwhile, the surface having the larger area is a light incident end surface 241b.

The inclination angle of the reflecting surface 241c of the light diffusion portion 241 (an angle between the light incident end surface 241b and the reflecting surface 241c) is, for example, about 82°. However, when light is emitted from the light control film 29, if the incident light can be sufficiently diffused, the inclination angle of the reflecting surface 241c of the light diffusion portion 241 is not particularly limited. In the present embodiment, the inclination angle of the reflecting surface 241c of the light diffusion portion 241 is constant.

The height to the light emission end surface 241a from the light incident end surface 241b of the light diffusion portion 241 is set to be larger than the thickness of the light shielding layer 240. In the present embodiment, the thickness of the light shielding layer 240 is, for example, approximately 150 nm. The height to the light emission end surface 241a from the light incident end surface 241b of the light diffusion portion 241 is, for example, approximately 20 μm. A portion surrounded by the reflecting surface 241c of the light diffusion portion 241 and the light shielding layer 240 is a hollow portion 242. Air is present in the hollow portion 242.

Further, it is desirable that the refractive index of the substrate 239 and the refractive index of the light diffusion portion 241 be approximately equal. The reason is due to the following. For example, a case in which the refractive index of the substrate 239 and the refractive index of the light diffusion portion 241 are significantly different is considered. In this case, the refraction and reflection of unnecessary light may occur in the interface between the light diffusion portion 241 and the substrate 239 when the light incident on the light incident end surface 241b is emitted from the light diffusion portion 241. In this case, there is a concern of the occurrence of phenomena in which a desired viewing angle is not obtained and the amount of emitted light is reduced.

In the case of the present embodiment, air is present in the hollow portion 242 (outside of the light diffusion portion 241). Therefore, when the light diffusion portion 241 is made of, for example, transparent acrylic resin, the reflecting surface 241c of the light diffusion portion 241 is an interface between air and transparent acrylic resin. Here, the hollow portion 242 may be filled with other materials having a low refractive index. However, the refractive index of the interface between the inside and the outside of the light diffusion portion 241 is maximum when air is present on the outside, rather than any low refractive index material.

Therefore, from Snell's Law, the critical angle is the smallest in the configuration of the present embodiment, and the incident angle range in which light is totally reflected on the reflecting surface 241c of the light diffusion portion 241 is widest. As a result, loss of light is further suppressed, and it is possible to obtain a high luminance.

Figure 26:
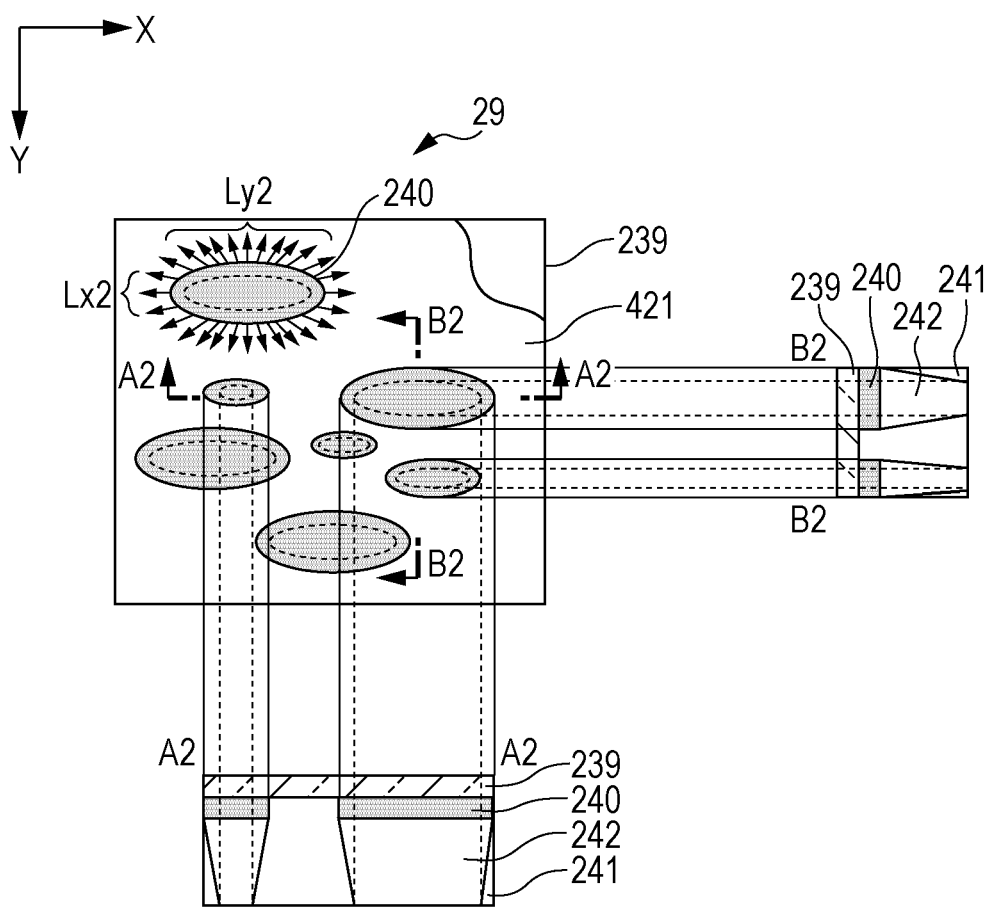
FIG. 26 is a plan view of a light control film.

FIG. 26 is a schematic diagram of the light control film 29. In FIG. 26, the upper left part is a plan view of the light control film 29. The lower left part is a cross-sectional view taken along line A2-A2 in the plan view of the upper left part. The right upper part is a cross-sectional view taken along line B2-B2 in the plan view of the upper left part.

As shown in the upper left part of FIG. 26, in the light control film 29 of the present embodiment, the plurality of light shielding layers 240 are provided while being scattered on one surface of the substrate 239. The planar shape of the light shielding layer 240 as viewed from the direction normal to the substrate 239 is an elongated ellipse. The light shielding layer 240 has a major axis and a minor axis. In the light control film 29 of the present embodiment, the ratio of the length of the minor axis to the length of the major axis is approximately equal in each light shielding layer 240.

As shown in the left lower part and the right upper part of FIG. 26, a portion corresponding to the lower portion of the light shielding layer 240 is a hollow portion 242 of the truncated elliptical cone shape. The light control film 29 has a plurality of hollow portions 242. The light diffusion portions 241 are continuously provided in the parts other than the plurality of hollow portions 242.

In the light control film 29 of the present embodiment, the major axis direction of the ellipse forming the planar shape of each light shielding layer 240 (hereinafter, referred to as the major axis direction of the light shielding layer in some cases) is aligned in the X direction approximately. The minor axis direction of the ellipse forming the planar shape of each light shielding layer 240 (hereinafter, referred to as the minor axis direction of the light shielding layer in some cases) is aligned in the Y direction approximately. Therefore, considering the orientation of the reflecting surface 241c of the light diffusion portion 241, the ratio of the reflecting surface 241c along the X direction is greater than the ratio of the reflecting surface 241c along the Y direction, in the reflecting surface 241c of the light diffusion portion 241. Therefore, the amount of the light Ly which is reflected on the reflecting surface 241c along the X direction and diffuses in the Y direction is larger than the amount of the light Lx which is reflected on the reflecting surface 241c along the Y direction and diffuses in the X direction. Thus, the azimuthal direction in which diffusivity of the light control film 29 is relatively high is the Y direction which is the minor axis direction of the light shielding layer 240.

In addition, the planar shape of the light shielding layer 240 may include shapes such as a circular shape, a polygonal shape, and a semicircular shape.

Further, the light shielding layer 240 may be formed while parts thereof are overlapped.

Figure 27A:
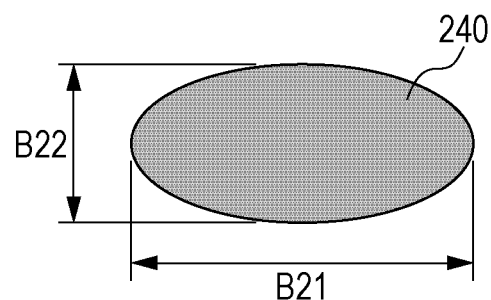
FIG. 27A is a diagram describing the size of a light shielding layer in plan view.
Figure 27B:
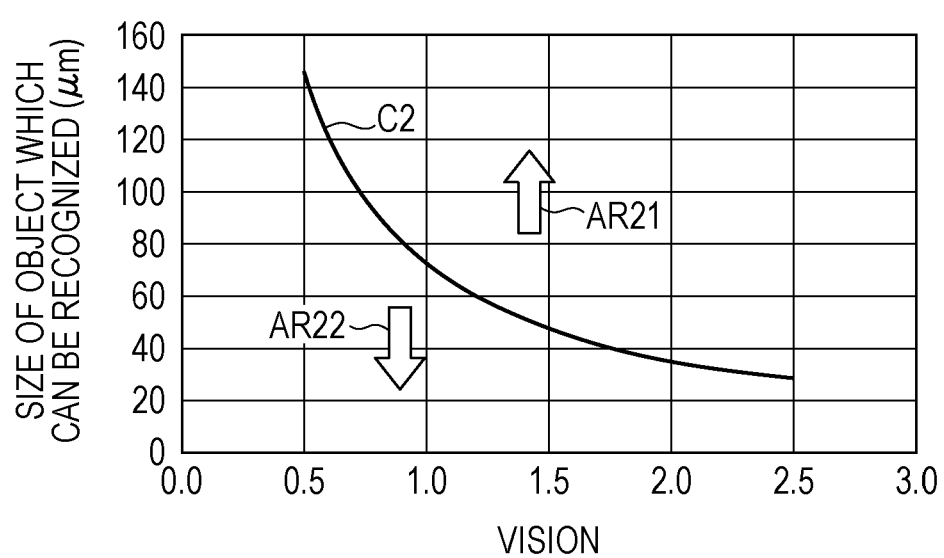
FIG. 27B is a diagram describing the size of the light shielding layer in plan view.

FIGS. 27A and 27B are diagrams describing the size of the light shielding layer 240 in plan view.

FIG. 27A is a plan view showing one light shielding layer 240 among a plurality of light shielding layers 240. FIG. 27B is a graph showing the relationship between human vision and the size of the object that can be recognized by the human eye. In FIG. 27B, the horizontal axis represents human vision. The vertical axis represents the size of the object that can be recognized by the human eye.

In the light control film 29, the size of the light shielding layer 240 may be somewhat smaller in plan view. The reason is because if the size of the light shielding layer 240 is too large in plan view, there is a possibility that the light shielding layer 240 is recognized as a dot, in the display image of the liquid crystal display device 21.

As shown in FIG. 27A, the length in the major axis direction of the light shielding layer 240 is set to B21. The length in the minor axis direction of the light shielding layer 240 is set to B22. It is preferable that the length B21 of the major axis direction of the light shielding layer 240 be 100 μm or less, in order to make the light shielding layer 240 be difficult to be recognized as dots. Hereinafter, a method for guiding the length B1 of the major axis direction of the light shielding layer 240 will be described.

As shown in FIG. 27B, the relationship between human vision and the size of the object that can be recognized by the human eye is certain. The range AR21 of the upper part than the curve C2 shown in FIG. 27B is a range in which the size of the object can be recognized by the human eye. Meanwhile, the range AR22 of the lower part than the curve C2 is a range in which the size of the object cannot be recognized by the human eye. The curve C2 is defined by expression (3) derived from the following equation.

In the human eye, when the minimum viewing angle is set to β (minute), the vision α is derived from the following expression (1).

$$\alpha = 1/\beta \quad (1)$$

When the size of the object which can be recognized by the human eye is set to V(mm), and the distance from the human eye to the object is set to W(m), the minimum viewing angle β is derived from the following expression (2).

$$\beta = (V/1000)/\{W \times 2\pi/(360/60)\} \quad (2)$$

From the above expressions (1) and (2), the human vision α is represented by the following expression (3).

$$\alpha = \{W \times 2\pi/(360/60)\}/(V/1000) \quad (3)$$

By rearranging the above equation (3), the size V of the object which can be recognized by the human eye is represented by the following expression (4).

$$V = [\{W \times 2\pi/(360/60)\} \times 1000]/\alpha \quad (4)$$

When using portable electronic devices such as mobile phones, the distance W from the human eye to the object is about 20 cm to 30 cm. Here, as an example, the distance W from the human eye to the object is set to 25 cm.

The minimum vision for obtaining a driver's license of a vehicle is 0.7. In this case, the size V of the object which can be recognized by the human eye is set to 100 μm. If the size V of the object is 100 μm or less, it is difficult to recognize an object with the human eye. In other words, it is preferable that the length B21 of the light shielding layer 240 in the major axis direction is 100 μm or less. Thus, the light shielding layer 240 being recognized as a dot in the display image is suppressed. In this case, the length B22 of the light shielding layer 240 in the minor axis direction is shorter than the length B21 of the light shielding layer 240 in the major axis direction, and is set to 100 μm or less.

In addition, the size V of the object which can be recognized by the human eye having vision of 2.0 is set to 40 μm. If the size V of the object is 40 μm or less, most object cannot be recognized with the human eye. In other words, it is preferable that the length B21 of the light shielding layer 240 in the major axis direction is 40 μm or less. Thus, the light shielding layer 240 being recognized as a dot in the display image of the liquid crystal display device 21 is reliably suppressed. In this case, the length B22 of the light shielding layer 240 in the minor axis direction is shorter than the length B21 of the light shielding layer 240 in the major axis direction, and is set to 40 μm or less.

The following description is made regarding the fact that the contrast ratio of the display image on the liquid crystal display device 21 is different depending on the viewing angle of the display image.

Figure 28:
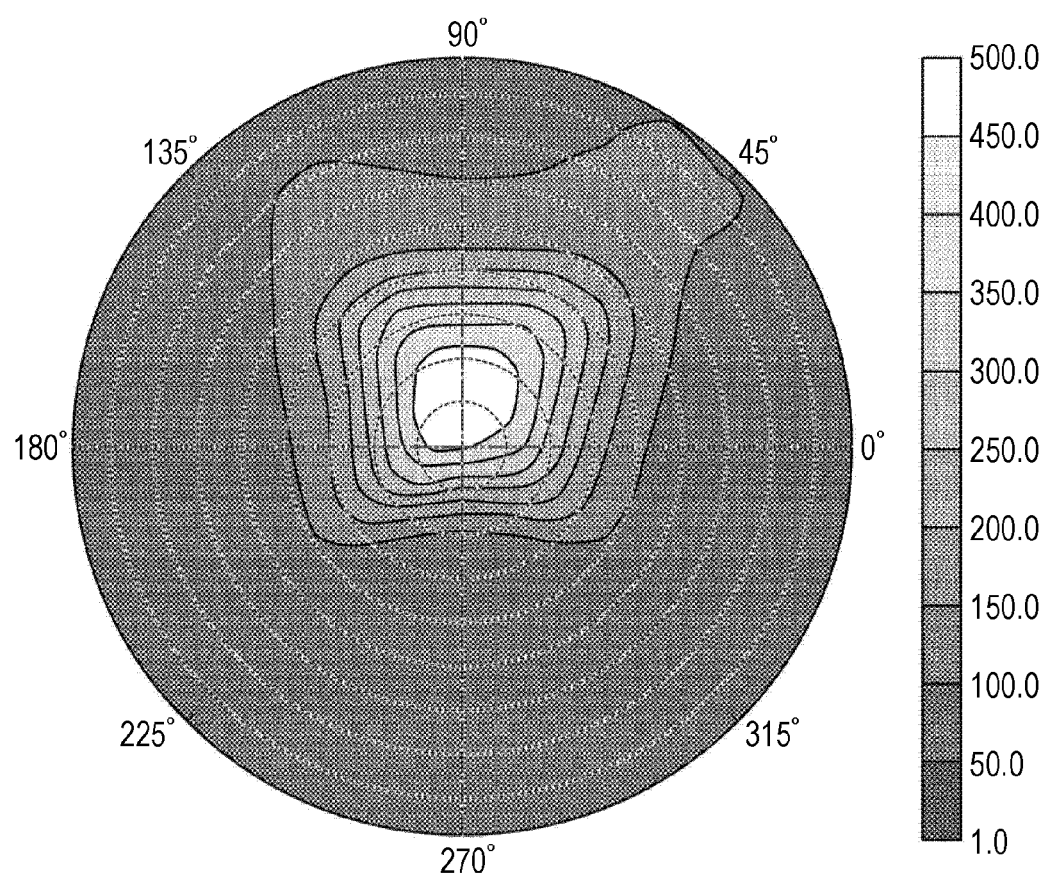
FIG. 28 is a diagram illustrating contrast viewing angle characteristics of white display, in a liquid crystal display device described in PTL 1.

The operation of the liquid crystal panel 113 of the TN mode is as previously described with reference to FIGS. 3A and 3B. FIG. 28 is a diagram illustrating an iso-contrast curve indicating the contrast viewing angle characteristics of white display, in the liquid crystal display device described in PTL 4 (Japanese Unexamined Patent Application Publication No. 2002-90527).

When the azimuthal direction in the liquid crystal display device is defined as shown in FIG. 8A, iso-contrast curves are as shown in FIG. 28. In seven iso-contrast curves, the contrast ratio becomes higher toward the inside from the outside. With respect to the contrast ratios of the seven iso-contrast curves, in order from the outside, the first is 100, the second is 200, the third is 300, the fourth is 350, the fifth is 400, the sixth is 450, and the seventh is 500. All seven iso-contrast curves are in rotationally asymmetric forms. The respective iso-contrast curves are biased in an azimuth φ: 90° direction. In other words, a luminance peak is shifted to the azimuth φ: 90° direction.

In addition, the contrast ratio is the luminance values of white display/the luminance values of black display, in the display image. As the contrast ratio increases, the visibility of the display image can be determined to be good.

The liquid crystal display device of PTL 4 has a large change in a light transmittance of the azimuth φ: 270° direction in the case of applying a constant voltage to the liquid crystal panel. Therefore, when the display image is observed from the side of the azimuth φ: 270° direction, the visibility of the display image is deteriorated.

Therefore, in the present embodiment, even if the display image is observed from the side of the azimuth φ: 270° direction, the following configuration is employed such that a state of good visibility of the display image can be maintained. Specifically, as shown in FIGS. 22 and 23, the light control film 29 is arranged on the light emission side of the liquid crystal panel 113. Furthermore, the azimuthal direction (azimuth φ: 90° to 270° direction) in which a change in the light transmittance of the polar angle direction is relatively large and the azimuthal direction (Y direction, which is the minor axis direction of the light shielding layer 240, shown in FIG. 26) in which diffusivity of the light control film 29 is relatively high, in the case of applying a constant voltage to the liquid crystal panel 113 of the light control film 29, are made to approximately coincide.

Figure 29A:
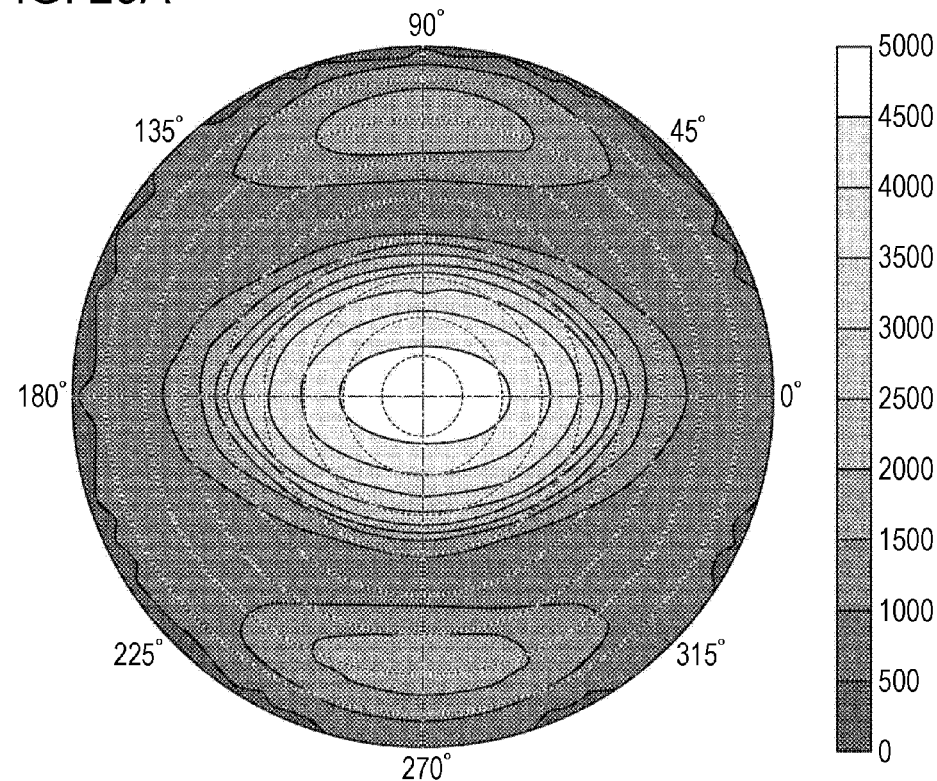
FIG. 29A is a diagram showing a luminance distribution of the backlight in the liquid crystal display device.
Figure 29B:
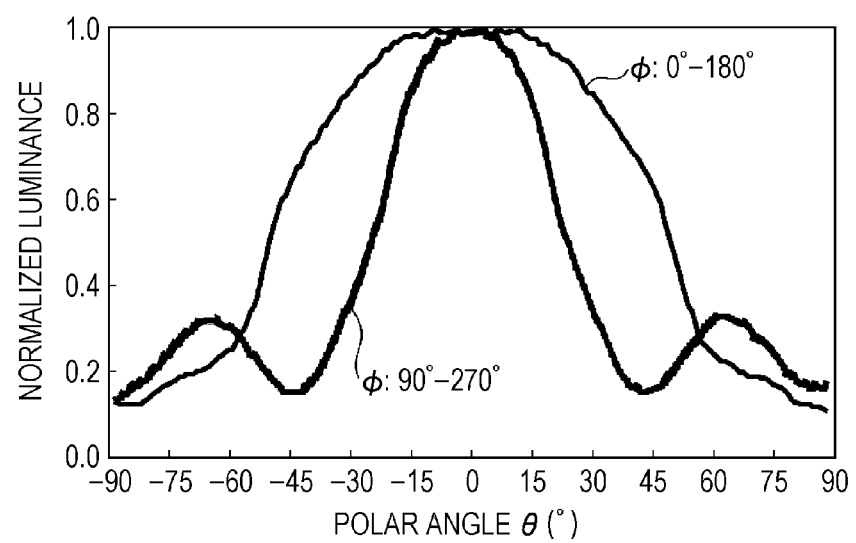
FIG. 29B is a diagram showing the luminance distribution of the backlight in the liquid crystal display device.

FIGS. 29A and 29B are diagrams showing the luminance distribution of the backlight 18 in the liquid crystal display device 21 of the present embodiment.

FIG. 29A is an iso-luminance curve of the backlight 18. FIG. 29B is a diagram expressing the luminance distribution in the azimuth φ: 0° to 180° direction and the azimuth φ: 90° to 270° direction as polar coordinates, for the iso-luminance curve in FIG. 29A. In FIG. 29B, the horizontal axis is the polar angle θ[°]. The vertical axis is expressed as normalized luminance, with the display luminance in the front direction as 1.

As described above, the backlight 18 of the present embodiment is a normal backlight in which directivity is set to be smooth to some extent by controlling the emission direction. FIG. 29A is obtained by visualizing the luminance distribution of the normal backlight by using the azimuth φ.

As shown in FIG. 29A, in eight iso-luminance curves, the luminance becomes higher toward the inside from the outside. With respect to the luminances [cd/m²] of the eight iso-luminance curves, in order from the outside, the first is 1000, the second is 2000, the third is 2500, the fourth is 3000, the fifth is 3500, the sixth is 4000, the seventh is 4500, and the eight is 5000. The respective eight iso-luminance curves extend in the azimuth φ: 0° to 180° direction. Meanwhile, they are crushed in the azimuth φ: 90° to 270° direction.

As shown in FIGS. 29A and 29B, the angular range having a high luminance in the azimuth φ: 0° to 180° direction is relatively wide. In contrast, the angular range having a high luminance in the azimuth φ: 90° to 270° direction is relatively narrow. In other words, the luminance change of the backlight 18 in the azimuth φ: 0° to 180° direction is relatively small. In contrast, the luminance change of the backlight 18 in the polar angle direction, in the azimuth φ: 90° to 270° direction is relatively large.

The backlight 18 of the present embodiment has low directivity. Specifically, the diffusion angle of light emitted from the backlight 18 in the azimuthal direction in which a change in the polar angle direction of the backlight 18 is relatively large is approximately 50°. Hereinafter, the diffusion angle of light emitted from the backlight 18 is simply referred to as a diffusion angle in some cases.

Here, the "diffusion angle" is set to an absolute value |α−β| of a difference between the emission angles of the backlight 18 when the luminance is attenuated to 50% of peak luminance. In the present embodiment, as shown in FIG. 29B, when the polar angle of the horizontal axis is set to the emission angle, the diffusion angle in the azimuth φ: 90° to 270° direction is approximately 50°.

In addition, the range of the diffusion angle may be 40° or more and 60° or less. For example, the diffusion angle for mobile use is approximately 40°. The diffusion angle for the TV use is approximately 50°. A diffusion plate for mobile use and a diffusion sheet for the TV have different diffusion performance. In addition, it is assumed that the diffusion angle is approximately 54° depending on the model. From the above view point, if the range of the diffusion angle is 40° or more and 60° or less, the backlight 18 has low directivity.

In the present embodiment, the azimuthal direction (azimuth φ: 90° to 270° direction) in which a change in the light transmittance of the polar angle direction is relatively large in the case of applying a constant voltage to the liquid crystal panel 113, the azimuthal direction in which diffusivity of the light control film 29 is relatively high, and the azimuthal direction in which a change in the luminance of the polar angle direction of the backlight 18 is relatively large are made to approximately coincide.

Figure 30A:
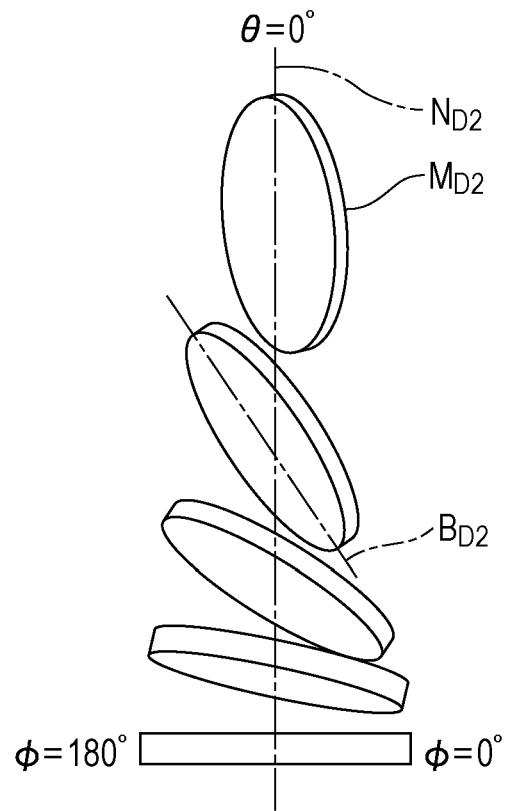
FIG. 30A is a diagram illustrating an azimuthal direction in which a discotic liquid crystal included in a retardation film is inclined.
Figure 30B:
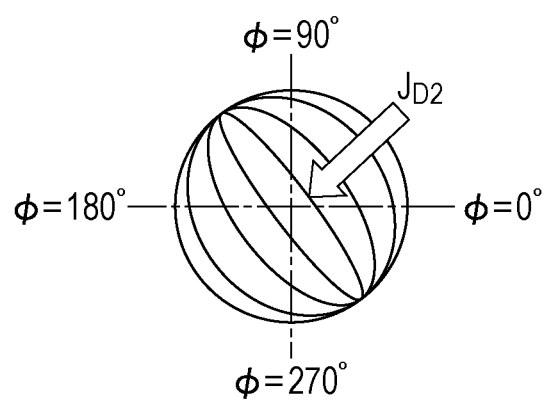
FIG. 30B is a diagram illustrating the azimuthal direction in which the discotic liquid crystal included in the retardation film is inclined.
Figure 30C:
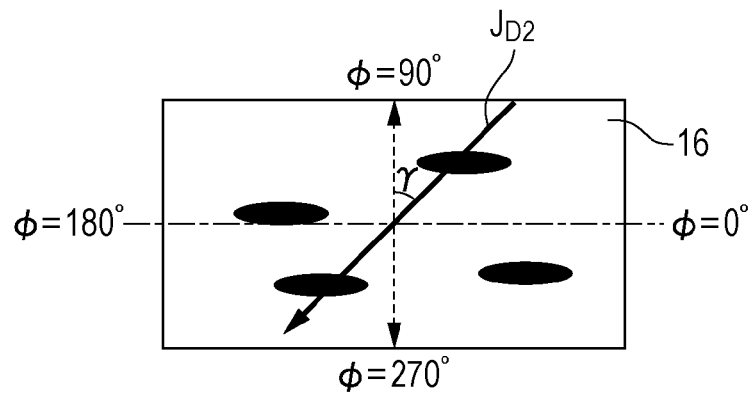
FIG. 30C is a diagram illustrating the azimuthal direction in which the discotic liquid crystal included in the retardation film is inclined.

FIGS. 30A to 30C are diagrams showing the azimuthal direction in which a discotic liquid crystal $M_{D2}$ included in the retardation film is inclined. FIG. 30A is a side view showing an alignment state of the discotic liquid crystal $M_{D2}$. FIG. 30B is a plan view showing an alignment state of the discotic liquid crystal $M_{D2}$. FIG. 30C is a diagram illustrating a relationship between the azimuthal direction in which the discotic liquid crystal $M_{D2}$ is inclined and the azimuthal direction in which diffusivity of the light control film is relatively high. In other words, FIG. 30C is a plan view describing the arrangement state of the first retardation film 16.

Here, description will be given of the first retardation film 16 as an example. For the second retardation film 14, description will be omitted. The upper part of FIG. 30A corresponds to the side close to the liquid crystal layer 111 of the first retardation film 16. In FIGS. 30A and 30B, some discotic liquid crystal $M_{D2}$ included in the first retardation film 16 is focused.

In the following description, the azimuthal direction in which a discotic liquid crystal $M_{D2}$ is inclined may be referred to as an "inclination azimuthal direction".

As shown in FIG. 30A, the major axis $B_{D2}$ of the discotic liquid crystal $M_{D2}$ located above the first retardation film 16 is inclined obliquely with respect to the normal line $N_{D2}$ of the first retardation film 16. Meanwhile, the major axis $B_{D2}$ of the discotic liquid crystal $M_{D2}$ located below the first retardation film 16 is orthogonal to the normal line $N_{D2}$ of the first retardation film 16. The major axis $B_{D2}$ of the discotic liquid crystal $M_{D2}$ located uppermost out of a plurality of the discotic liquid crystals $M_{D2}$ is approximately parallel with respect to the normal line $N_{D2}$ of the first retardation film 16. The major axis $M_D$ of the discotic liquid crystal $M_{D2}$ is inclined gradually with respect to the normal line $N_{D2}$ of the first retardation film 16, toward upper side from the lower side of the first retardation film 16.

Here, when no voltage is applied, a case is considered in which the liquid crystal molecules M enter a state of being twisted 90° between the alignment film 127 and the alignment film 134. In this case, in order to ensure the symmetry of the contrast of top and bottom or the left and right of the display image, it is necessary to set the azimuthal direction of the pre-tilt of the liquid crystal molecules M1 to any one of 45°, 135°, 225°, and 315°. The reason is because the contrast viewing angle is rotated, if the azimuthal direction of the pre-tilt of the liquid crystal molecules M1 is considered. Therefore, the inclination azimuthal direction of the discotic liquid crystal $M_D$ is made to correspond to the azimuthal direction of the pre-tilt of the liquid crystal molecules M1.

In the present embodiment, as shown in FIG. 30B, when viewed from the direction normal to the first retardation film 16, an angle between the inclination azimuthal direction $J_{D2}$ of the discotic liquid crystal $M_{D2}$ and the azimuth φ: 90° to 270° direction is set to approximately 45°.

In other words, as shown in FIG. 30C, an angle γ formed by the first retardation film 16 is arranged such that the inclination azimuthal direction $J_{D2}$ of the discotic liquid crystal $M_{D2}$ and the azimuthal direction (azimuth φ: 90° to 270° direction) in which diffusivity of the light control film 29 is relatively high is approximately 45°. Thus, in the liquid crystal display device 21 of the TN-mode in which liquid crystal molecules are twisted 90° when no voltage is applied, it is possible to ensure the symmetry of the contrast of the up and down or left and right directions.

(Method of Manufacturing a Liquid Crystal Display Device)

FIGS. 31A to 31D are perspective views showing a manufacturing process of the light control film 29 step by step.

A manufacturing method will be described focusing on the manufacturing process of the light control film 29 of the liquid crystal display device 21 having the above configuration.

The outline of the manufacturing process of the liquid crystal panel 113b will be described first. First, the TFT substrate 19 and the color filter substrate 110 are respectively manufactured. Thereafter, the surface on the side in which the TFT 119 the TFT substrate 19 is formed and the surface on the side in which the color filter 131 of the color filter substrate 110 is formed are arranged to oppose each other. Then, the TFT substrate 19 and the color filter substrate 110 are bonded through a sealing member. Thereafter, a liquid crystal is injected into a space surrounded by the TFT substrate 19, the color filter substrate 110, and the seal member. Then, a first retardation film 16, a first polarizer 17, a second retardation film 14, and a second polarizer 13 are respectively bonded on both surfaces of the liquid crystal cell 15 that has been created in this manner. Through the above steps, the liquid crystal panel 113 is completed.

In addition, a method for manufacturing the TFT substrate 19 and the color filter substrate 110 may be completed according to a general method, and thus descriptions thereof will be omitted.

Figure 31A:
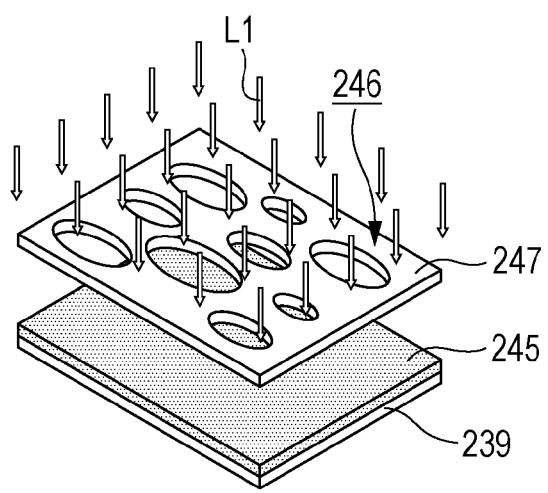
FIG. 31A is a perspective view showing a manufacturing process of the light control film step by step.

First, as shown in FIG. 31A, a substrate 239 made of triacetyl cellulose having a thickness of 100 µm is prepared. Then, a black negative resist containing carbon as a light shielding portion material is coated on one surface of the substrate 239, using the spin coating method. Thus, a coating film 245 having a thickness of 150 nm is formed.

Next, the substrate 239 with the coating film 245 formed thereon is placed on a hot plate, and the coating film 245 is pre-baked at temperature 90° C. Thus, the solvent of the black negative resist is volatilized.

Next, exposure is performed using the exposure apparatus, by irradiating the coating film 245 with light through a photo-mask 247 with a plurality of opening patterns 246 of which the planar shape is, for example, an elliptical shape. At this time, an exposure apparatus using mixed rays including i rays having a wavelength of 365 nm, h rays having a wavelength of 404 nm, and g rays having a wavelength of 436 nm is used. The exposure amount is 100 mJ/cm$^2$.

Figure 31B:
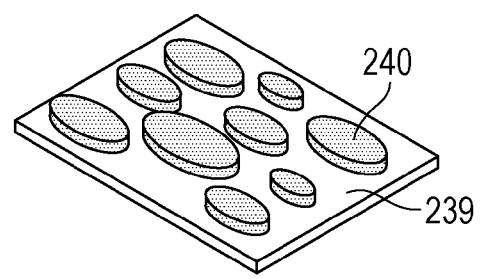
FIG. 31B is a perspective view showing the manufacturing process of the light control film step by step.

After exposure is performed using the above photo-mask 247, the development of the coating film 245 made of black negative resist is performed using a dedicated developing solution, dried at 100° C., as shown in FIG. 31B, and a plurality of light shielding layers 240 of which the planar shape is, for example, an elliptical shape are formed on one surface of the substrate 239. In this embodiment, the exposure of the transparent negative resist is performed with the light shielding layer 240 made of black negative resist as a mask in the next step so as to form a hollow portion 242. Therefore, the position of the opening pattern 246 of the photo-mask 247 corresponds to the formation position of the hollow portion 242.

The light shielding layer 240 of an elliptical shape corresponds to a non-forming region (hollow portion 242) of the light diffusion portion 241 in the next step. All of the plurality of opening patterns 246 are elliptical patterns. The long diameter and the short diameter of the opening pattern 246 have versatile sizes. The arrangement of the interval (pitch) between the adjacent opening patterns 246 may not be regular, or may not be periodic. It is desirable that the interval (pitch) between the opening patterns 246 be smaller than the interval (pitch, for example, 150 µm) between pixels of the liquid crystal panel 113. Thus, at least one light shielding layer 240 is formed in a pixel. Therefore, it is possible to achieve a wide viewing angle when the light shielding layer 240 is combined with, for example, a liquid crystal panel having a small pixel pitch used in a mobile device or the like.

In the present embodiment, the light shielding layer 240 is formed by a photolithography method using a black negative resist, but is not limited thereto. In addition, if using a photo-mask in which the opening pattern 246 of the present embodiment and a light shielding pattern are reversed, it is also possible to use a positive resist having light absorbing properties. Alternatively, the light shielding layer 240 may be formed directly by using a vapor deposition method, a printing method, or the like.

Figure 31C:
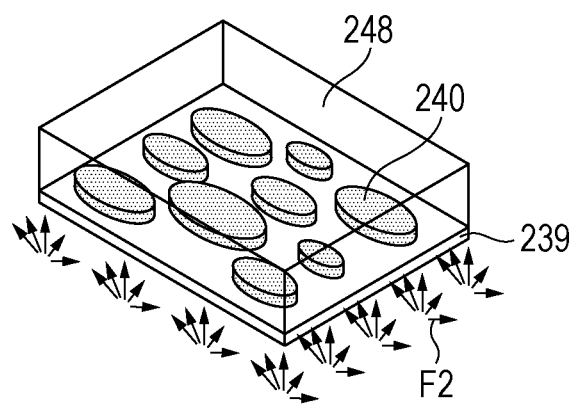
FIG. 31C is a perspective view showing the manufacturing process of the light control film step by step.

Next, as shown in FIG. 31C, transparent negative resist made of acrylic resin is coated on the upper surface of the light shielding layer 240, as a light diffusing material, using the spin coating method. Thus, a coating film 248 having a thickness of 20 µm is formed.

Next, the substrate 239 with the coating film 248 formed thereon is placed on a hot plate, and the coating film 248 is pre-baked at temperature 95° C. Thus, the solvent of the transparent negative resist is volatilized.

Next, exposure is performed by irradiating the coating film 248 with light F from the substrate 239 side, with the light shielding layer 240 as a mask. At this time, an exposure apparatus using mixed rays including i rays having a wavelength of 365 nm, h rays having a wavelength of 404 nm, and g rays having a wavelength of 436 nm is used. The exposure amount is 500 mJ/cm$^2$.

Thereafter, the substrate 239 with the coating film 248 formed thereon is placed on the hot plate, and the coating film 248 is post-exposure baked (PEB) at temperature 95° C.

Figure 31D:
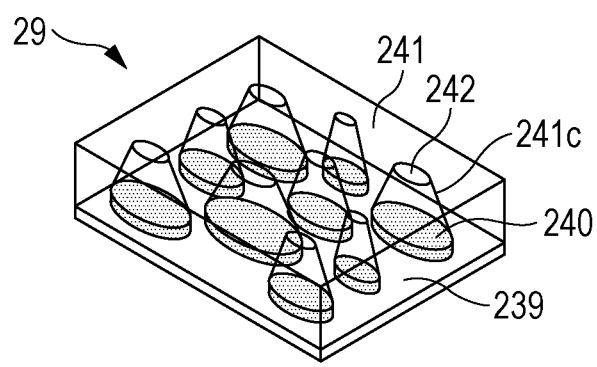
FIG. 31D is a perspective view showing the manufacturing process of the light control film step by step.

Next, the development of the coating film 248 made of transparent negative resist is performed using a dedicated developing solution, post-baked at 100° C., as shown in FIG. 31D, and a transparent resin layer 241 having a plurality of hollow portions 242 is formed on one surface of the substrate 239. In this embodiment, as shown in FIG. 31C, since the exposure is performed using diffused light, transparent negative resist constituting the coating film 248 is radially exposed so as to expand outwardly from the region where the light shielding layer 240 is not formed. Thus, the hollow portion 242 of the forward tapered shape is formed. The light diffusion portion 241 has an inverted tapered shape. The inclination angle of the reflecting surface 241c of the light diffusion portion 241 can be controlled by the degree of diffusion of the diffused light.

It is possible to use, as light F2 used herein, parallel light, diffused light, or light in which the intensity at a specific emission angle is different from the intensity at another emission angle, that is, light having strength and weakness at a specific emission angle. When using the parallel light, the inclination angle of the reflecting surface 241c of the light diffusion portion 241 is, for example, a single inclination angle of 60° to 90° approximately. When using the diffused light, an inclined surface has inclination angles to be continuously changed and a curved cross-sectional shape. When using the light having strength and weakness in a specific emission angle, an inclination surface has an inclination angle corresponding to the strength and weakness. Thus, it is possible to adjust the inclination angle of the reflecting surface 241c of the light diffusion portion 241. Thus, it is possible to adjust the light diffusivity of the light control film 29 so as to obtain a desired visibility.

In addition, as means for irradiating the substrate 239 with the parallel light emitted from the exposure apparatus as light F2, for example, a diffusion plate of a phase of about 250 is arranged on an optical path of the light emitted from the exposure device, and light is emitted through the diffusion plate.

Hitherto, through the steps of FIGS. 31A to 31D, the light control film 29 of the present embodiment is completed. It is preferable that the total light transmittance of the light control film 29 be 90% or more. If the total light transmittance is 90% or more, sufficient transparency is obtained, and sufficient optical performance obtained in the light control film 29 can be exhibited. The total light transmittance is on the provisions of JIS K7361-1. In addition, in the present embodiment, an example using a liquid resist is used, but instead of this configuration, it is possible to use a film-like resist.

Finally, as shown in FIG. 23, the completed light control film 29 is bonded to the liquid crystal panel 113 through an adhesive layer 243, causing the viewing side to face the substrate 239, in the state of opposing the light diffusion portion 241 to the second polarizer 13.

Through the above process, the liquid crystal display device 21 of the present embodiment is completed.

In the liquid crystal display device 21 according to the present embodiment, since the light control film 29 is arranged on the light emission side of the liquid crystal panel 113, the light incident on the light control film 29 is emitted from the light control film 29 in a state in which the angular distribution is wider than before the light enters the light control film 29. Therefore, the user can visually recognize the excellent display even if the observer inclines the line of sight from a front direction (normal direction) of the liquid crystal display device 21.

Furthermore, the azimuthal direction (azimuth φ: 90° to 270° direction) in which a change in the light transmittance of the polar angle direction in the case of applying a constant voltage to the liquid crystal panel 113 of the light control film 29 is relatively large and the azimuthal direction in which diffusivity of the light control film 29 is relatively high are made to approximately coincide. Therefore, the light emitted from the liquid crystal display device 21 in the azimuth φ: 90° to 270° direction is diffused at a wider angle, compared to the light emitted in another azimuthal direction. Thus, the degree of luminance change can be averaged between the azimuth φ: 90° to 270° direction and another azimuthal direction. Therefore, in contrast viewing angle characteristics of the white display, the shift of the luminance peak in a particular azimuthal direction is suppressed.

In other words, it is possible to increase the symmetry of the luminance distribution. Therefore, it is possible to provide a liquid crystal display device 21 excellent in viewing angle characteristics, by suppressing gray scale inversion when a display screen is viewed from an oblique direction.

Furthermore, in the present embodiment, the azimuthal direction (azimuth φ: 90° to 270° direction) in which a change in the light transmittance of the polar angle direction is relatively large in the case of applying a constant voltage to the liquid crystal panel 113, the azimuthal direction in which diffusivity of the light control film 29 is relatively high, and the azimuthal direction in which a change in the polar angle direction of the backlight 18 is relatively large approximately coincide. Thus, it is possible to diffuse light having relatively high directivity among the light emitted from the backlight 18. As a result, the narrowness of the luminance viewing angle of the liquid crystal panel 113 in the azimuth φ: 90° to 270° direction is improved. Therefore, it is possible to provide a liquid crystal display device 21 excellent in the luminance viewing angle characteristics.

Generally, when regular patterns such as stripes or lattices are superimposed on each other, if the periods of the patterns are shifted slightly, it is known that an interference fringe pattern (moire) is exhibited. For example, if it is assumed that the light control film in which a plurality of light diffusion portions are arranged in a matrix is superimposed on the liquid crystal panel in which a plurality of pixels are arranged in a matrix, there is a concern that moire is generated between the periodic pattern of the light diffusion portions of the light control film and between the periodic pattern of pixels, and thus the display quality is reduced.

In contrast, in the liquid crystal display device 21 of the present embodiment, the plurality of light shielding layers 240 are arranged randomly in a plane. The light diffusion portion 241 is formed in a region other than the region where the light shielding layer 240 is formed. Therefore, moire caused by the interference between the pixels regularly arranged in the liquid crystal panel 113 does not occur, and it is possible to maintain display quality.

In the present embodiment, the arrangement of the plurality of light shielding layers 240 is random, but there is no need for the arrangement of the plurality of light shielding layers 240 to necessarily be random. If the arrangement of the plurality of light shielding layers 240 is non-periodic, it is possible to suppress the occurrence of moire. Further, when the occurrence of some moire is acceptable depending on the situation and the application, the plurality of light shielding layers 240 may be arranged periodically.

Eighth Embodiment

Hereinafter, the eighth embodiment of the present invention will be described with reference to FIGS. 32 and 33.

The basic configuration of a liquid crystal display device 2101 of the present embodiment is the same as that of the seventh embodiment, and is different from the seventh embodiment in that the liquid crystal display device includes a light scattering film 2102.

Figure 32:
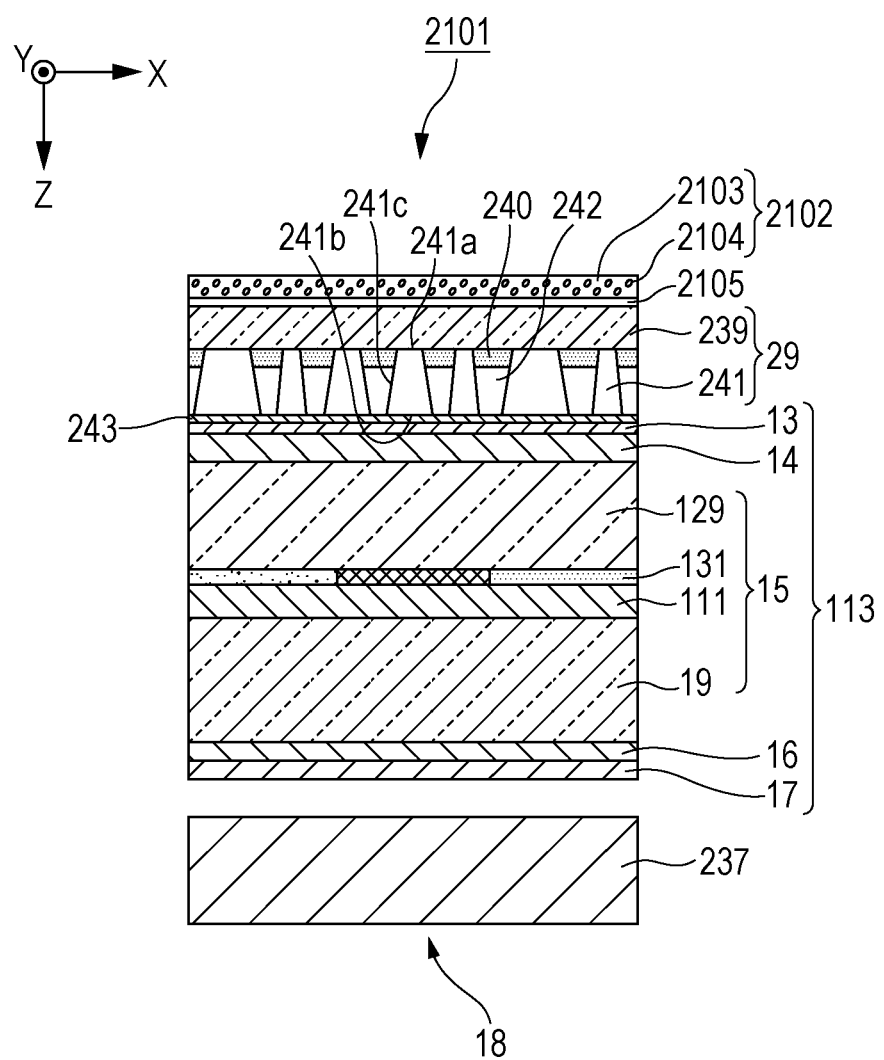
FIG. 32 is a cross-sectional view of a liquid crystal display device of a second embodiment.

FIG. 32 is a cross-sectional view of the liquid crystal display device 2101 of the present embodiment.

In FIG. 32, the same reference numerals are given to components common with the diagram used in the first embodiment and the seventh embodiment, and thus detailed description thereof will be omitted.

As shown in FIG. 32, the liquid crystal display device 2101 of the present embodiment further includes a light scattering film 2102 (light scattering member) on the light emission side of the light control film 29.

In the light scattering film 2102, a plurality of light scattering bodies 2104 are dispersed within the binder resin 2103. As the binder resin 2103, for example, acrylic resin or the like is used. As the light scattering bodies 2104, for example, acrylic beads or the like are used. The light scattering film 2102 is fixed to the surface on the viewing side of the substrate 239 by an adhesive layer 2105.

Figure 33:
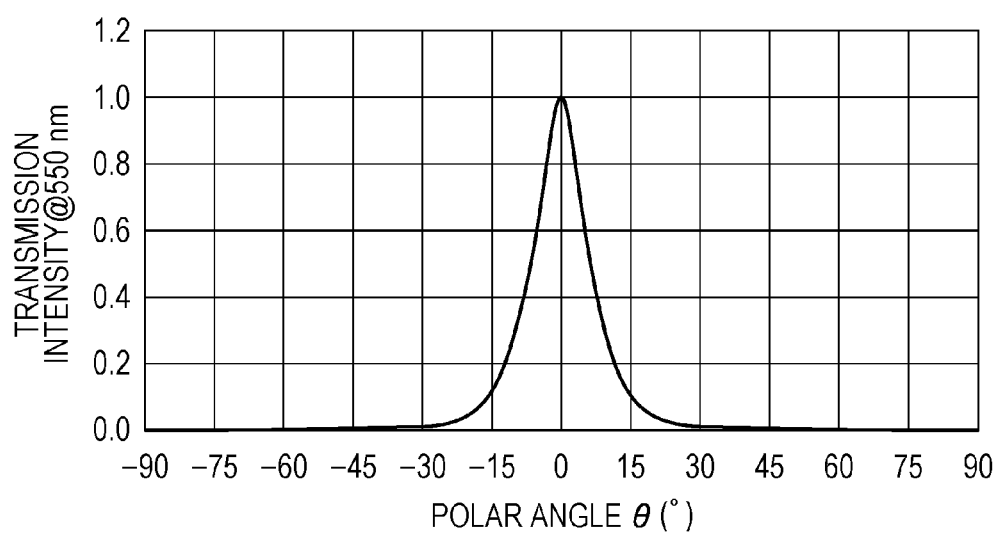
FIG. 33 is a diagram showing characteristics of a light scattering film.

FIG. 33 is a diagram showing characteristics of the light scattering film 2102. This characteristic is a characteristic obtained when light is projected perpendicularly to one surface of the light scattering film 2102 (a surface on the substrate 239 side), by using an LCD evaluation apparatus manufactured by Otsuka Electronics Co., Ltd. (product name: LCD-5200). In FIG. 33, the horizontal axis represents a polar angle θ[degree]. The vertical axis represents intensity (transmission intensity) of the light transmitted through the light scattering film 2102 when light having a wavelength of 550 nm is projected perpendicularly to one surface of the light scattering film 2102.

As shown in FIG. 33, the characteristic of the transmission intensity of the light scattering film 2102 is isotropic with respect to the azimuthal direction.

In addition, the light scattering film 2102 may scatter light anisotropically or may scatter light isotropically, similarly to the light control film 29. It is possible to sufficiently diffuse light that could not be diffused by the light control film 29 by using the light scattering film 2102 of this type.

Ninth Embodiment

Hereinafter, a ninth embodiment of the present invention will be described with reference to FIGS. 34A, 34B, 35A and 35B.

The basic configuration of a liquid crystal display device of the present embodiment is the same as that of the eighth embodiment, but different from the eighth embodiment in that the light diffusion portion 2241 of the light control film 2209 has reflecting surfaces 2241c1 and 2241c2 having inclination angles which are different from each other. Therefore, in the present embodiment, the light control film 2209 will be described.

Figure 34A:
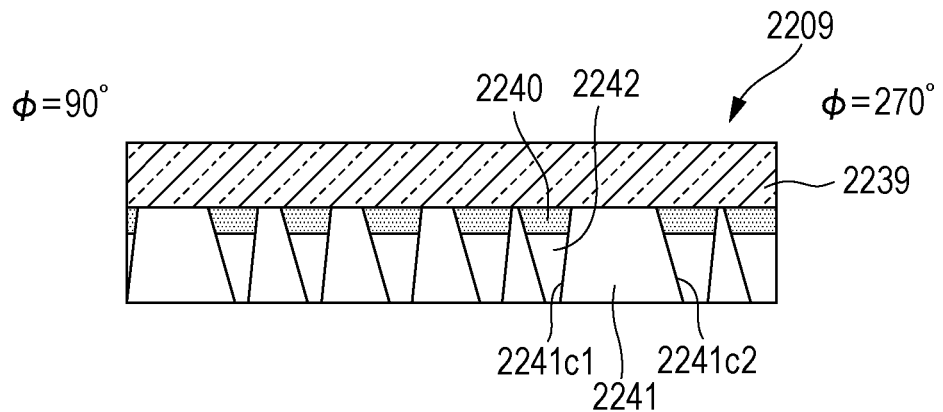
FIG. 34A is a cross-sectional view of a light control film of a third embodiment.
Figure 34B:
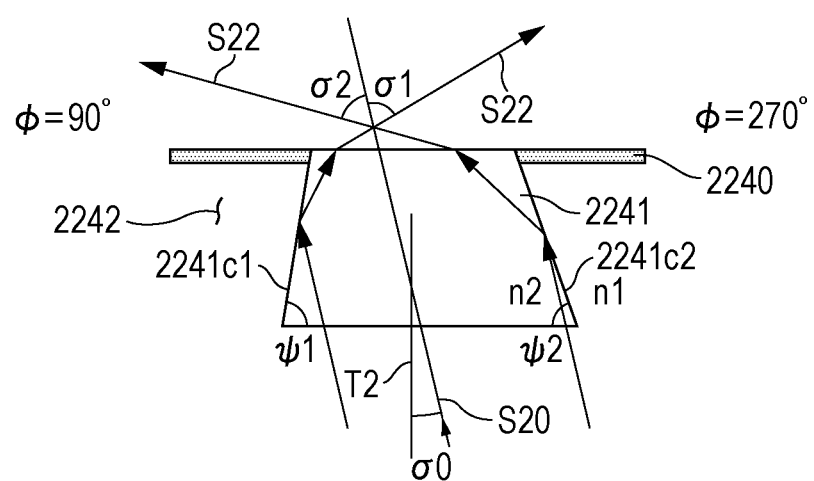
FIG. 34B is a cross-sectional view of the light control film of the third embodiment.

FIGS. 34A and 34B are cross-sectional views of the light control film 2209 of the present embodiment.

FIG. 34A is a cross-sectional view of the light control film 2209 along the azimuth φ: 90° to 270° direction. FIG. 34B is a diagram showing the relationship between an incidence angle of light on the light diffusion portion 2241, inclination angles of reflecting surfaces 2241c1 and 2241c2 of the light diffusion portion 2241, and an emission angle of the light emitted from the light diffusion portion 2241, in the cross section along the azimuth φ: 90° to 270° direction.

In FIG. 34B, for the sake of convenience, a base material 2239 is not shown.

In FIG. 34B, an angle φ1 is an inclination angle of the first reflecting surface 2241c1. An angle φ2 is an inclination angle of the second reflecting surface 2241c2. An angle σ0 is an incident angle of light incident on the light diffusion portion 2241 (an angle between the height direction T1 of the light diffusion portion 2241 and the incident direction S0 of the light incident on the light diffusion portion 2241). An angle σ1 is an emission angle of light reflected on the first reflecting surface 2241c1 (an angle between the emission direction S21 of the light reflected on the first reflecting surface 2241c1 and emitted from the light diffusion portion 2241 and the incident direction S0 of the light incident on the light diffusion portion 2241). An angle σ2 is an emission angle of light reflected on the second light reflecting surface 2241c2 (an angle between the emission direction S22 of the light reflected on the second reflecting surface 2241c2 and emitted from the light diffusion portion 2241 and the incident direction S0 of the light incident on the light diffusion portion 2241).

A refractive index n1 is the refractive index of air. A refractive index n2 is the refractive index of the light diffusion portion.

As shown in FIG. 34A, the light diffusion portion 2241 of the present embodiment has a first reflecting surface 2241c1 and a second reflecting surface 2241c2. The first reflecting surface 2241c1 is a reflecting surface on the side in the azimuth φ: 90° direction, in the azimuthal direction (azimuth φ: 90° to 270° direction) in which a change in the light transmittance of the polar angle direction is relatively large in the case of applying a constant voltage to the liquid crystal panel 113. In contrast, the second reflecting surface 2241c2 is a reflecting surface on the side in the azimuth φ: 270° direction, in the azimuth φ: 90° to 270° direction. The second reflecting surface 2241c2 is a reflecting surface on the opposite side to the first reflecting surface 2241c2. In the present embodiment, the inclination angle φ1 of the first reflecting surface 2241c1 and the inclination angle φ2 of the second reflecting surface 2241c2 are different from each other.

As described above, the luminance distribution of the normal backlight is a luminance distribution asymmetric with respect to the polar angle θ=0° in the azimuth φ: 90° to 270° direction. A case is considered in which light having such an asymmetric luminance distribution is incident on the light control film 2209. In this case, the light emitted from the liquid crystal panel 113 is incident obliquely with respect to the light diffusion portion 2241.

In this case, the relationship between the angles φ1, σ0, and σ1, and the refractive indexes n1 and n2 are defined by the following equation (5). The relationship between the angles φ2, σ0, and σ2, and the refractive indexes n1 and n2 are defined by the following equation (6).

[Expression 1]

$$\sigma_1 = \sin^{-1}\left\{\frac{n_1}{n_2}\sin(180 - 2\psi_1 + \sigma_0)\right\} \quad (5)$$

$$\sigma_2 = \sin^{-1}\left\{\frac{n_1}{n_2}\sin(180 - 2\psi_2 - \sigma_0)\right\} \quad (6)$$

Using the above equations (5) and (6), it is possible to obtain the angle φ1 and the angle φ2 such that the angles σ1 and σ2 are equal.

Figure 35A:
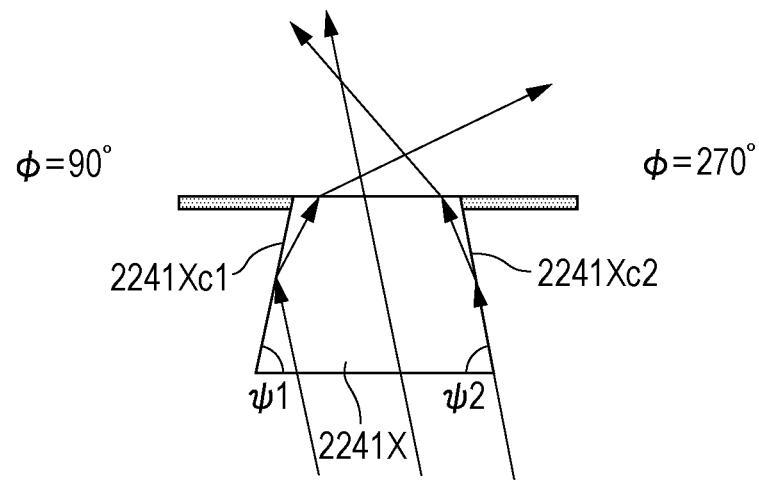
FIG. 35A is a diagram describing reflection of light at reflecting surfaces having different inclination angles.
Figure 35B:
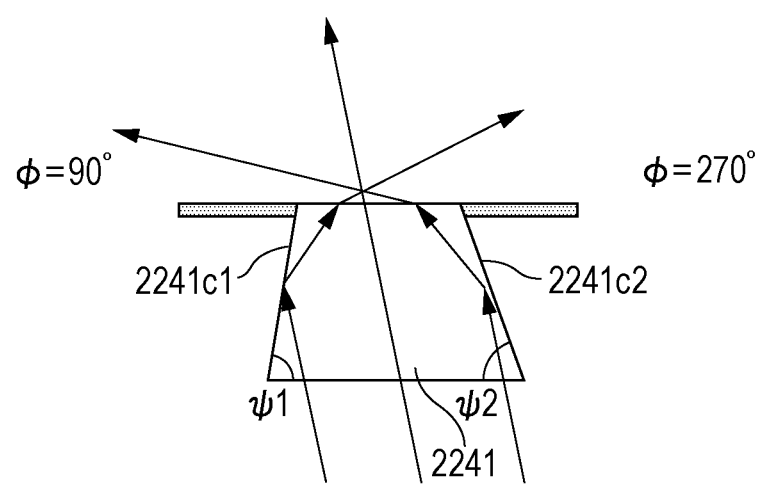
FIG. 35B is a diagram describing reflection of light at reflecting surfaces having different inclination angles.

FIGS. 35A and 35B are diagrams describing reflection of light on the reflecting surface having a different inclination angle.

FIG. 35A is a cross-sectional view of the light diffusion portion 2241X in which the inclination angle φ1 of the first reflecting surface 2241Xc1 and the inclination angle φ2 of the second reflecting surface 2241Xc2, according to a comparative example, are equal with each other. FIG. 35B is a cross-sectional view of the light diffusion portion 2241 in which the inclination angle φ1 of the first reflecting surface 2241c1 and the inclination angle φ2 of the second reflecting surface 2241c2, according to the present embodiment, are different from each other.

As shown in FIG. 35A, it is considered a case of the light diffusion portion 2241X in which the inclination angle φ1 of the first reflecting surface 2241Xc1 and the inclination angle φ2 of the second reflecting surface 2241Xc2 are equal with each other. In this case, if the light emitted from the liquid crystal panel is incident obliquely approximately in the azimuth φ: 90° direction with respect to the light diffusion portion 2241X, the light reflected on the first reflecting surface 2241Xc1 and the light reflected on the second reflecting surface 2241Xc2 are emitted at an emission angle different from each other. Therefore, the luminance peak is easily shifted in a specific azimuthal direction. As a result, it is difficult to increase the symmetry of the luminance distribution.

In order to improve the symmetry of the luminance distribution, it is necessary that the inclination angle of the first reflecting surface and the inclination angle of the second reflecting surface, of the light diffusion portion, be different, in the azimuthal direction in which the incident light is intended to be strongly diffused. Specifically, the inclination angle of the first reflecting surface and the inclination angle of the second reflecting surface, of the light diffusion portion, are different from each other, in the azimuth φ: 90° to 270° direction.

In the present embodiment, as shown in FIG. 35B, the inclination angle φ1 of the first reflecting surface 2241c1 is greater than the inclination angle φ2 of the second reflecting surface 2241c2. In this case, even if the light emitted from the liquid crystal panel is incident obliquely approximately in the azimuth φ: 90° direction with respect to the light diffusion portion 2241, the light reflected on the first reflecting surface 2241c1 and the light reflected on the second reflecting surface 2241c2 are emitted at an equal emission angle. Therefore, it is possible to suppress the luminance peak from being shifted in a specific azimuthal direction, and to enhance the symmetry of the luminance distribution.

A method of creating a light diffusion portion 2241 in which the inclination angle φ1 of the first reflecting surface 2241c1 and the inclination angle φ2 of the second reflecting surface 2241c2 are different from each other in this manner, includes for example, an exposure method by inclining a light source, during exposure of the transparent negative resist. In addition, exposure may be performed by inclining a substrate on which transparent negative resist is coated, without inclining the light source.

According to the present embodiment, it is possible to have a luminance distribution symmetrical in the vertical and horizontal direction of the display screen of the liquid crystal display device. Therefore, the display screen has the same luminance even if viewed from any azimuthal direction. Accordingly, it is possible to suppress gray scale inversion, when the display screen is viewed from an oblique direction, and to obtain a display excellent in a viewing angle characteristic.

Tenth Embodiment

Hereinafter, the tenth embodiment of the present invention will be described with reference to FIGS. 36A and 36B.

The basic configuration of a liquid crystal display device of the present embodiment is the same as that in the seventh embodiment, and a configuration of having a directional backlight is different from that of the seventh embodiment. Therefore, in the present embodiment, the directional backlight will be described.

Figure 36A:
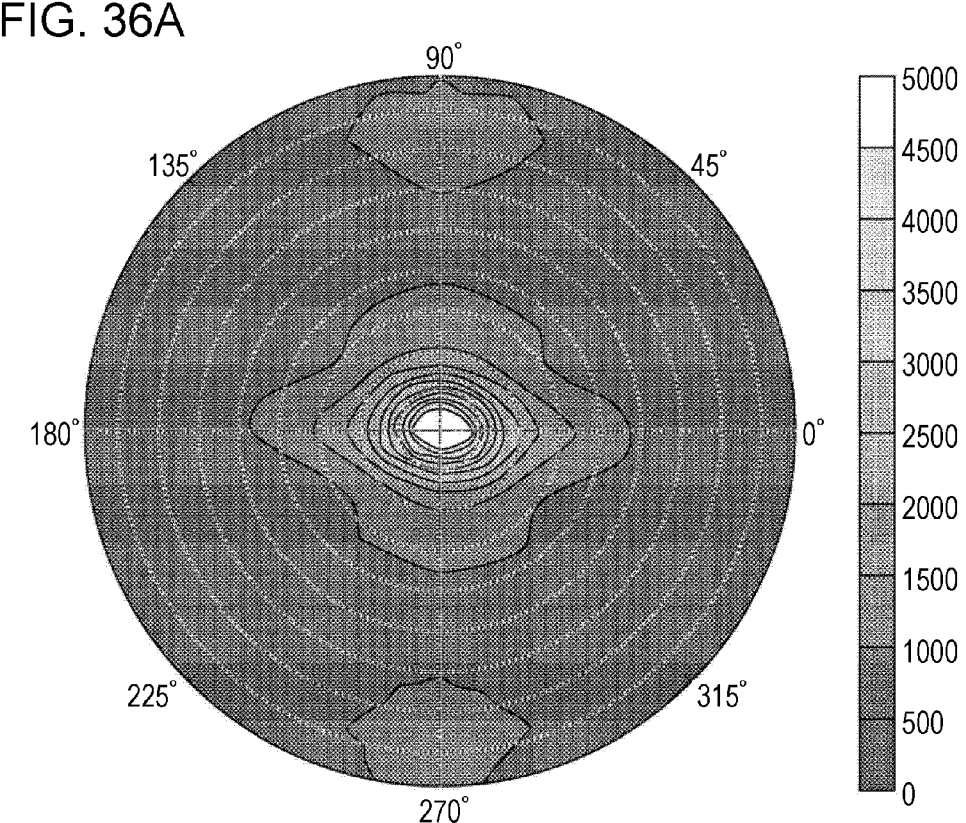
FIG. 36A is a graph showing an intensity distribution of a backlight in a liquid crystal display device of a fourth embodiment.
Figure 36B:
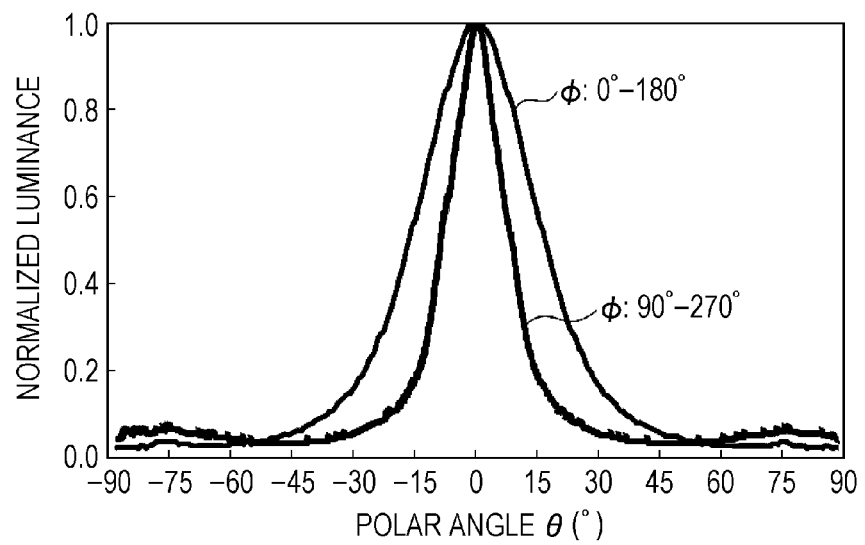
FIG. 36B is a graph showing the intensity distribution of the backlight in the liquid crystal display device of the fourth embodiment.

FIGS. 36A and 36B are diagrams showing the luminance distribution of the backlight in the liquid crystal display device of the present embodiment.

FIG. 36A is iso-luminance curves of the backlight of the present embodiment. FIG. 36B is a diagram for expressing the luminance distribution in the azimuth φ: 0° to 180° direction and the azimuth φ: 90° to 270° direction, as polar coordinates, for the iso-luminance curves in FIG. 36A. In FIG. 36B, the horizontal axis is the polar angle θ[°]. The vertical axis is expressed as normalized luminance, with the display luminance in the front direction as 1.

In the backlight of the present embodiment, the directivity in the front direction is enhanced as compared to the normal backlight described above. Therefore, the front luminance is 1.4 times higher than that of the normal backlight. The backlight of the present embodiment is a directional backlight in which directivity is set higher than that of the normal backlight by controlling the emission direction of light. FIG. 36A is obtained by visualizing the luminance distribution of the directional backlight by using the azimuth φ.

As shown in FIG. 36A, in nine iso-luminance curves, the luminance becomes higher toward the inside from the outside. With respect to the luminance [cd/m²] of the nine iso-luminance curves, in order from the outside, the first is 1000, the second is 1500, the third is 2000, the fourth is 2500, the fifth is 3000, the sixth is 3500, the seventh is 4000, the eighth is 4500, and the ninth is 5000.

The respective nine iso-luminance curves extend in the azimuth φ: 0° to 180° direction. Meanwhile, they are crushed in the azimuth φ: 90° to 270° direction.

As shown in FIGS. 36A and 36B, the angular range having a high luminance in the azimuth φ: 0° to 180° direction is relatively wide. In contrast, the angular range having a high luminance in the azimuth φ: 90° to 270° direction is relatively narrow. In other words, the luminance change of the backlight in the azimuth φ: 0° to 180° direction is relatively small. In contrast, the luminance change of the backlight, in the azimuth φ: 90° to 270° direction is relatively large.

In the present embodiment, the azimuthal direction (azimuth φ: 90° to 270° direction) in which a change in the light transmittance of the polar angle direction is relatively large in the case of applying a constant voltage to the liquid crystal panel, the azimuthal direction in which diffusivity of the light control film is relatively high, and the azimuthal direction in which a change in the luminance of the polar angle direction of the backlight is relatively large are made to approximately coincide.

Even when using a directional backlight having the related luminance distribution, it is possible to obtain a display excellent in viewing angle characteristics, by suppressing gray scale inversion when the display screen is viewed from an oblique direction angle by combining the light control film according to the embodiment.

Eleventh Embodiment

Hereinafter, an eleventh embodiment of the present invention will be described with reference to FIG. 37.

The basic configuration of a liquid crystal display device of the present embodiment is the same as that in the seventh embodiment, and a configuration in which a plurality of light diffusion portions 2341 are arranged on the light control film 2309 is different from that of the seventh embodiment. Therefore, in the present embodiment, the light control film 2309 will be described.

Figure 37:
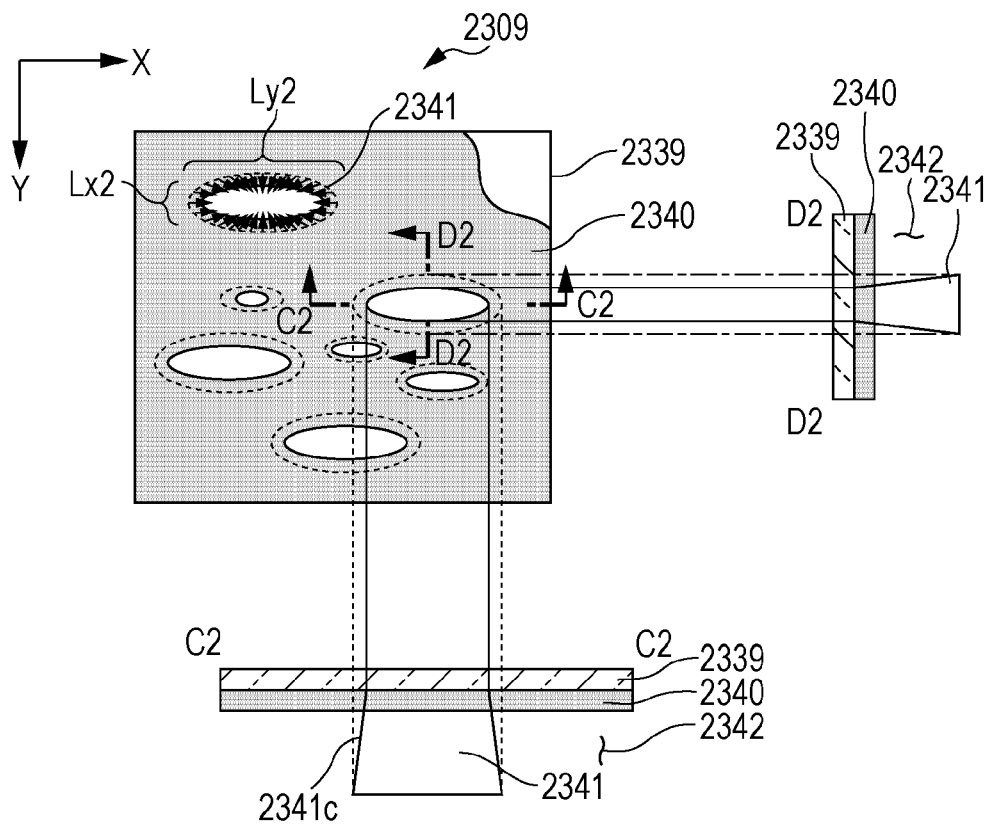
FIG. 37 is a plan view of a light control film of a fifth embodiment.

FIG. 37 is a schematic diagram of a light control film 2309. In FIG. 37, the upper left part is a plan view of the light control film 2309. The lower left part is a cross-sectional view taken along line C2-C2 in the plan view of the upper left part. The right upper part is a cross-sectional view taken along line D2-D2 in the plan view of the upper left part.

In the light control film 2309 of the present embodiment, as shown in the upper left part of FIG. 37, the plurality of the light diffusion portions 2341 are provided while being scattered on one surface of the substrate 2339. The planar shape of the light diffusion portion 2341 as viewed from the direction normal to the substrate 2339 is an elongated ellipse. The light diffusion portion 2341 has a major axis and a minor axis.

As shown in the left lower part and the right upper part of FIG. 37, a portion corresponding to the lower portion of the light shielding layer 2340 is a hollow portion 2342. Air is present in the hollow portion 2342. The light control film 2309 has consecutive hollow portions 2342 in which air is present. The light diffusion portions 2341 are provided while being scattered in the parts other than the hollow portions 2342.

The major axis directions of the plurality of light diffusion portions 2341 are aligned in the X direction approximately. The minor axis directions of the plurality of light diffusion portions 2341 are aligned in the Y direction approximately. Therefore, considering the orientation of the reflecting surface 2341c of the light diffusion portion 2341, the ratio of the reflecting surface 2341c along the X direction is greater than the ratio of the reflecting surface 2341c along the Y direction of the reflecting surface 2341c of the light diffusion portion 2341. Therefore, the amount of the light Ly which is reflected on the reflecting surface 2341c along the X direction and diffuses in the Y direction is larger than the amount of the light Lx which is reflected on the reflecting surface 2341c along the Y direction and diffuses in the X direction.

Thus, the azimuthal direction in which diffusivity of the light control film 2309 is relatively high is the Y direction which is the minor axis direction of the light diffusion portion 2341.

In the present embodiment, the light control film 2309 is arranged on the light emission side of the liquid crystal panel 113, and further, the azimuthal direction (azimuth φ: 90° to 270° direction) in which a change in the light transmittance of the polar angle direction is relatively large in the case of applying a constant voltage to the liquid crystal panel 113 of the light control film 2309, and the azimuthal direction in which diffusivity of the light control film 2309 is relatively high (Y direction which is the minor axis direction of the light diffusion portion 2341) are made to approximately coincide.

Even when using the related light control film 2309, it is possible to obtain a display image excellent in viewing angle characteristics by suppressing gray scale inversion when the display screen is viewed from an oblique direction.

In addition, the planar shape of the light diffusion portion 2341 may include shapes such as a circular shape, a polygonal shape, and a semicircular shape. Further, the light diffusion portion 2341 may be formed while openings thereof are overlapped.

Twelfth Embodiment

Hereinafter, a twelfth embodiment of the present invention will be described with reference to FIGS. 38A to 38F.

The basic configuration of a liquid crystal display device of the present embodiment is the same as that of the seventh embodiment, however, the liquid crystal display device is different from the seventh embodiment in that the shape of the light shielding layer in the light control film has a shape inscribed in the ellipse.

Accordingly, in the present embodiment, the description of the basic configuration of the liquid crystal display device is omitted, and the light shielding layer will be described.

FIGS. 38A to 38F are plan views of the light shielding layer of the present embodiment.

As shown in FIGS. 38A to 38F, the shape of the light shielding layer of the present embodiment has a shape inscribed in the ellipse.

Figure 38A:
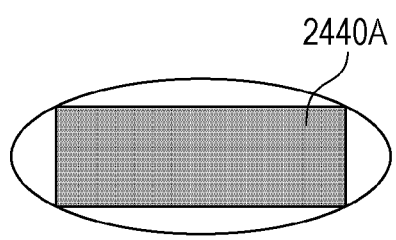
FIG. 38A is a plan view of a light shielding layer of a sixth embodiment.
Figure 38B:
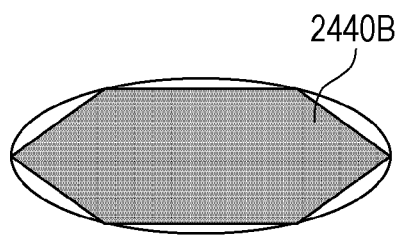
FIG. 38B is a plan view of a light shielding layer of the sixth embodiment.
Figure 38C:
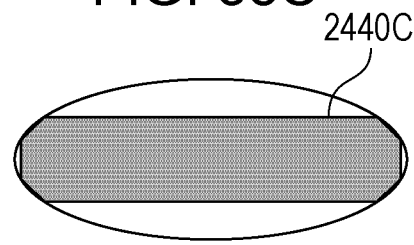
FIG. 38C is a plan view of a light shielding layer of the sixth embodiment.
Figure 38D:
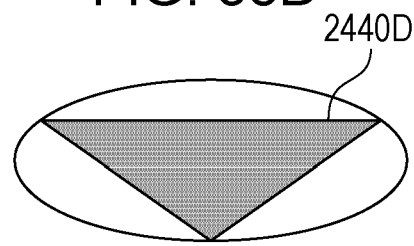
FIG. 38D is a plan view of a light shielding layer of the sixth embodiment.
Figure 38E:
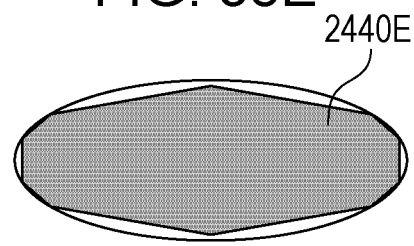
FIG. 38E is a plan view of a light shielding layer of the sixth embodiment.
Figure 38F:
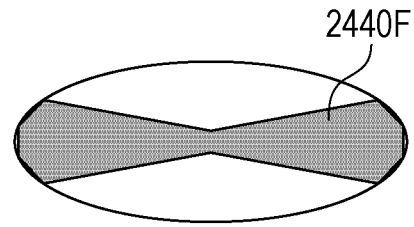
FIG. 38F is a plan view of a light shielding layer of the sixth embodiment.
Figure 39A:
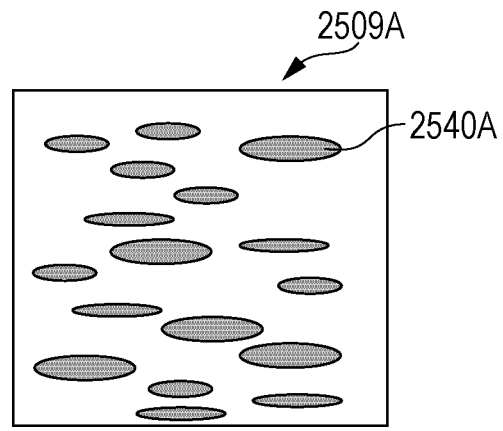
FIG. 39A is a plan view of a light control film of a seventh embodiment.
Figure 39B:
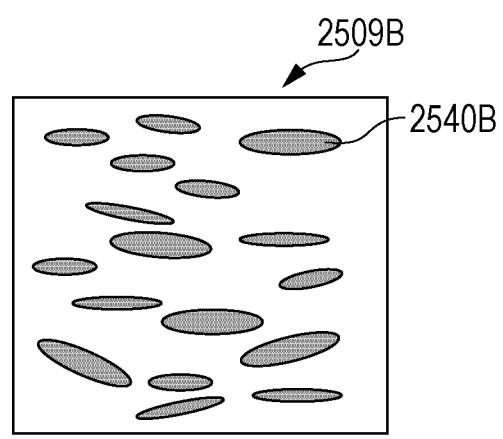
FIG. 39B is a plan view of a light control film of the seventh embodiment.
Figure 39C:
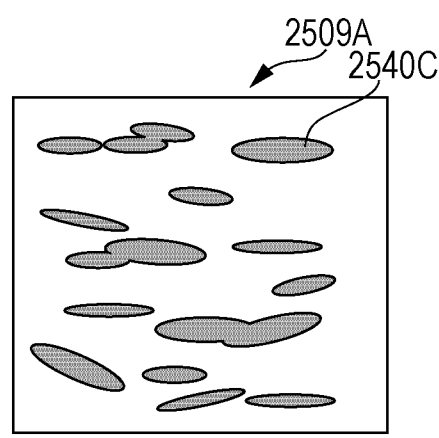
FIG. 39C is a plan view of a light control film of the seventh embodiment.
Figure 39D:
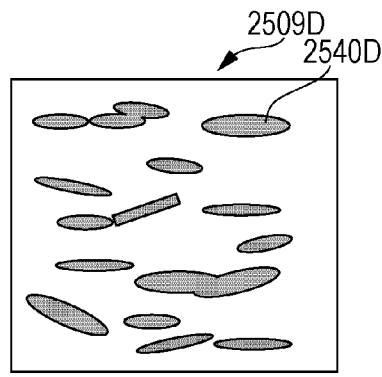
FIG. 39D is a plan view of a light control film of the seventh embodiment.

Specifically, the shape of the light shielding layer 2440A shown in FIG. 38A is a rectangle inscribed in an ellipse. The shape of the light shielding layer 2440B shown in FIG. 38B is a hexagon inscribed in an ellipse. The shape of the light shielding layer 2440C shown in FIG. 38C is an octagon inscribed in an ellipse. The shape of the light shielding layer 2440D shown in FIG. 38D is a triangle inscribed in an ellipse. The shape of the light shielding layer 2440E shown in FIG. 38E is a decagon inscribed in an ellipse. The shape of the light shielding layer 2440F shown in FIG. 38F is a figure inscribed in an ellipse. The central portion of the light shielding layer 2440F is narrower compared to the portion inscribed in an ellipse.

In the present embodiment, the minor axis direction of the light shielding layers 2440A to 2440F and the azimuthal direction (azimuth φ: 90° to 270° direction) in which a change in the light transmittance of the polar angle direction is relatively large in the case of applying a constant voltage to the liquid crystal panel 113 are made to approximately coincide.

Even when using the light shielding layers 2440A to 2440F of the present embodiment, it is possible to obtain a display excellent in viewing angle characteristics by suppressing gray scale inversion when the display screen is viewed from an oblique direction.

Thirteenth Embodiment

Hereinafter, a thirteenth embodiment of the present invention will be described with reference to FIGS. 39A to 39D.

The basic configuration of a liquid crystal display device of the present embodiment is the same as that of the seventh embodiment, and the configuration of the light shielding layer in the light control film is different from that of the seventh embodiment.

Accordingly, in the present embodiment, the description of the basic configuration of the liquid crystal display device will be omitted, and the light control film will be described.

FIGS. 39A to 39D are plan views of a light control film of the present embodiment.

As shown in FIGS. 39A to 39D, in the light control film of the present embodiment, the configuration of a light shielding layer is different from that of the light control film of the first embodiment.

Specifically, in the light control film 29 of the seventh embodiment, the ratio of the length of the minor axis to the length of the major axis is approximately equal in respect to the light shielding layers 240. In contrast, in the light control film 2509A (the light control film 2509) shown in FIG. 39A, light shielding layers 2540A (light shielding layers 2540) having different ratios of the lengths of the minor axis to the lengths of the major axes are mixed.

Furthermore, in the light control film 29 of the seventh embodiment, the long axes of the respective light shielding layers 240 are arranged in the azimuth φ: 0° to 180° direction. In contrast, in the light control film 2509B shown in FIG. 39B, the long axes of some light shielding layers 2540B out of the plurality of light shielding layers 2540B faces a direction different from the long axes of other light shielding layers 2540B.

Further, in the light control film 29 of the seventh embodiment, all of the plurality of light shielding layers 240 are arranged while being scattered. In contrast, in the light control films 2509C shown in FIG. 39C, some light shielding layers 2540C out of the plurality of light shielding layers 2540C are connected to some of the other light shielding layers 2540C.

Further, in the light control film 29 of the seventh embodiment, all shapes of the plurality of light shielding layers 240 are elliptical. In contrast, in the light control film 2509D shown in FIG. 39D, the shapes of some light shielding layers 2540D out of the plurality of light shielding layers 2540D are rectangular.

Even when using the light control films 2509A to 2509D of the present embodiment, it is possible to obtain a display excellent in viewing angle characteristics by suppressing gray scale inversion when the display screen is viewed from an oblique angle.

Fourteenth Embodiment

Hereinafter, the fourteenth embodiment of the present invention will be described with reference to FIGS. 40A, 40B, 41A, and 41B.

The basic configuration of a liquid crystal display device of the present embodiment is the same as that of the seventh embodiment, and the configuration of the reflecting surface of the light diffusion portion of the light control film is different from that of the seventh embodiment.

Accordingly, in the present embodiment, the description of the basic configuration of the liquid crystal display device will be omitted, and the light control film will be described.

Figure 40A:
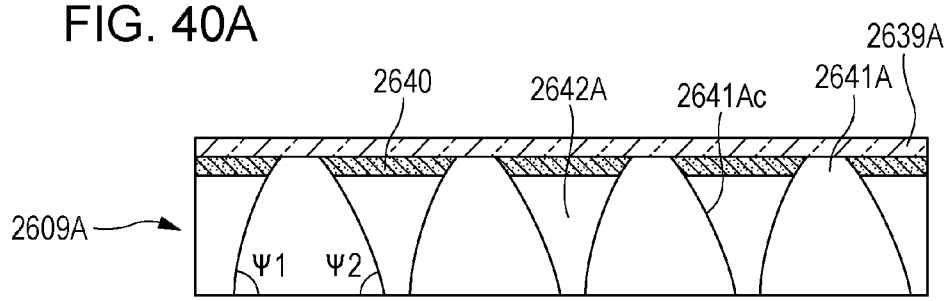
FIG. 40A is a cross-sectional view of a light control film of an eighth embodiment.
Figure 40B:
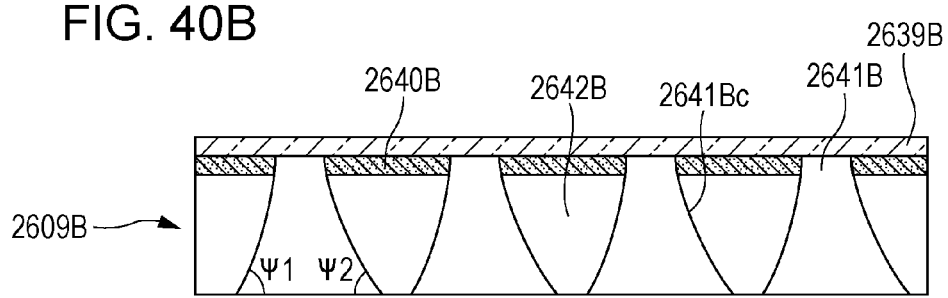
FIG. 40B is a cross-sectional view of the light control film of the eighth embodiment.

FIGS. 40A and 40B are cross-sectional views of the light control films 2609A and 2609B of the present embodiment.

As shown in FIGS. 40A and 40B, the configurations of the reflecting surfaces the light diffusion portions 2641A and 641B in the light control films 2609A and 2609B of the present embodiment are different from those of the light control film 29 of the first embodiment.

Specifically, in the light control film 29 of the seventh embodiment, the inclination angle of the reflecting surface 241c of the light diffusion portion 40 is constant. In contrast, in the light control films 2609A and 609B shown in FIGS. 40A and 40B, the inclination angle of the reflecting surface of the light diffusion portions 2641A and 2641B is changed continuously. The cross-sectional shapes of the reflecting surfaces of the light diffusion portions 2641A and 2641B are curved inclined surfaces.

In the light control film 2609A shown in FIG. 40A, the reflecting surface 2641Ac of the light diffusion portion 2641A is curved towards the hollow portion 2642A side, and the part on the reflecting surface 2641Ac side of the hollow portion 2642A is concave.

In the light control film 2609B shown in FIG. 40B, the reflecting surface 2641Bc of the light diffusion portion 2641B is curved towards the hollow portion 2642B side, and the part on the reflecting surface 2641Bc side of the hollow portion 2642B is convex.

Figure 41A:
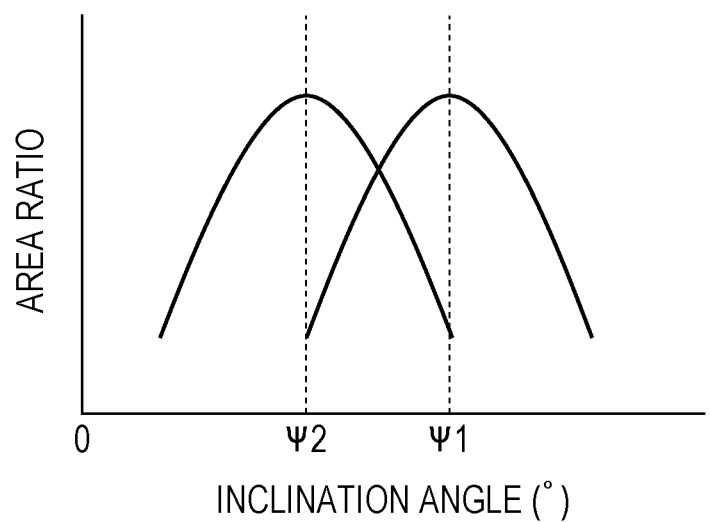
FIG. 41A is a diagram describing a relationship between an inclination angle and an area ratio of the reflecting surface of the light diffusion portion.
Figure 41B:
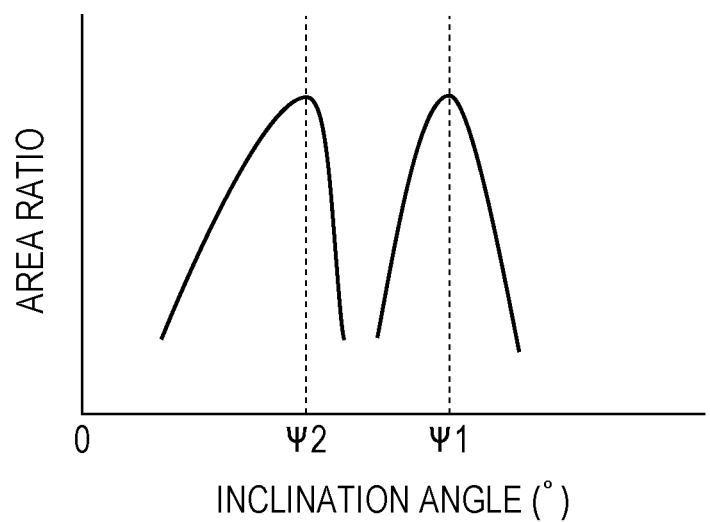
FIG. 41B is a diagram describing a relationship between an inclination angle and an area ratio of the reflecting surface of the light diffusion portion.

FIGS. 41A and 41B are diagrams describing the relationship between the inclination angle and the area ratio of the reflecting surface of the light diffusion portion.

FIG. 41A is a diagram in the case in which the distribution of the inclination angle of the reflecting surface of the light diffusion portion is the same in the first reflecting surface and the second reflecting surface. FIG. 41B is a diagram in the case in which the distribution of the inclination angle of the reflecting surface of the light diffusion portion is different in the first reflecting surface and the second reflecting surface. In FIGS. 41A and 41B, the horizontal axis represents the inclination angle of the reflecting surface of the light diffusion portion. The vertical axis represents the area ratio of the reflecting surface of the light diffusion portion. The area ratio is a ratio of the area of a part having a certain inclination angle with respect to the area of all reflecting surfaces, when the reflecting surface of the light diffusion portion is viewed from the side. In the present embodiment, since the reflecting surface is curved, the inclination angle is an angle between a tangent line at a predetermined position in the curved portion of the reflecting surface and the light incident end surface of the light diffusion portion. Here, a case in which the inclination angle $\phi1$ of the first reflecting surface is greater than the inclination angle $\phi2$ of the second reflecting surface will be described as an example.

In the present embodiment, the angular distribution has a width in the inclination angle of the reflecting surface of the light diffusion portion, with the inclination angle which is a main angle as a center. As shown in FIG. 41A, the distribution of the inclination angle of the reflecting surface of the light diffusion portion may be respectively the same inclination distributions, in the inclination angle $\phi1$ of the first reflecting surface and the inclination angle $\phi2$ of the second reflecting surface. As shown in FIG. 41B, there may be different respective inclination distributions, in the inclination angle $\phi1$ of the first reflecting surface and the inclination angle $\phi2$ of the second reflecting surface.

However, the inclination angle $\phi1$ of the first reflecting surface contributes more to the symmetry of the luminance distribution than the inclination angle $\phi2$ of the second reflecting surface. Therefore, it is preferable that the distribution of the inclination angle $\phi1$ of the first reflecting surface be narrow in order to improve the symmetry of the luminance distribution.

Even when using the light control films 2609A and 2609B of the present embodiment, it is possible to obtain a display excellent in viewing angle characteristics by suppressing gray scale inversion when the display screen is viewed from an oblique direction.

Fifteenth Embodiment

Hereinafter, a fifteenth embodiment of the present invention will be described with reference to FIGS. 42A and 42B.

The basic configuration of a liquid crystal display device of the present embodiment is the same as that in the fourteenth embodiment, and the configuration of the reflecting surface of the light diffusion portion of the light control film is different from that of the fourteenth embodiment.

Accordingly, in the present embodiment, the description of the basic configuration of the liquid crystal display device will be omitted, and the light control film will be described.

Figure 42A:
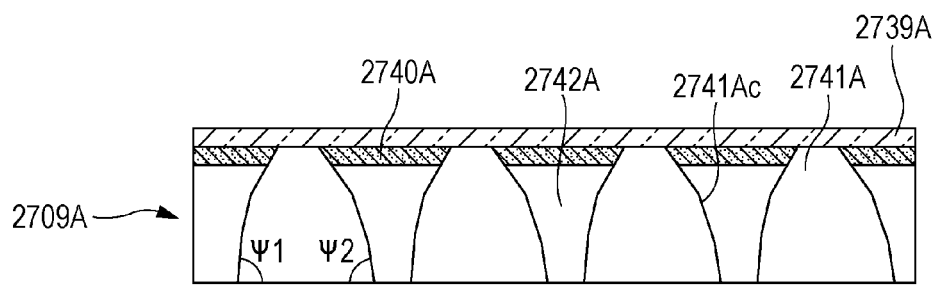
FIG. 42A is a cross-sectional view of a light control film of a ninth embodiment.
Figure 42B:
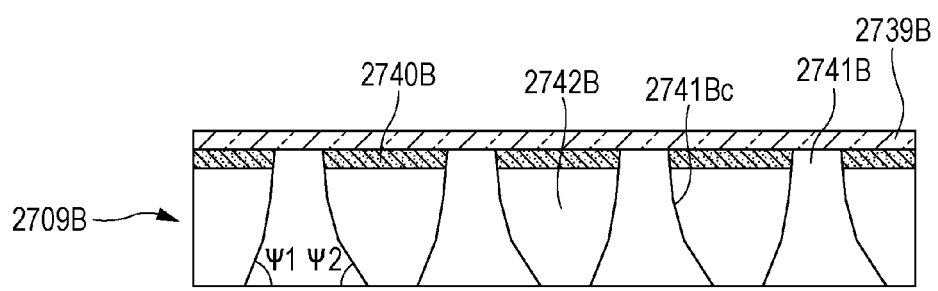
FIG. 42B is a cross-sectional view of the light control film of the ninth embodiment.

FIGS. 42A and 42B are cross-sectional views of the light control films 2709A and 2709B of the present embodiment.

As shown in FIGS. 42A and 42B, the light control films 2709A and 2709B of the present embodiment are different from the light control films 2609A and 2609B of the eighth embodiment in the configuration of the reflecting surface of the light diffusion portion.

Specifically, in the light control films 2609A and 2609B of the fourteenth embodiment, the inclination angles of the reflecting surfaces of the light diffusion portions 2641A and 2641B are changed continuously, and the shapes of the cross sections of the reflecting surfaces of the light diffusion portions 2641A and 2641B are curved inclined surfaces. In contrast, in the light control films 2709A and 2709B shown in FIGS. 42A and 42B, the reflecting surfaces of the light diffusion portions 2741A and 2741B have a plurality of different inclination angles. The shapes of the cross sections of the reflecting surfaces of the light diffusion portions 2741A and 2741B are inclined surfaces of the polygonal line.

In the light control film 2709A shown in FIG. 42A, the reflecting surface 2741Ac of the light diffusion portion 2741A has three inclined surfaces having different inclination angles, and a part on the reflecting surface 2741Ac side of the hollow portion 2742A is concave.

In the light control film 2709B shown in FIG. 42B, the reflecting surface 2741Bc of the light diffusion portion 2741B has three inclined surfaces having different inclination angles, and a part on the reflecting surface 2741Bc side of the hollow portion 2742B is convex.

Even when using the light control films of the present embodiment, it is possible to obtain a display excellent in viewing angle characteristics by suppressing gray scale inversion when the display screen is viewed from an oblique direction.

In addition, the technical scope of the present invention is not limited to the above embodiments, and various modification examples are possible without departing from the scope of the present invention.

For example, the azimuthal direction in which a luminance viewing angle of the liquid crystal panel is relatively narrow and the azimuthal direction in which diffusivity of the light control film is relatively high do not need to coincide with each other perfectly, and may approximately coincide.

Generally, in the assembly process of the liquid crystal display device, the shift in the rotation direction of the alignment of the liquid crystal panel and the light control film is considered to be within about 3°. Therefore, the case in which the azimuthal direction in which a luminance viewing angle of the liquid crystal panel is relatively narrow and the azimuthal direction in which diffusivity of the light control film is relatively high are shifted by about 3° is included in the technical scope of the present invention.

Further, a configuration is possible in which at least one of an anti-reflection layer, a polarizing filter layer, an antistatic layer, an anti-glare treatment layer, and an antifouling treatment layer is provided on the viewing side of the substrate of the light control film in the above embodiments. According to this structure, it is possible to add a function of reducing the reflection of external light, a function of preventing the adhesion of dirt and dust, a function of preventing scratches, and the like, depending on the type of the layer provided on the viewing side of the substrate, and to prevent deterioration over time of the viewing angle characteristics.

Further, in the above embodiments, the shape of the light diffusion portion or the space portion is a truncated pyramid shape or a truncated elliptical cone shape, but may have other shapes. Further, the inclination angle of the reflecting surface of the light diffusion portion may not necessarily be symmetrical about the optical axis. In the case in which the shape of the light diffusion portion is a truncated pyramid shape or a truncated elliptical cone shape as the above embodiments, since the inclination angle of the reflecting surface of the light diffusion portion is linearly symmetric about the optical axis, the angular distribution which is linearly symmetric about the optical axis is obtained. In contrast, if asymmetric angular distribution is required intentionally according to the application and usage of the display device, when there is a request for widening the viewing angle, for example, only in the upper side or the right side of the screen, the inclination angle of the reflecting surface of the light diffusion portion may be asymmetric.

In addition, the detailed configuration regarding the materials, number, arrangement, and the like of respective constituent members of the liquid crystal display device is not limited to the embodiments described above, and can be appropriately changed. For example, in the above embodiments, examples of arranging the polarizer and the retardation plate on the outside of the liquid crystal panel are shown, but instead of such a configuration, the polarizing layer and the retardation layer may be formed in the inside of a pair of substrates constituting the liquid crystal panel.

EXAMPLES

Hereinafter, the aspects of the present invention will be further illustrated specifically through the embodiments and comparative examples, but aspects of the present invention are not limited to the following examples.

In order to verify the effects of the liquid crystal display device of the present invention, the gray scale luminance characteristics in the liquid crystal display device according to embodiments of the present invention and the liquid crystal display of comparative examples are compared. Hereinafter, these comparison results will be described.

As the liquid crystal panel, the liquid crystal panel of the TN mode is used. As the retardation film, the WV film manufactured by Fuji Photo Film Co., Ltd. is used.

Comparative Example 1B

As the liquid crystal display devices, those which are the same as the configurations described in PTL 4 (Japanese Unexamined Patent Application Publication No. 2002-90527) are used. The liquid crystal display device includes a liquid crystal cell, and an optical compensating polarizer. The liquid crystal display device does not include a light control film. The backlight is a normal backlight.

Comparative Example 2B

As the liquid crystal display devices, those which are the same as the configurations described in PTL 5 (International Publication No. WO 2009/044520) are used. The liquid crystal display device includes a liquid crystal display panel, and a light diffusing sheet. The liquid crystal display device does not include a light control film. The backlight is a normal backlight.

The parameters of the light diffusion sheet are as shown below. The refractive index of the high refractive index region is 1.59. The refractive index of the low refractive index region is 1.40. The inclination angle of the interface between the high refractive index region and the low refractive index region is 82°. The pitch of the low refractive region is 50 µm. The height of the low refractive area of an isosceles triangle at a cross-sectional view is 110 µm. The opening ratio is 50%.

Comparative Example 3B

As the liquid crystal display devices, those having a light control film that isotropically diffuses light are used. The shape of the light shielding layer in the light control film is circular in plan view. The backlight is a directional backlight.

The parameters of the light control film are as shown below. The diameter of the light shielding layer is 20 µm. The refractive index of the light diffusion portion is 1.5. The refractive index of the air layer is 1.0. The inclination angle of the reflecting surface of the light diffusion portion is 82°. The height of the light diffusion portion is 20 µm. The opening ratio is 50%.

As the liquid crystal display devices of "EXAMPLES 1B to 5B", those having a light control film that anisotropically diffuses light are used. The shape of the light shielding layer in the light control film is elliptical in plan view.

Example 1B

The backlight is a normal backlight. The liquid crystal display device of EXAMPLE 1B corresponds to the liquid crystal display device 21 of the first embodiment.

The parameters of the light control films are as shown below. The length of the major axis of the light shielding layer is 20 µm. The length of the minor axis of the light shielding layer is 10 µm. The refractive index of the light diffusion portion is 1.5. The refractive index of the air layer is 1.0. The inclination angle of the reflecting surface of the light diffusion portion is 82°. The height of the light diffusion portion is 20 µm. The opening ratio is 50%.

Example 2B

Those including a light scattering film on the viewing side are used. The backlight is a normal backlight. The liquid crystal display device of EXAMPLE 2B corresponds to the liquid crystal display device 2101 of the second embodiment.

The parameters of the light control film are the same as those in EXAMPLE 1B.

Example 3B

Those including a first reflecting surface and a second reflecting surface in which light diffusion portions have inclination angles different from each other are used. The backlight is a normal backlight. The liquid crystal display device of EXAMPLE 3B corresponds to the liquid crystal display device of the third embodiment.

The parameters of the light control film are basically the same as those in EXAMPLE 1B. However, the inclination angle of the reflecting surface of the light diffusion portion in the azimuth φ: 90° to 270° direction (vertical direction of the screen) is different from that in EXAMPLE 1. In the azimuth φ: 90° to 270° direction (vertical direction of the screen), the inclination angle of the reflecting surface in the azimuth φ: 90° direction is 88°. The inclination angle of the reflecting surface in the azimuth φ: 270° direction is 76°. In addition, the aperture ratio is set to 60%, 70%, 80%, and 90%, in addition to 50%.

Example 4B

The backlight is a directional backlight. The liquid crystal display device of EXAMPLE 4B corresponds to that in which the normal backlight is replaced with the directional backlight, in the liquid crystal display device 21 of the first embodiment.

Example 5B

The backlight is a directional backlight. The liquid crystal display device of EXAMPLE 5B corresponds to that in which the normal backlight and is replaced with the directional backlight, in the liquid crystal display device 2101 of the second embodiment.

For each comparative example and each example, the luminance gray scale characteristics are confirmed by performing simulation.

As simulation software, Light Tools is used. The results are shown in FIGS. 43A to 54B. In FIGS. 43A to 54B, the horizontal axis is a polar angle [°], and the vertical axis is a normalized luminance. The normalized luminance is a value in which the display luminance in the front direction when input gray scale is maximum gray scale (255 gray scale) is expressed as one.

Figure 43A:
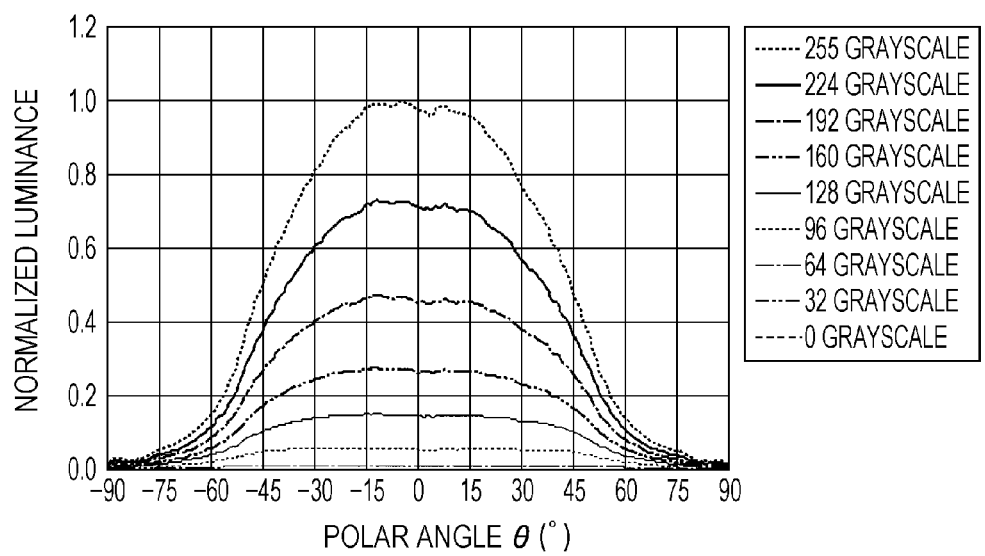
FIG. 43A is a diagram showing gray scale luminance characteristics when using a liquid crystal display device of COMPARATIVE EXAMPLE 1.
Figure 43B:
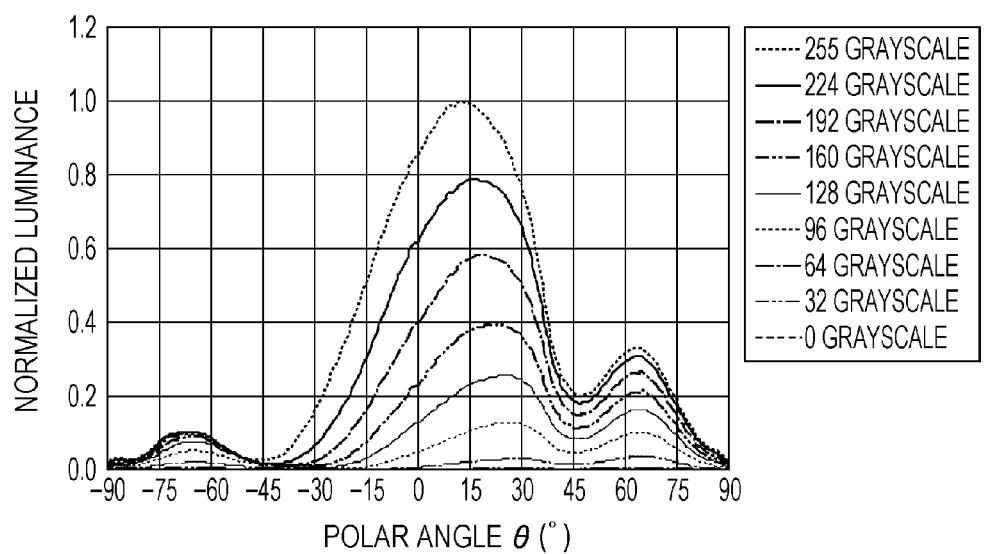
FIG. 43B is a diagram showing gray scale luminance characteristics when using the liquid crystal display device of COMPARATIVE EXAMPLE 1.

FIGS. 43A and 43B are diagrams showing gray scale luminance characteristics when using the liquid crystal display device of COMPARATIVE EXAMPLE 1B. FIG. 43A is diagram showing a gray scale luminance characteristics in the azimuth φ: 0° to 180° direction (horizontal direction of the screen). FIG. 43B is a diagram showing gray scale luminance characteristics in the azimuth φ: 90° to 270° direction (vertical direction of the screen).

FIGS. 44A, 44B, 45A and 45B are diagrams showing gray scale luminance characteristics when using the liquid crystal display device of COMPARATIVE EXAMPLE 2B.

Figure 44A:
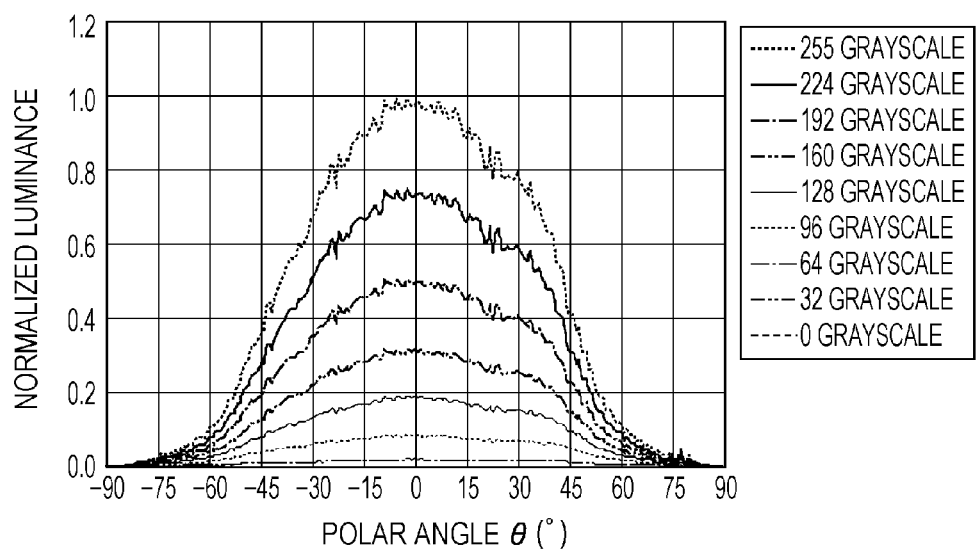
FIG. 44A is a diagram showing gray scale luminance characteristics when using a liquid crystal display device of COMPARATIVE EXAMPLE 2.
Figure 44B:
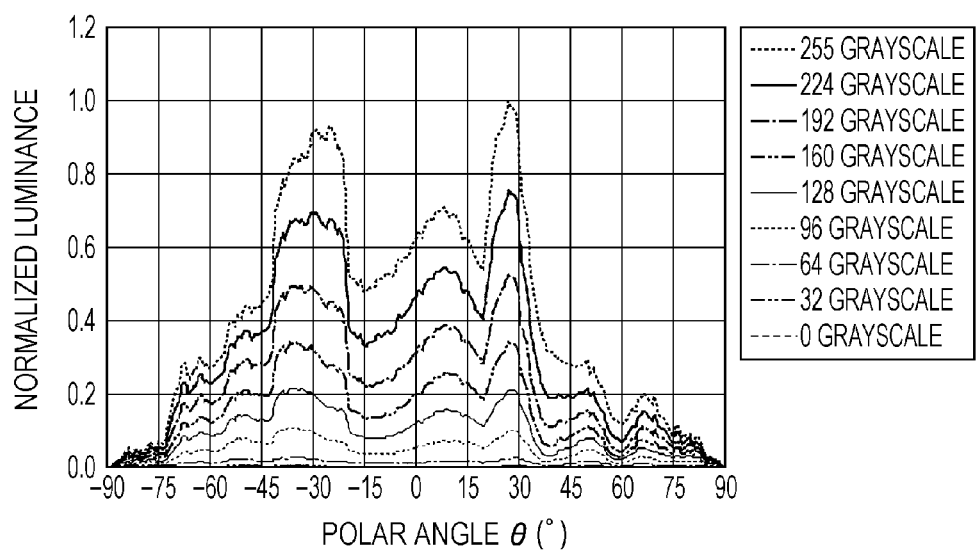
FIG. 44B is a diagram showing gray scale luminance characteristics when using the liquid crystal display device of COMPARATIVE EXAMPLE 2.

FIG. 44A is a diagram showing gray scale luminance characteristics in the azimuth φ: 0° to 180° direction (horizontal direction of the screen). FIG. 44B is a diagram showing gray scale luminance characteristics in the azimuth φ: 90° to 270° direction (vertical direction of the screen).

Figure 45A:
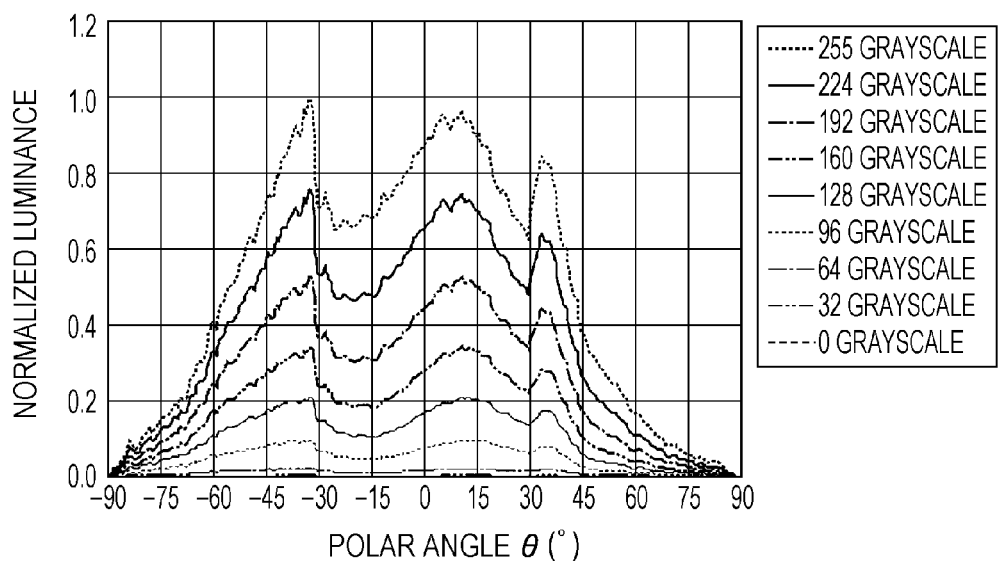
FIG. 45A is a diagram showing gray scale luminance characteristics when using the liquid crystal display device of COMPARATIVE EXAMPLE 2.
Figure 45B:
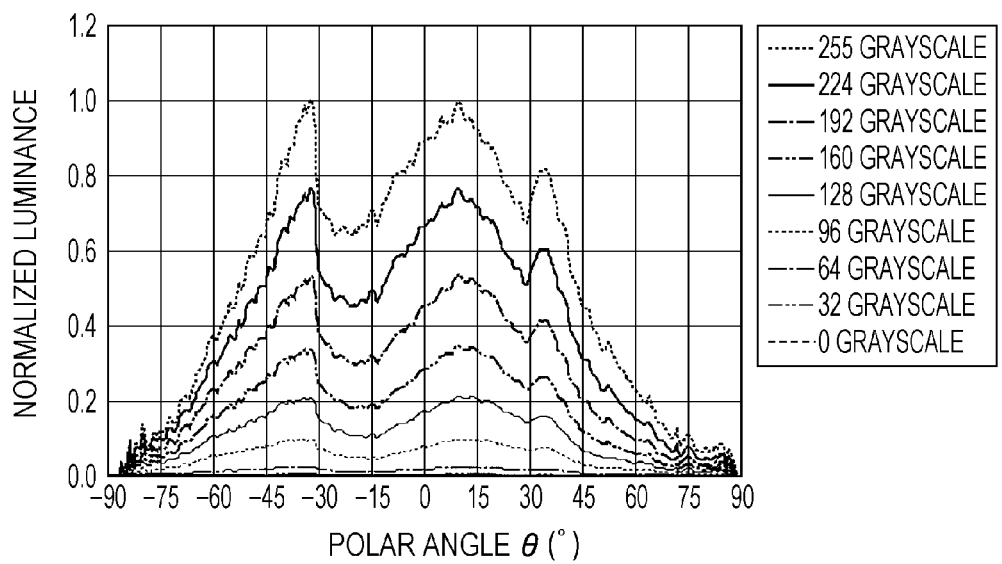
FIG. 45B is a diagram showing gray scale luminance characteristics when using the liquid crystal display device of COMPARATIVE EXAMPLE 2.

FIG. 45A is a diagram showing gray scale luminance characteristics in the azimuth φ: 45° to 225° direction. FIG. 45B is a diagram showing gray scale luminance characteristics in the azimuth φ: 135° to 315° direction.

Figure 46A:
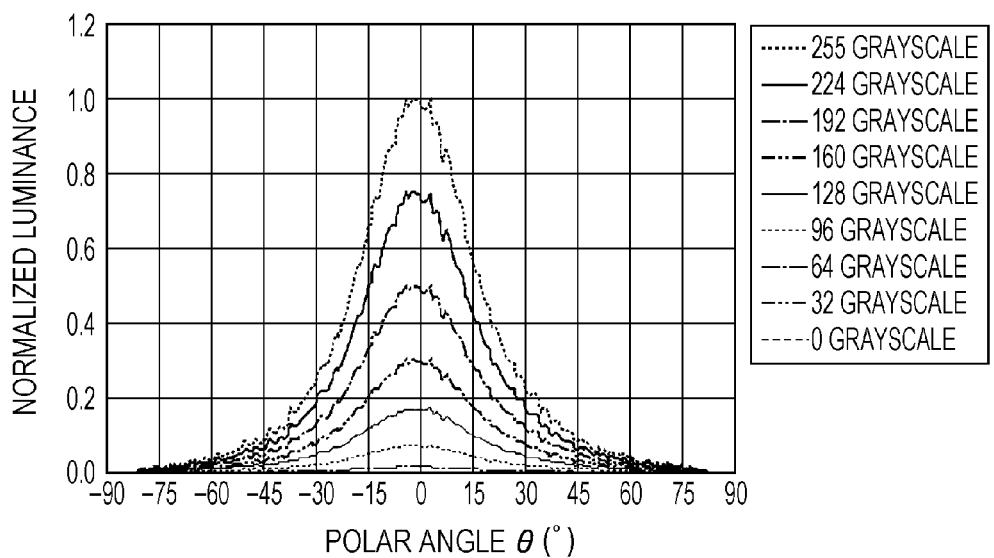
FIG. 46A is a diagram showing gray scale luminance characteristics when using a liquid crystal display device of COMPARATIVE EXAMPLE 3.
Figure 46B:
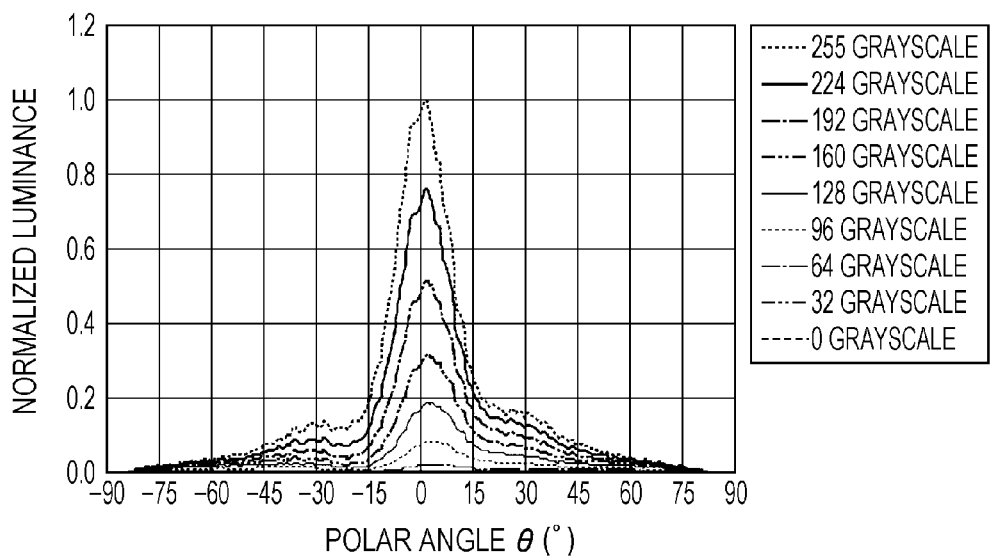
FIG. 46B is a diagram showing gray scale luminance characteristics when using the liquid crystal display device of COMPARATIVE EXAMPLE 3.

FIGS. 46A and 46B are diagrams showing gray scale luminance characteristics when using the liquid crystal display device of COMPARATIVE EXAMPLE 3B. FIG. 46A is a diagram showing gray scale luminance characteristics in the azimuth φ: 0° to 180° direction (horizontal direction of the screen). FIG. 46B is a diagram showing gray scale luminance characteristics in the azimuth φ: 90° to 270° direction (vertical direction of the screen).

FIGS. 47A, 47B, 48A and 48B are diagrams showing gray scale luminance characteristics when using the liquid crystal display device of EXAMPLE 1B.

Figure 47A:
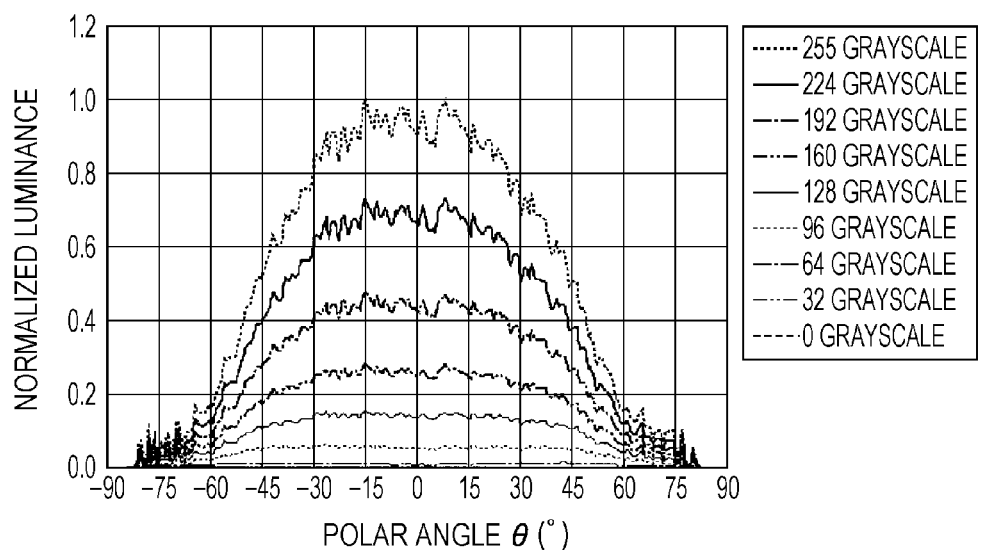
FIG. 47A is a diagram showing gray scale luminance characteristics when using a liquid crystal display device of EXAMPLE 1.
Figure 47B:
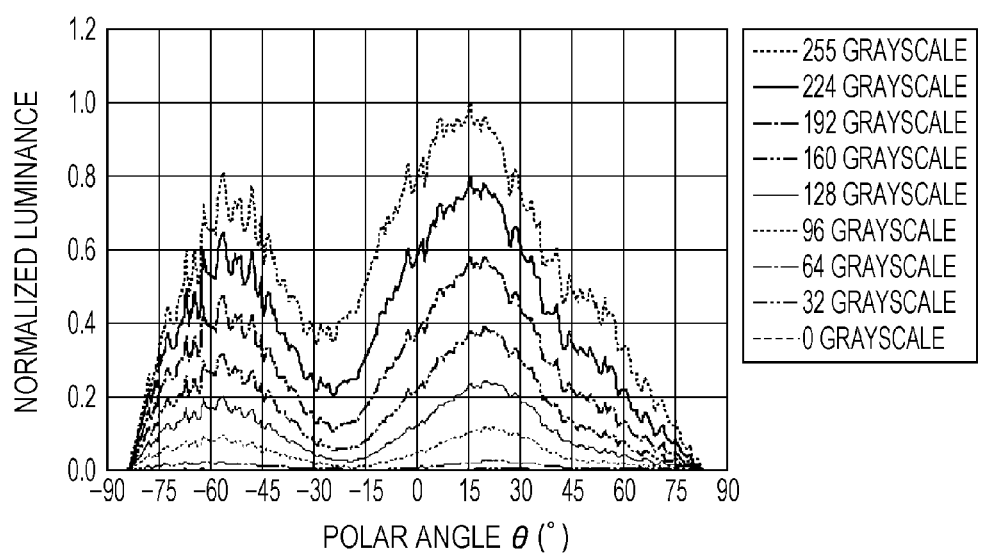
FIG. 47B is a diagram showing gray scale luminance characteristics when using the liquid crystal display device of EXAMPLE 1.

FIG. 47A is a diagram showing gray scale luminance characteristics in the azimuth φ: 0° to 180° direction (horizontal direction of the screen). FIG. 47B is a diagram showing gray scale luminance characteristics in the azimuth φ: 90° to 270° direction (vertical direction of the screen).

Figure 48A:
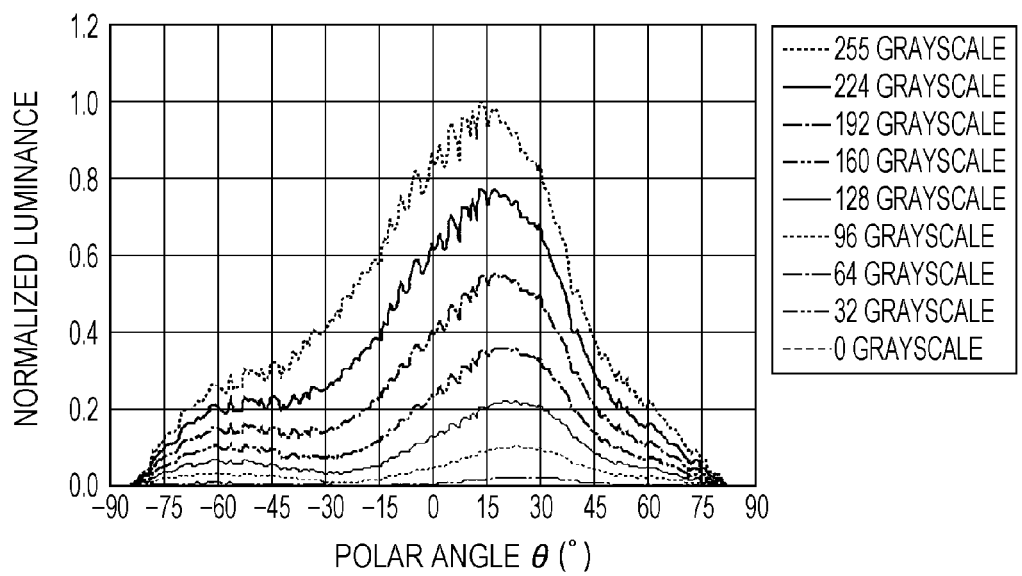
FIG. 48A is a diagram showing gray scale luminance characteristics when using a liquid crystal display device of EXAMPLE 1.
Figure 48B:
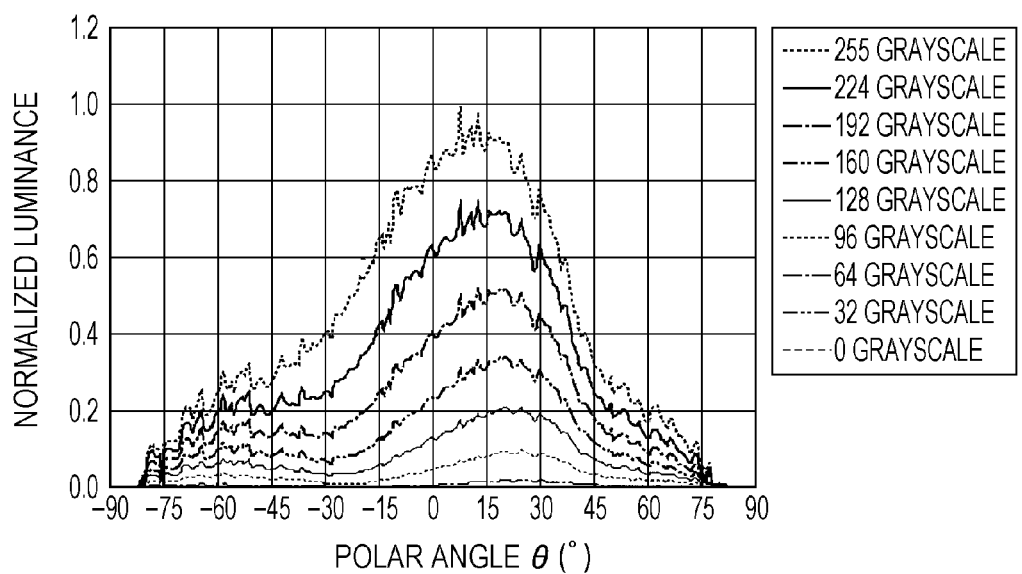
FIG. 48B is a diagram showing gray scale luminance characteristics when using the liquid crystal display device of EXAMPLE 1.

FIG. 48A is a diagram showing gray scale luminance characteristics in the azimuth φ: 45° to 225° direction. FIG. 48B is a diagram showing gray scale luminance characteristics in the azimuth φ: 135° to 315° direction.

Figure 49A:
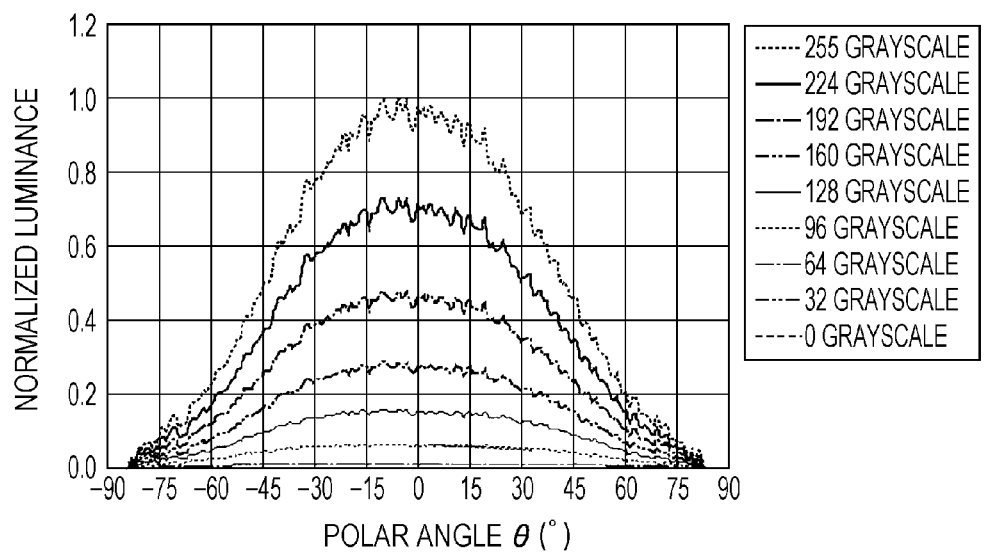
FIG. 49A is a diagram showing gray scale luminance characteristics when using a liquid crystal display device of EXAMPLE 2.
Figure 49B:
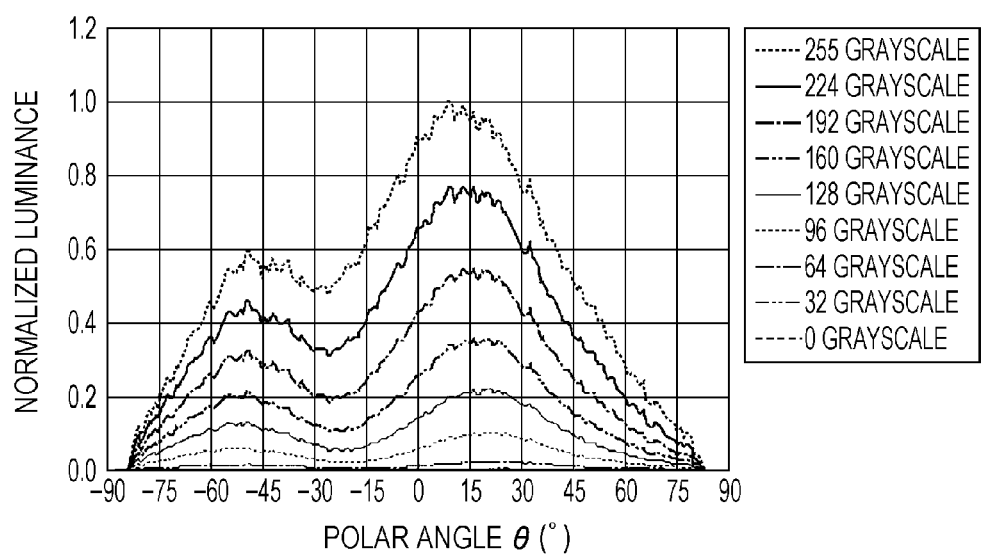
FIG. 49B is a diagram showing gray scale luminance characteristics when using the liquid crystal display device of EXAMPLE 2.

FIGS. 49A and 49B are diagrams showing gray scale luminance characteristics when using the liquid crystal display device of EXAMPLE 2B. FIG. 49A is a diagram showing gray scale luminance characteristics in the azimuth φ: 0° to 180° direction (horizontal direction of the screen). FIG. 49B is a diagram showing gray scale luminance characteristics in the azimuth φ: 90° to 270° direction (vertical direction of the screen).

FIGS. 50A and 50B are diagrams showing gray scale luminance characteristics when an aperture ratio is set to 50%, using the liquid crystal display device of EXAMPLE 3B.

FIG. 50A is a diagram showing gray scale luminance characteristics in the azimuth φ: 0° to 180° direction (horizontal direction of the screen). FIG. 50B is a diagram showing gray scale luminance characteristics in the azimuth φ: 90° to 270° direction (vertical direction of the screen).

FIGS. 51A to 51D are diagrams showing gray scale luminance characteristics in the azimuth φ: 0° to 180° direction (horizontal direction of the screen) when using the liquid crystal display device of EXAMPLE 3B.

Figure 51A:
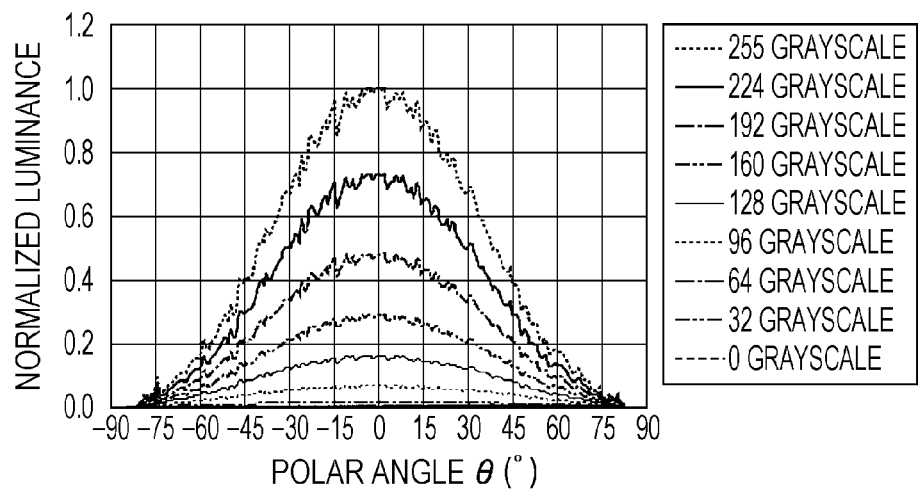
FIG. 51A is a diagram showing gray scale luminance characteristics in an azimuth $\varphi$: 0° to 180° direction (horizontal direction of a screen) when using the liquid crystal display device of EXAMPLE 3.
Figure 51B:
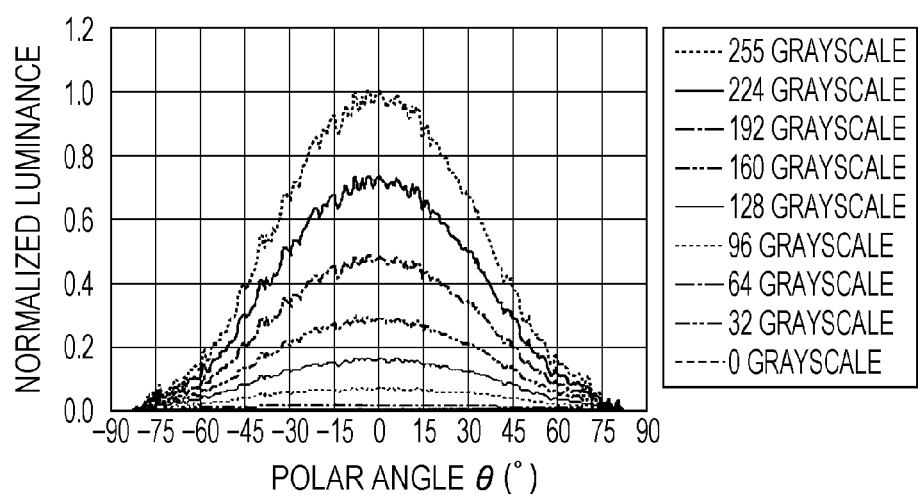
FIG. 51B is a diagram showing gray scale luminance characteristics in the azimuth $\varphi$: 0° to 180° direction (horizontal direction of a screen) when using the liquid crystal display device of EXAMPLE 3.
Figure 51C:
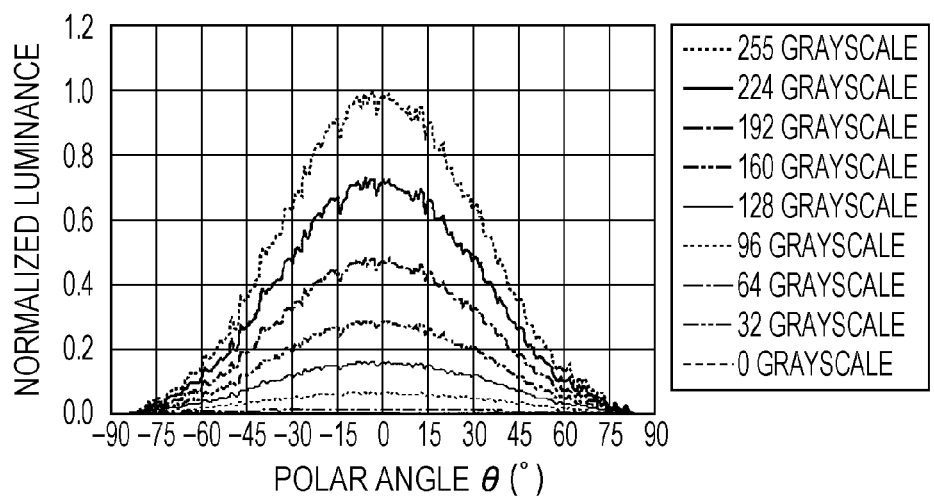
FIG. 51C is a diagram showing gray scale luminance characteristics in the azimuth $\varphi$: 0° to 180° direction (horizontal direction of a screen) when using the liquid crystal display device of EXAMPLE 3.
Figure 51D:
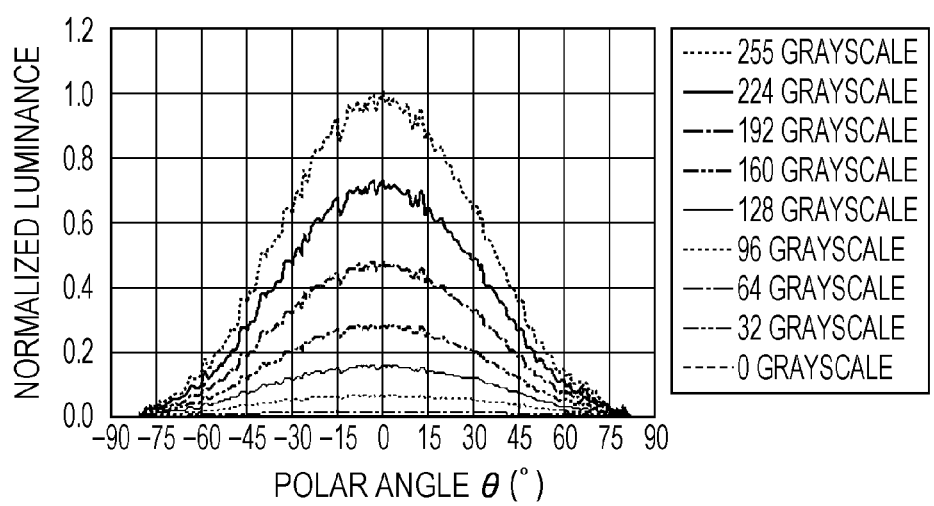
FIG. 51D is a diagram showing gray scale luminance characteristics in the azimuth $\varphi$: 0° to 180° direction (horizontal direction of a screen) when using the liquid crystal display device of EXAMPLE 3.

FIG. 51A is a diagram when an aperture ratio is set to 60%. FIG. 51B is a diagram when an aperture ratio is set to 70%. FIG. 51C is a diagram when an aperture ratio is set to 80%. FIG. 51D is a diagram when an aperture ratio is set to 90%.

FIGS. 52A to 52D are diagrams showing gray scale luminance characteristics in the azimuth φ: 90° to 270° direction (vertical direction of the screen) when using the liquid crystal display device of EXAMPLE 3B.

Figure 52A:
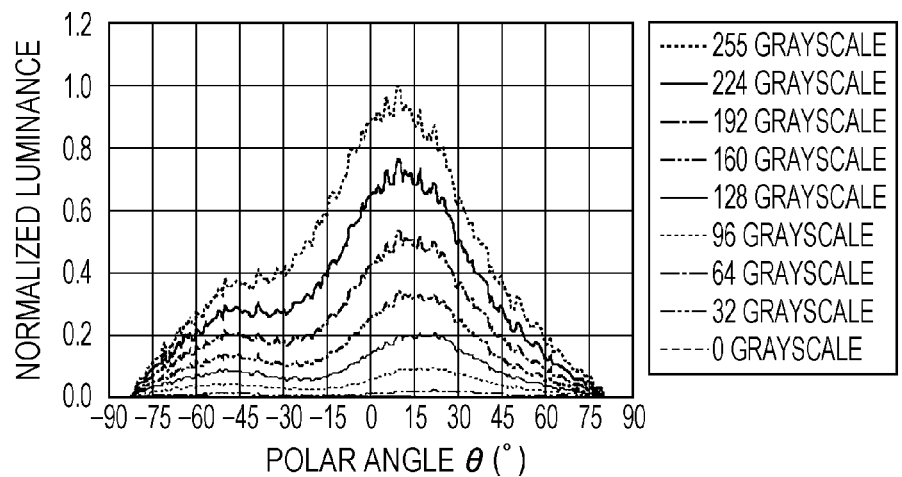
FIG. 52A is a diagram showing gray scale luminance characteristics in an azimuth $\varphi$: 90° to 270° direction (vertical direction of the screen) when using the liquid crystal display device of EXAMPLE 3.
Figure 52B:
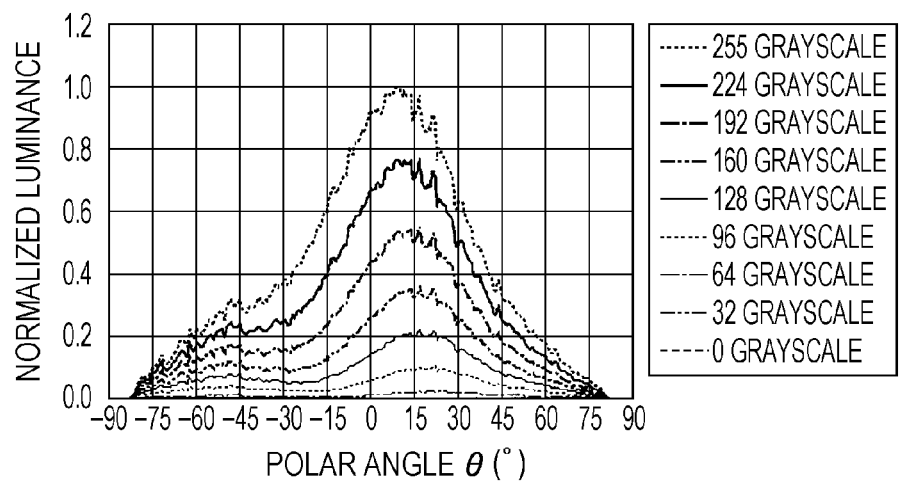
FIG. 52B is a diagram showing gray scale luminance characteristics in the azimuth $\varphi$: 90° to 270° direction (vertical direction of the screen) when using the liquid crystal display device of EXAMPLE 3.
Figure 52C:
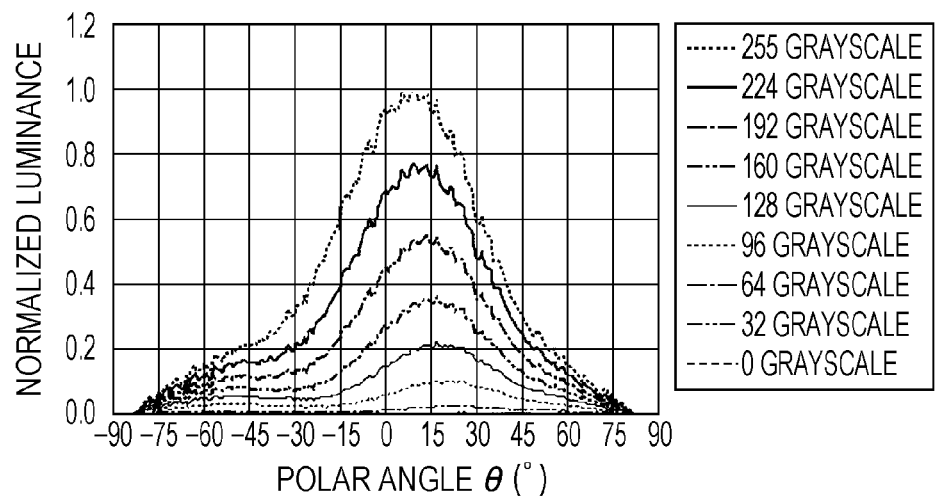
FIG. 52C is a diagram showing gray scale luminance characteristics in the azimuth $\varphi$: 90° to 270° direction (vertical direction of the screen) when using the liquid crystal display device of EXAMPLE 3.
Figure 52D:
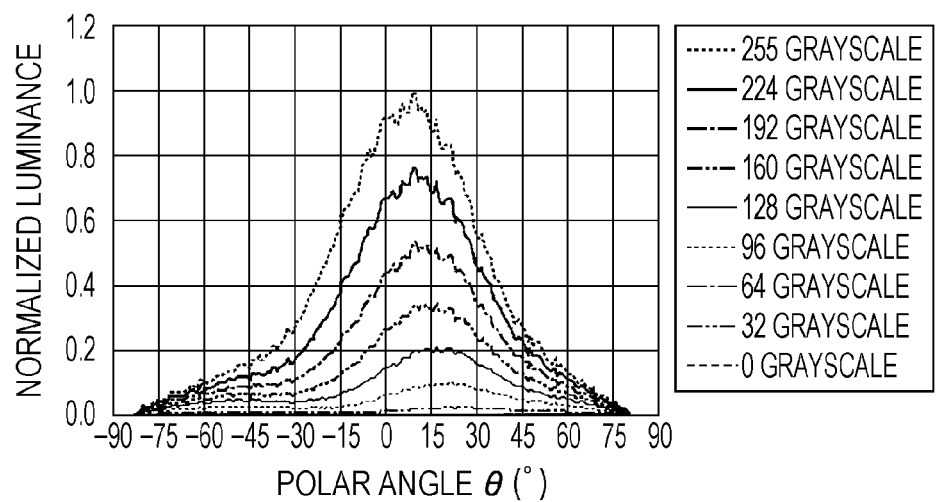
FIG. 52D is a diagram showing gray scale luminance characteristics in the azimuth $\varphi$: 90° to 270° direction (vertical direction of the screen) when using the liquid crystal display device of EXAMPLE 3.

FIG. 52A is a diagram when an aperture ratio is set to 60%. FIG. 52B is a diagram when an aperture ratio is set to 70%. FIG. 52C is a diagram when an aperture ratio is set to 80%. FIG. 52D is a diagram when an aperture ratio is set to 90%.

Figure 53A:
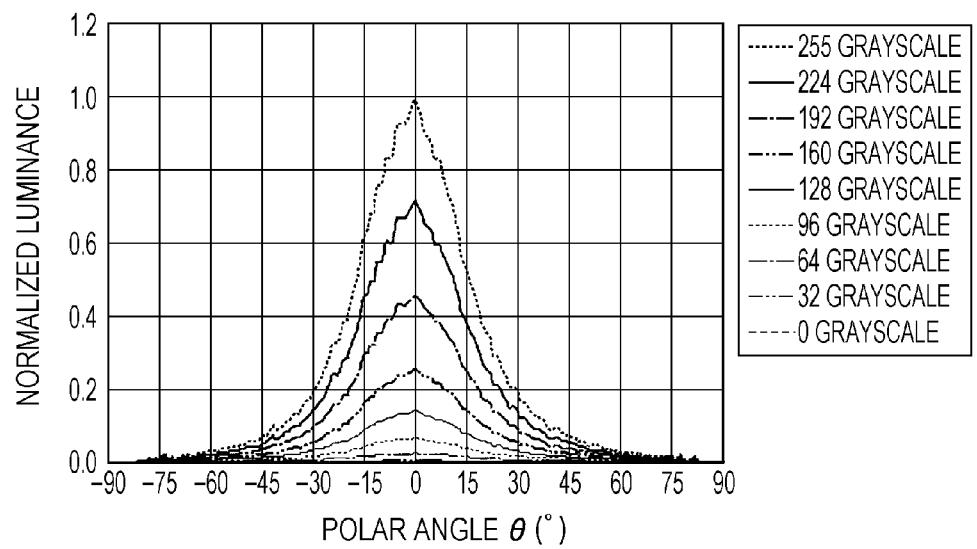
FIG. 53A is a diagram showing gray scale luminance characteristics when using a liquid crystal display device of EXAMPLE 4.
Figure 53B:
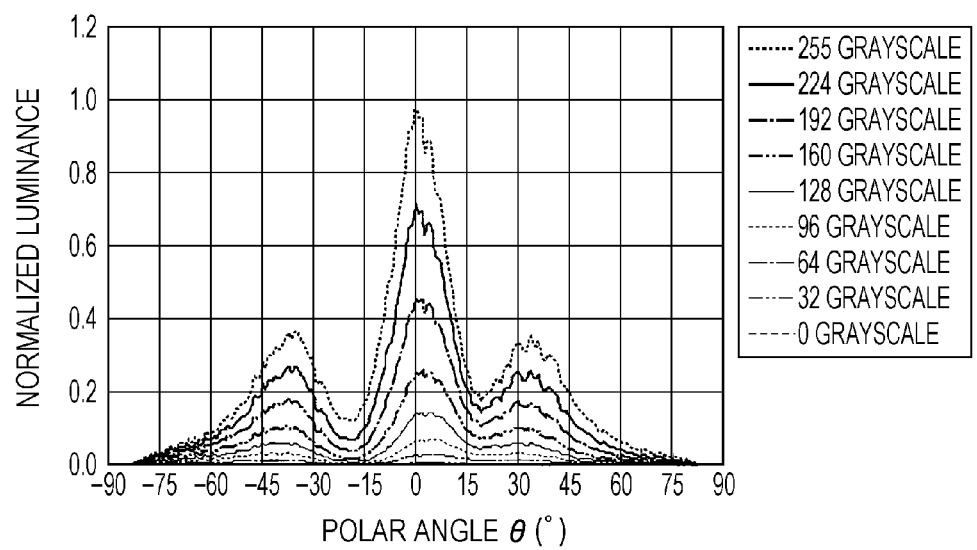
FIG. 53B is a diagram showing gray scale luminance characteristics when using the liquid crystal display device of EXAMPLE 4.

FIGS. 53A and 53B are diagrams showing gray scale luminance characteristics when using the liquid crystal display device of EXAMPLE 4B. FIG. 53A is a diagram showing gray scale luminance characteristics in the azimuth φ: 0° to 180° direction (horizontal direction of the screen). FIG. 53B is a diagram showing gray scale luminance characteristics in the azimuth φ: 90° to 270° direction (vertical direction of the screen).

Figure 54A:
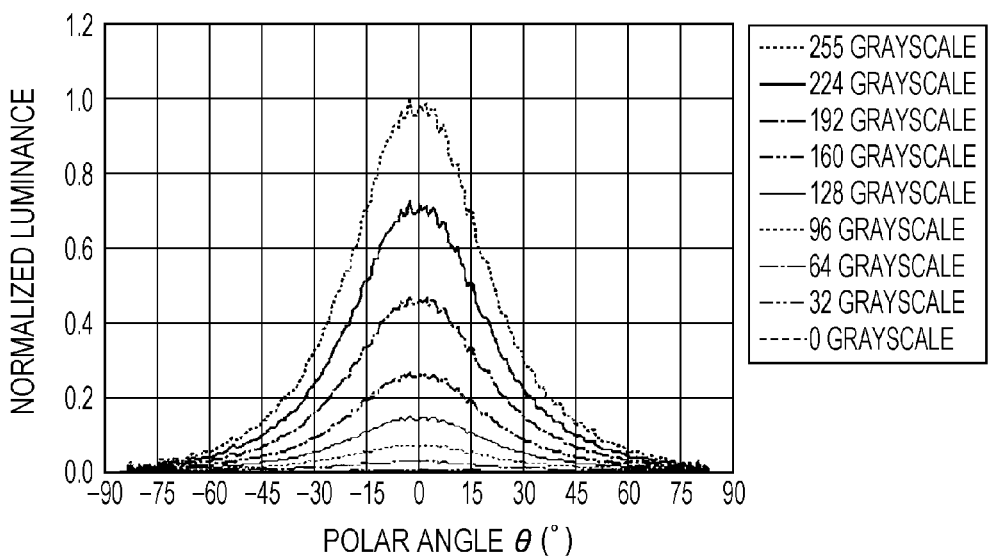
FIG. 54A is a diagram showing gray scale luminance characteristics when using a liquid crystal display device of EXAMPLE 5.
Figure 54B:
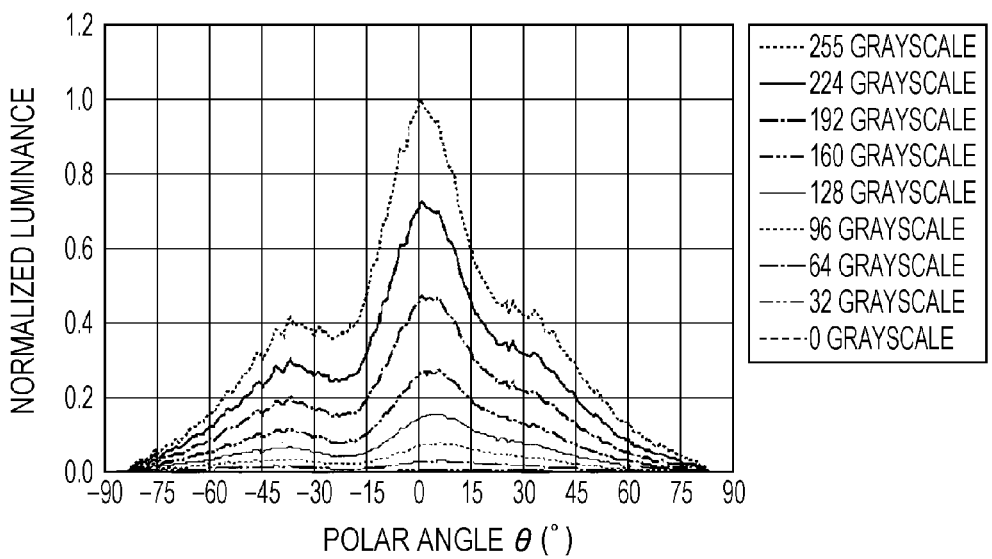
FIG. 54B is a diagram showing gray scale luminance characteristics when using the liquid crystal display device of EXAMPLE 5.

FIGS. 54A and 54B are diagrams showing gray scale luminance characteristics when using the liquid crystal display device of EXAMPLE 5B. FIG. 54A is a diagram showing gray scale luminance characteristics in the azimuth φ: 0° to 180° direction (horizontal direction of the screen). FIG. 54B is a diagram showing gray scale luminance characteristics in the azimuth φ: 90° to 270° direction (vertical direction of the screen).

As shown in FIGS. 43A to 54A, from the results "COMPARATIVE EXAMPLES 1B to 3B" and "EXAMPLES 1B to 5B", gray scale inversion and gray scale collapse are not confirmed in the azimuth φ: 0° to 180° direction (horizontal direction of the screen).

However, as shown in FIGS. 43B to 46B, in the results "COMPARATIVE EXAMPLES 1B to 3B", gray scale collapse is not confirmed in the azimuth φ: 90° to 270° direction (vertical direction of the screen). For example, in "COMPARATIVE EXAMPLES 1B", as shown in FIG. 43B, gray scale collapse is confirmed in the vicinity of the polar angle θ: −45°.

In contrast, as shown in FIGS. 47B to 54B, in the results "EXAMPLES 1B to 5B", gray scale inversion and gray scale collapse are not confirmed in the azimuth φ: 90° to 270° direction (vertical direction of the screen).

From the results of "COMPARATIVE EXAMPLES 1B to 3B" and "EXAMPLES 1B to 5B", it is ascertained that the occurrence of the gray scale inversion and the gray scale collapse can be suppressed by arranging the light control film that anisotropically diffuses light, and by making the azimuthal direction in which a change in the light transmittance of the polar angle direction is relatively large in the case of applying a constant voltage to the liquid crystal panel and the azimuthal direction in which diffusivity of the light control film is relatively high to approximately coincide.

Furthermore, as shown in FIGS. 47B and 49B, in "EXAMPLE 2B", the drop in luminance is smaller than in "EXAMPLE 1B" even if the liquid crystal panel is observed at an angle from the front.

For example, in "EXAMPLE 2B", as shown in FIG. 49B, it is confirmed that the drop in luminance is small in the vicinity of in the polar angle θ: −30°. From the results of "EXAMPLE 1B" and "EXAMPLE 2B", it is ascertained that the sense of luminance change can be reduced by providing the light-scattering film.

As shown in FIGS. 49B and 50B, in "EXAMPLE 3B", there is no peak luminance other than maximum peak luminance as confirmed in "EXAMPLE 2B", and the luminance distribution is symmetrical with respect to the maximum peak luminance. From the results of "EXAMPLE 2B" and "EXAMPLE 3B", it is ascertained that the sense of luminance change can be reduced by varying the inclination angle of the reflecting surface of the light diffusion portion in the azimuth φ: 90° to 270° direction (vertical direction of the screen).

In addition, as shown in FIGS. 47A, 47B, 53A and 53B, the luminance distribution in "EXAMPLE 4B" becomes narrower compared to "EXAMPLE 1B", by using the directional backlight. Similarly, as shown in FIGS. 49A, 49B, 54A and 54B, the luminance distribution in "EXAMPLE 5B" becomes narrower compared to "EXAMPLE 2Bs."

INDUSTRIAL APPLICABILITY

Some aspects of the present invention can be applied to liquid crystal display devices used in the various displays and display units of portable electronic devices.

REFERENCE SIGNS LIST 11, 21, 190, 195, 197, 2101 LIQUID CRYSTAL DISPLAY DEVICE
12, 150, 29, 160, 165, 170, 175, 180, 2209, 2309, 2509A, 2509B, 2509C, 2509D, 2609A, 2609B, 2709A, 2709B LIGHT CONTROL FILM (LIGHT CONTROL MEMBER)
13 FIRST POLARIZER (POLARIZER)
15 LIQUID CRYSTAL CELL
17 SECOND POLARIZER (POLARIZER)
18 BACKLIGHT (ILLUMINATION DEVICE)
19 TFT BOARD
110 COLOR FILTER SUBSTRATE
111 LIQUID CRYSTAL LAYER
113 LIQUID CRYSTAL PANEL
139, 239, 2239, 2339, 2639A, 2639B, 2739A, 2739B SUBSTRATE
140, 152, 162, 167, 172, 177, 182, 241, 2241, 2341, 2641A, 2641B, 2741A, 2741B LIGHT DIFFUSION PORTION
141, 151, 161, 166, 171, 176A, 176B, 181, 240, 2240, 2340, 2440A, 2440B, 2440C, 2440D, 2440E, 2440F, 2540A, 2540B, 2540C, 2540D, 2640A, 2640B, 2740A, 2740B LIGHT ABSORBING LAYER (LIGHT SHIELDING LAYER)
196 ANISOTROPIC SCATTERING FILM (LIGHT CONTROL MEMBER)
198, 2102 LIGHT SCATTERING FILM (LIGHT SCATTERING MEMBER)
$M_{D2}$ DISCOTIC LIQUID CRYSTAL
$\phi1$ INCLINATION ANGLE OF FIRST REFLECTING SURFACE
$\phi2$ INCLINATION ANGLE OF SECOND REFLECTING SURFACE
θ POLAR ANGLE
φ AZIMUTH

The invention claimed is:
1. A liquid crystal display device comprising:
a liquid crystal panel that includes a liquid crystal cell including a pair of substrates and a liquid crystal layer sandwiched between the pair of substrates, and a pair of polarizers arranged one each on a light incident side and a light emission side of the liquid crystal layer, respectively;
an illumination device that is arranged on the light incident side of the liquid crystal cell, and emits light toward the liquid crystal cell; and
a light control member that is arranged on the light emission side of the liquid crystal panel, and controls an emission direction of light emitted from the liquid crystal panel by anisotropically diffusing the light in an azimuthal direction as viewed from a direction normal to the liquid crystal panel, wherein
the light control member is arranged such that an azimuthal direction in which a luminance viewing angle of the liquid crystal panel is relatively narrow and an azimuthal direction in which diffusivity of the light control member is relatively high approximately coincide with each other,
the light control member includes a substrate having light transmissivity, a plurality of light absorbing layers on one surface of the substrate, and a light diffusion portion on a region other than a region where the light absorbing layers are on the one surface of the substrate,
the light diffusion portion has a light emission end surface in contact with the substrate, a light incident end surface which is opposite the light emission end surface and has an area greater than an area of the light emission end surface, and a reflecting surface which is in contact with the light emission end surface and the light incident end surface and reflects light incident from the light incident end surface, a height from the light incident end surface to the light emission end surface of the light diffusion portion is greater than a thickness of the light absorbing layer, air is in a space defined by the light absorbing layer and the light diffusion portions, the air having a first refractive index lower than a second refractive index of the light diffusion portions, and each of the plurality of light absorbing layers has an elliptical shape or a circular shape as viewed from the direction normal to the substrate.

2. The liquid crystal display device according to claim 1, wherein the light diffusion portion includes a first reflecting surface corresponding to the azimuthal direction in which a luminance viewing angle of the liquid crystal panel is relatively narrow, and a second reflecting surface on an opposite side to the first reflecting surface, and an inclination angle of the first reflecting surface and an inclination angle of the second reflecting surface are different from each other.

3. The liquid crystal display device according to claim 2, wherein the inclination angle of the first reflecting surface is greater than the inclination angle of the second reflecting surface, when the light emitted from the liquid crystal panel is incident obliquely toward the first reflecting surface.

4. The liquid crystal display device according to claim 1, wherein a planar shape of a portion at which the light absorbing layer is in contact with one surface of the substrate is an anisotropic shape having at least a major axis and a minor axis.

5. The liquid crystal display device according to claim 1, wherein a planar shape of a portion at which the light absorbing layer is in contact with one surface of the substrate is an ellipse or a shape inscribed in the ellipse.

6. The liquid crystal display device according to claim 4, wherein the minor axis direction of the light absorbing layer and the azimuthal direction in which a luminance viewing angle of the liquid crystal panel is relatively narrow approximately coincide with each other.

7. The liquid crystal display device according to claim 1, wherein among the plurality of light absorbing layers, a size or a shape of at least one light absorbing layer is different from a size or a shape of another light absorbing layer.

8. The liquid crystal display device according to claim 1, wherein among the plurality of light absorbing layers, a major axis of at least one light absorbing layer faces a direction different from that of another light absorbing layer.

9. The liquid crystal display device according to claim 1, wherein among the plurality of light absorbing layers, at least one light absorbing layer is connected to at least a part of another light absorbing layer.

10. The liquid crystal display device according to claim 1, wherein a length in the major axis direction of the light absorbing layer is 100 μm or less.

11. The liquid crystal display device according to claim 10, wherein a length in the major axis direction of the light absorbing layer is 40 μm or less.

12. The liquid crystal display device according to claim 1, wherein the inclination angle of the reflecting surface of the light diffusion portion is continuously changed, and a cross-sectional shape of the reflecting surface is a curved inclined surface.

13. The liquid crystal display device according to claim 1, wherein the reflecting surface of the light diffusion portion has a plurality of different inclination angles, and a cross-sectional shape of the reflecting surface is an inclined surface of a polygonal line.

14. The liquid crystal display device according to claim 10, wherein a discotic liquid crystal is included in a retardation plate, and an angle between an azimuthal direction in which the discotic liquid crystal is inclined as viewed from the direction normal to the retardation plate, and the azimuthal direction in which diffusivity of the light control member is relatively high is approximately 45°.

15. The liquid crystal display device according to claim 1, wherein the each of the plurality of light absorbing layers has the elliptical shape as viewed from the direction normal to the substrate.

* * * * *